United States Patent
Sato et al.

(10) Patent No.: US 10,519,329 B2
(45) Date of Patent: Dec. 31, 2019

(54) GEL PARTICLES, PHOTOSENSITIVE COMPOSITION, INK COMPOSITION, METHOD OF PRODUCING WATER DISPERSION OF GEL PARTICLES, AND IMAGE FORMING METHOD

(71) Applicant: FUJIFILM CORPORATION, Minato-ku, Tokyo (JP)

(72) Inventors: Noriaki Sato, Kanagawa (JP); Shota Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 268 days.

(21) Appl. No.: 15/447,113

(22) Filed: Mar. 2, 2017

(65) Prior Publication Data
US 2017/0174916 A1    Jun. 22, 2017

Related U.S. Application Data

(63) Continuation of application No. PCT/JP2015/074796, filed on Aug. 31, 2015.

(30) Foreign Application Priority Data

Sep. 30, 2014 (JP) .................. 2014-201982
Mar. 24, 2015 (JP) .................. 2015-061720

(51) Int. Cl.
| | |
|---|---|
| C09D 11/101 | (2014.01) |
| C09D 11/30 | (2014.01) |
| B41J 2/045 | (2006.01) |
| B41J 11/00 | (2006.01) |
| B41M 5/00 | (2006.01) |
| B41M 7/00 | (2006.01) |
| C09D 11/107 | (2014.01) |
| C09D 11/38 | (2014.01) |

(52) U.S. Cl.
CPC .......... *C09D 11/101* (2013.01); *B41J 2/04581* (2013.01); *B41J 11/002* (2013.01); *B41M 5/0023* (2013.01); *B41M 7/0081* (2013.01); *C09D 11/107* (2013.01); *C09D 11/30* (2013.01); *C09D 11/38* (2013.01); *B41J 2202/03* (2013.01)

(58) Field of Classification Search
CPC ....... C09D 11/38; C09D 11/023; C09D 11/30; C08G 18/3215; C08G 18/3891; C08G 18/388; C08F 2/50; C08F 290/067; B41M 5/0023; B41J 2/04581
USPC ................................. 523/160, 161
See application file for complete search history.

(56) References Cited

U.S. PATENT DOCUMENTS

| | | | | | |
|---|---|---|---|---|---|
| 5,571,623 | A | * | 11/1996 | Kuriyama | C08G 18/0871 428/407 |
| 6,031,044 | A | * | 2/2000 | Kokel | C08G 18/0804 427/372.2 |
| 2017/0174913 | A1 | | 6/2017 | Sato et al. | |

FOREIGN PATENT DOCUMENTS

| | | |
|---|---|---|
| CN | 102604002 A | 7/2012 |
| CN | 107075071 A | 8/2017 |
| EP | 3202808 A1 | 8/2017 |
| JP | H06-80625 A | 3/1994 |
| JP | H10-182781 A | 7/1998 |
| JP | 2006-28514 A | 2/2006 |
| JP | 2012-532238 A | 12/2012 |

OTHER PUBLICATIONS

Extended European Search Report dated Sep. 6, 2017, issued in corresponding EP Patent Application No. 15847397.5.
English language translation of the following: Office action dated Dec. 12, 2017 from the JPO in a Japanese patent application No. 2016-551666 corresponding to the instant patent application.
International Search Report issued in International Application No. PCT/JP2015/074796 dated Nov. 24, 2015.
Written Opinion of the ISA issued in International Application No. PCT/JP2015/074796 dated Nov. 24, 2015.
English language translation of the following: Office action dated Mar. 5, 2019 from the SIPO in a Chinese patent application No. 201580049393.8corresponding to the instant patent application.

* cited by examiner

*Primary Examiner* — Doris L Lee
(74) *Attorney, Agent, or Firm* — Solaris Intellectual Property Group, PLLC

(57) ABSTRACT

Provided are gel particles each having a three-dimensional crosslinked structure including at least one bond selected from a urethane bond and a urea bond, the gel particles each including: a polymerizable group; and a functional group that generates radicals by irradiation with active energy rays, a photosensitive composition containing the gel particles, an ink composition, a method of producing water dispersion of gel particles, and an image forming method.

12 Claims, No Drawings

GEL PARTICLES, PHOTOSENSITIVE COMPOSITION, INK COMPOSITION, METHOD OF PRODUCING WATER DISPERSION OF GEL PARTICLES, AND IMAGE FORMING METHOD

CROSS-REFERENCE TO RELATED APPLICATIONS

This application is a continuation application of International Application No. PCT/JP2015/074796, filed Aug. 31, 2015, the disclosure of which is incorporated herein by reference in its entirety. Further, this application claims priority from Japanese Patent Application No. 2014-201982, filed Sep. 30, 2014, and Japanese Patent Application No. 2015-061720, filed Mar. 24, 2015, the disclosures of which are incorporated herein by reference in their entirety.

BACKGROUND OF THE INVENTION

1. Field of the Invention

The present disclosure relates to gel particles, a photosensitive composition, an ink composition, a method of producing water dispersion of gel particles, and an image forming method.

2. Description of the Related Art

Examples of the image forming method that forms an image on a recording medium such as paper based on image data signals include an electrophotographic method, a sublimation-type thermal transfer method, a fusion-type thermal transfer method, and an ink jet method. For example, the ink jet method can be performed with a cheap device, and an image is directly formed on a recording medium by ejecting ink only to a required image portion. Therefore, the ink can be effectively used, and thus running cost is not expensive. The ink jet method makes less noises, and thus excellent as the image forming method.

Examples of the ink jet method include an image forming method obtained by using ink for ink jet recording that can be cured by irradiation with active energy rays. In this method, ink droplets are cured by being irradiated with active energy rays immediately after ink ejection or after a certain period of time, such that recording speed can be increased and an image can be formed.

The ink that can be cured by irradiation with active energy rays generally contains a polymerizable compound and a polymerization initiator.

In the related art, various polymerization initiators that improve reactivity are suggested.

For example, JP2012-532238A discloses a polymerization initiator obtained by bonding one or more bisacylphosphine oxide moieties to an oligomer or a polymer skeleton via a phosphorus atom. JP2006-28514A discloses a polymeric initiator including a dendritic polymer core having at least one functional group for initiation as a terminal. JP1994-80625A (JP-H06-80625A) discloses a triphenylsulfonium salt unit-based polymer compound.

SUMMARY OF THE INVENTION

In a case where polymerization initiators disclosed in JP2012-532238A, JP2006-28514A, and JP1994-80625A (JP-H06-80625A) are used as a polymerization initiator contained in the ink composition, reactivity of the polymerization initiator itself is satisfactory, but solubility to water is low. Therefore, the polymerization initiator and the polymerizable compound independently exist in the ink composition, and thus there is a tendency that efficiency of the progress of the crosslinking reaction is low, and film hardness of the cured film is not sufficient.

In a case of the cured film obtained by using ink in a composition including the polymerizable compound and the polymerization initiator, low molecular weight components (components having a molecular weight of 1,000 or less) such as unreacted polymerizable monomer, the polymerization initiator, and residues of the polymerization initiator remains in the cured film in some cases, and thus the low molecular weight components become one cause of various problems.

For example, a phenomenon in which the low molecular weight components remaining in the cured film move from the cured film to the outside, so-called migration occurs in some cases. If a migration amount of the low molecular weight components in the cured film is great, odor of the cured film becomes strong, particularly in a case where the ink is used for printing on a package such as food packaging, a problem that the odor moves to inclusion or surrounding food may occur.

Meanwhile, the low molecular weight components remain in the cured film, and in a case where the low molecular weight components remain in the film, the low molecular weight components cause adverse influence on the film properties of the cured film.

Accordingly, an ink composition that suppresses migration of the low molecular weight components and does not deteriorate film properties is required.

In view of the circumstances as described above, an object of the embodiment of the invention is to provide gel particles in which occurrence of migration in which low molecular weight components move from the cured film to the outside of the film is suppressed such that a film (for example, image) having excellent film hardness can be obtained, a photosensitive composition, an ink composition, a method of producing water dispersion of gel particles, and an image forming method.

Specific means for achieving the object includes the followings.

<1> Gel particles each having a three-dimensional crosslinked structure including at least one bond selected from a urethane bond and a urea bond, the gel particles each comprising: a polymerizable group; and a functional group that generates radicals by irradiation with active energy rays.

<2> The gel particles according to <1>, in which the functional group that generates radicals by irradiation with active energy rays is a group having at least one selected from an acetophenone structure represented by Formula A below, a monoacylphosphine oxide structure represented by Formula B below, and a bisacylphosphine oxide structure represented by Formula C below,

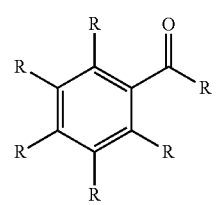

Formula A

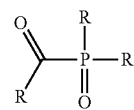

Formula B

Formula C in Formulae A, B, and C, R's each independently represent a monovalent group or *-L-, at least one of R's in the respective formulae represents *-L-, L represents a divalent organic group, and * represents a bonding site with a three-dimensional crosslinked structure.

<3> The gel particles according to <1> or <2>, each further comprising: a hydrophilic group on a surface.

<4> The gel particles according to any one of <1> to <3>, each comprising: a polymerizable monomer.

<5> A photosensitive composition comprising: the gel particles according to any one of <1> to <4>; and water.

<6> The photosensitive composition according to <5>, further comprising: a polymerizable compound outside the gel particles.

<7> An ink composition comprising: the gel particles according to any one of <1> to <4>; water; and a colorant.

<8> The ink composition according to <7>, further comprising: a polymerizable compound outside the gel particles.

<9> A method of producing water dispersion of gel particles, comprising: an emulsification step of obtaining an emulsion, by mixing and emulsifying any one oil phase component selected from an oil phase component including a trifunctional or higher isocyanate compound having a functional group that generates radicals by irradiation with active energy rays, a polymerizable monomer, and an organic solvent, an oil phase component including a trifunctional or higher isocyanate compound having a functional group that generates radicals by irradiation with active energy rays, a trifunctional or higher isocyanate compound having a polymerizable group, and an organic solvent, an oil phase component including a trifunctional or higher isocyanate compound having a polymerizable group, a functional group that generates radicals by irradiation with active energy rays, a polymerizable monomer, and an organic solvent, and an oil phase component including a trifunctional or higher isocyanate compound having a functional group that generates radicals by irradiation with active energy rays, a trifunctional or higher isocyanate compound having a polymerizable group, a polymerizable monomer, and an organic solvent, and a water phase component including water; and a gelation step of gelling the emulsion by heating.

<10> The method of producing water dispersion of gel particles according to <9>, further comprising: a mixture step of mixing the gel particles obtained in the gelation step, water, and a colorant.

<11> An image forming method comprising: an ink applying step of applying the ink composition according to <7> or <8> on a recording medium; and an irradiation step of irradiating the ink composition applied on the recording medium with active energy rays.

According to an embodiment of the invention, occurrence of migration in which low molecular weight components move from a cured film to the outside of the film is suppressed, gel particles for obtaining a film (for example, image) having excellent film hardness, a photosensitive composition, an ink composition, a method of producing water dispersion of gel particles, and an image forming method are provided.

DESCRIPTION OF THE PREFERRED EMBODIMENTS

Hereinafter, details of the gel particles are specifically described.

In this specification, a numerical range indicated by using the expression "to" represents a range including numerical values indicated before and after the expression "to" respectively as the minimum value and the maximum value.

In this specification, (meth)acrylate means at least one of acrylate or methacrylate.

In this specification, the expression "light" is a concept of including active energy rays such as γ rays, β rays, electron beams, ultraviolet rays, visible rays, and infrared rays.

In this specification, the ultraviolet rays may be referred to as "ultra violet (UV) light".

In this specification, light generated from a light emitting diode (LED) light source may be referred to as "LED light".

<Gel Particles>

The gel particles have a polymerizable group and a functional groups that generate radicals by irradiation with active energy rays and have a three-dimensional crosslinked structure including at least one bond selected from a urethane bond and a urea bond.

The use of the gel particles is not particularly limited, but gel particles are, for example, an ink composition, a coating agent, an adhesive, and paint.

Details of working mechanisms in the embodiment of the invention are not clear but it is assumed as follows.

Since the gel particles have a polymerizable group and a functional groups that generate radicals by irradiation with active energy rays, when gel particles is irradiated with active energy rays, radicals are generated from the functional groups that generate radicals by irradiation with active energy rays. Accordingly, a polymerizable group existing in one gel particle and a polymerizable group existing in the other gel particle between gel particles adjacent to each other easily react with each other, so as to form a crosslinked structure between the gel particles. Therefore, the gel particles can form a cured film without using a polymerization initiator, low molecular weight components caused by unreacted substances of the polymerization initiator and residues of the polymerization initiator hardly remains in the cured film. That is, it is considered that occurrence of migration of the low molecular weight components in the cured film is suppressed, and physical properties of the formed film are not deteriorated.

If the gel particles have a three-dimensional crosslinked structure, the gel particles can form a film having excellent film hardness such as solvent resistance or the like.

Since the gel particles have functional groups that generate radicals by irradiation with active energy rays, a range of selection of the functional groups that generate radicals by irradiation with active energy rays to be introduced becomes wide, and thus a range of selection of the light source to be used becomes wide. Accordingly, curing sensitivity can be improved compared with that in the related art.

For example, an acylphosphine oxide compound is a photopolymerization initiator having particularly excellent curing sensitivity with respect to the irradiation of the active energy rays.

However, the acylphosphine oxide compound have low solubility with respect to water, and thus it is difficult to cause the acylphosphine oxide compound to be contained in an aqueous composition in the related art.

The gel particles have excellent sensitivity with respect to light as the functional groups that generate radicals by irradiation with active energy rays in a three-dimensional structure of the gel particles, but it is possible to introduce a structure which is the same as the acylphosphine oxide compound or the like of which solubility to water is low, as a functional group, and thus it does not have to use a photopolymerization initiator such as an acylphosphine oxide compound as an independent component.

In a case where the functional group that generates radicals by irradiation with active energy rays is a group having an acylphosphine oxide structure, sensitivity to light, particularly, sensitivity to LED light is improved.

The wavelength of the LED light is preferably 355 nm, 365 nm, 385 nm, 395 nm, or 405 nm.

~Polymerizable Group Having Gel Particles~

In this specification, the expression "gel particles have polymerizable groups" means that the gel particles have at least one of polymerizable groups included in a three-dimensional crosslinked structure or polymerizable groups that are not included in a three-dimensional crosslinked structure.

That is, in the gel particles, the polymerizable group may exist as a part of the three-dimensional crosslinked structure or may exist as a portion other than the three-dimensional crosslinked structure.

The expression "polymerizable groups exist as a portion other than the three-dimensional crosslinked structure" indicate that monomers (hereinafter, also referred to as "polymerizable monomers") having polymerizable groups are included in the gel particles, independently from the three-dimensional crosslinked structure.

In any case, the polymerizable group preferably exist in surface portions (portions coming into contact with water) of the gel particles.

The expression "gel particles have polymerizable groups" can be checked by fourier transform infrared spectroscopic (FT-IR) analysis.

Details of the polymerizable groups included in the gel particles and the monomer (polymerizable monomer) having polymerizable group are described below.

~Three-Dimensional Crosslinked Structure~

The "three-dimensional crosslinked structure" refers to a three dimensional mesh structure formed by crosslinking. The gel particles are formed by forming a three-dimensional crosslinked structure in the particles.

That is, in the specification, the expression "the particles have a three-dimensional crosslinked structure" has the same meaning as the expression "the particles are the gel particles.

Whether gel particles having a three-dimensional crosslinked structure are included in a composition such as an ink composition is checked as follows. The following operations are performed in the temperature condition of 25° C.

Samples are gathered from the ink composition. With respect to the gathered samples, 100 times by mass of tetrahydrofuran (THF) is added and mixed with respect to the total solid content of the sample so as to prepare a diluent. With respect to the obtained diluent, centrifugation is performed under the conditions of 80,000 rpm and 40 minutes. After the centrifugation, whether there are residues is visually checked. In a case where there are residues, the residues are re-dispersed with water, a redispersion liquid is prepared, and a particle size distribution of the redispersion liquid is measured in a light scattering method by using a wet-type particle size distribution measuring device (LA-910, manufactured by Horiba Ltd.).

A case where particle size distribution can be checked by the operation described above is determined that the ink composition includes gel particles having a three-dimensional crosslinked structure.

The three-dimensional crosslinked structure can be formed by the reaction with a trifunctional or higher isocyanate compound or a difunctional isocyanate compound with a compound having two or more active hydrogen groups. Since at least one compound having three or more reactive groups (isocyanate group or active hydrogen group) are included as a raw material used when gel particles are produced, the crosslinking reaction three dimensionally progresses so as to form a three dimensional mesh structure.

The three-dimensional crosslinked structure in the gel particles is preferably a product formed by the reaction between a trifunctional or higher isocyanate compound and water.

The three-dimensional crosslinked structure in the gel particles is preferably a product formed from the reaction between a trifunctional or higher isocyanate compound having a functional group that generates radicals by irradiation with active energy rays and water.

(Trifunctional or Higher Isocyanate Compound)

The trifunctional or higher isocyanate compound is a compound having three or more isocyanate groups in a molecule, and a compound synthesized in the methods below and well-known compounds can be used. Examples of the trifunctional or higher isocyanate compound, a trifunctional or higher aromatic isocyanate compound, a trifunctional or higher aliphatic isocyanate compound.

Examples of the well-known compound include compounds disclosed in "Polurethane resin Handbook" (edited by Keiji Iwata, Nikkan Kogyo Shimbun, Ltd., (1987)).

The trifunctional or higher isocyanate compound is preferably a compound having three or more isocyanate groups in a molecule represented by Formula 1 below.

Formula 1

In Formula 1, X represents an n-valent organic group.

In Formula 1, n is 3 or greater. n is preferably 3 to 10, more preferably 3 to 8, and even more preferably 3 to 6.

The trifunctional or higher isocyanate compound is preferably a compound derived from a difunctional isocyanate compound (compound having two isocyanate groups in a molecule). The trifunctional or higher isocyanate compound is more preferably an isocyanate compound derived from at least one selected from isophorone diisocyanate, hexamethylene diisocyanate, trimethylhexamethylene diisocyanate, 1,3-bis(isocyanatomethyl)cyclohexane, m-xylylene diisocyanate, and dicyclohexylmethane-4,4'-diisocyanate.

The expression "derived" means including a structure derived from a raw material by using the compound in the raw material.

As the trifunctional or higher isocyanate compound, for example, a compound having three or more isocyanate groups in a molecule such as a trifunctional or higher isocyanate compound (adduct type), a trimer of a difunctional or higher isocyanate compound (biuret type or isocyanurate type), and a formalin condensate of benzene isocyanate as an adduct product (adduct) of a difunctional or higher isocyanate compound (a compound having two or more isocyanate groups in a molecule) and a compound having three or more active hydrogen groups in a molecule such as trifunctional or higher polyol, polyamine, and polythiol is preferable.

These trifunctional or higher isocyanate compounds may be a mixture including a plurality of compounds, and a compound represented by Formula 2 or 3 provided below is preferably a main component of the mixture and may include other components.

The "active hydrogen group" means at least one group selected from a hydroxyl group, a primary amino group, a secondary amino group, and a mercapto group.

Adduct Type

An adduct type trifunctional or higher isocyanate compound is preferably a compound represented by Formula 2 or 3 below.

that may have a substituent having 1 to 20 carbon atoms, a cycloalkylene group that may have a substituent having 1 to 20 carbon atoms, or an arylene group that may have a substituent having 1 to 20 carbon atoms. It is more preferable that $R_1$, $R_2$, $R_3$, $R_4$, and $R_5$ each independently represent a group selected from groups represented by (3-1) to (3-11), (4-1) to (4-2), and (5-1) to (5-7) below. * represents a bonding site.

Formula 2

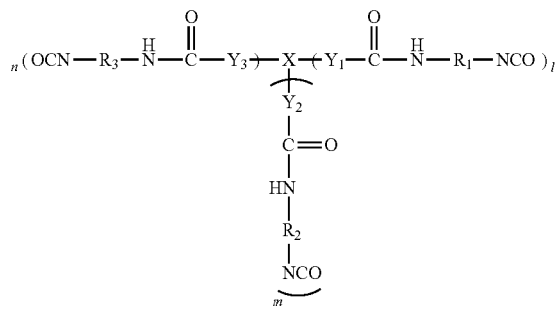

Formula 3

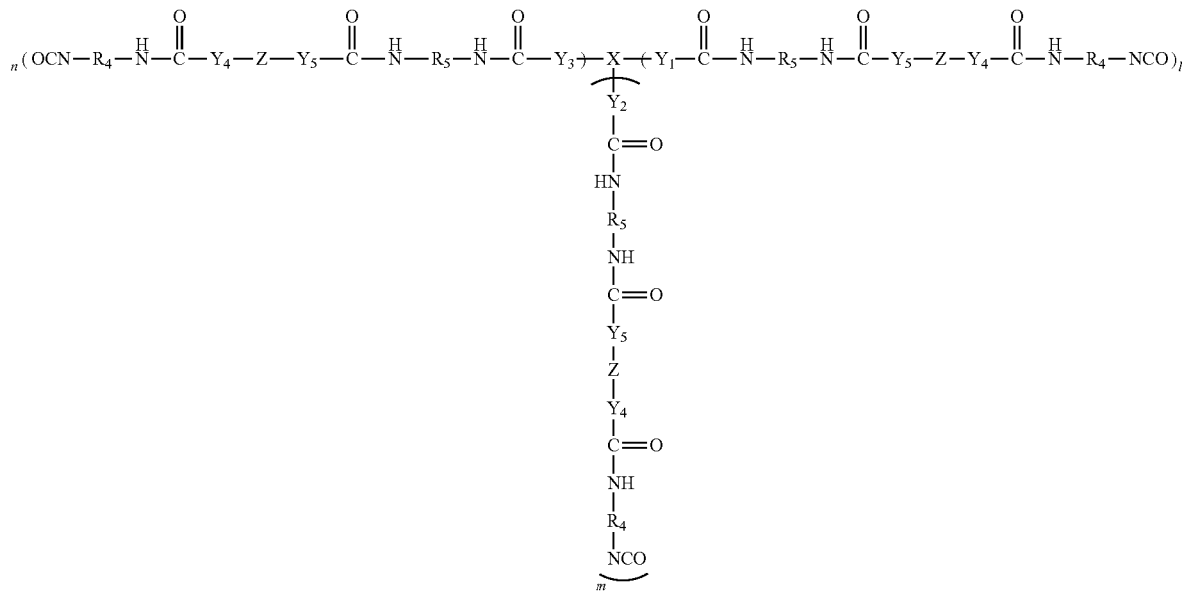

In Formulae 2 and 3, X represents a (l+m+n)-valent organic group, l, m, and n are respectively 0 or greater, and l+m+n is 3 or greater. l+m+n is preferably 3 to 10, more preferably 3 to 8, and even more preferably 3 to 6.

In Formulae 2 and 3, $Y_1$, $Y_2$, $Y_3$, $Y_4$, and $Y_5$ each independently represent O, S, or NH, O or S is preferable, and O is more preferable.

In Formulae 2 and 3, Z represents a divalent organic group.

In Formulae 2 and 3, $R_1$, $R_2$, $R_3$, $R_4$, and $R_5$ each independently represent a divalent organic group. It is preferable that the organic groups represented by $R_1$, $R_2$, $R_3$, $R_4$, and $R_5$ each independently represent an alkylene group (3-1)

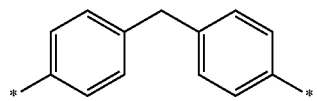

(3-2)

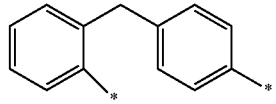

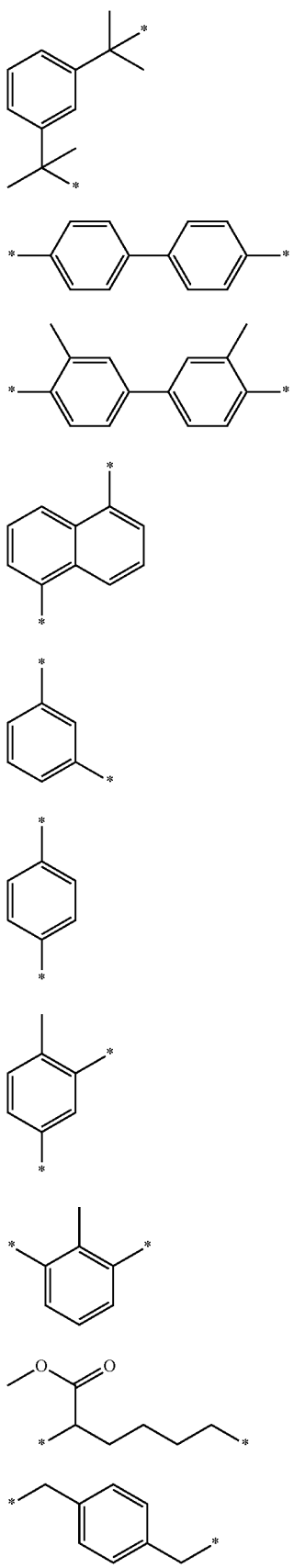
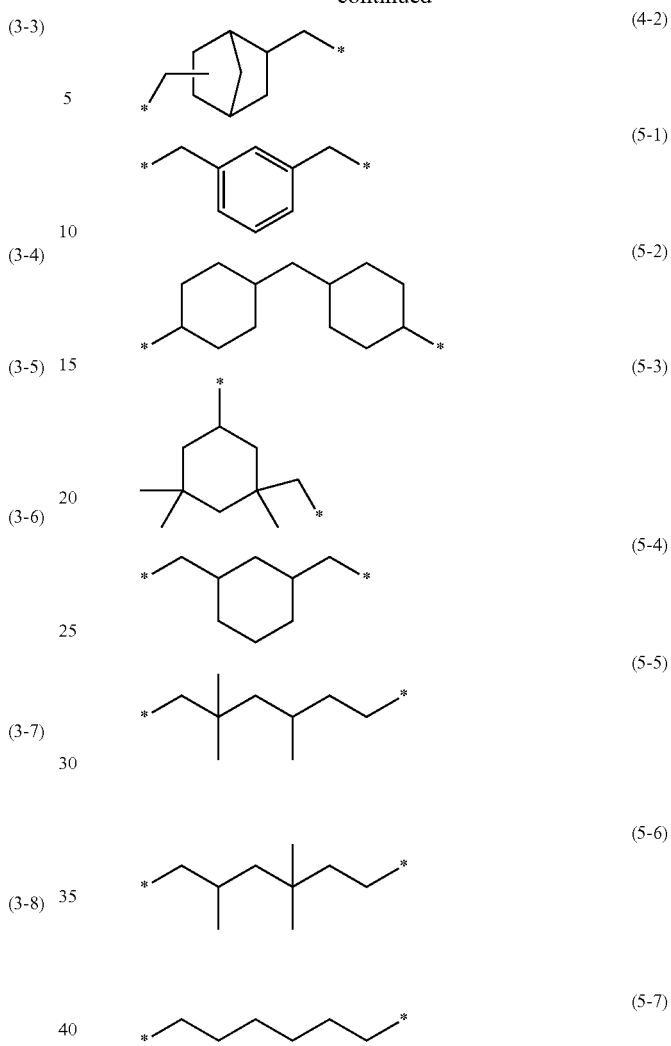

In Formulae 2 and 3, it is more preferable that $R_1$, $R_2$, $R_3$, $R_4$, and $R_5$ each independently represent any one of a group (5-3) derived from isophorone diisocyanate (IPDI), a group (5-7) derived from hexamethylene diisocyanate (HDI), groups (5-5 and 5-6) derived from trimethylhexamethylene diisocyanate (TMHDI), a group (5-4) derived from 1,3-bis (isocyanatomethyl) cyclohexane, a group (5-1) derived from m-xylylene diisocyanate (XDI), and a group (5-2) derived from dicyclohexylmethane-4,4'-diisocyanate (*represents a bonding site).

An adduct type trifunctional or higher isocyanate compound can be synthesized by reacting a compound having three or more active hydrogen groups in a molecule described below and a difunctional or higher isocyanate compound described below. The active hydrogen group means a hydroxyl group, a primary amino group, a secondary amino group, and a mercapto group.

For example, a compound having three or more active hydrogen groups in a molecule and a difunctional or higher isocyanate compound in an organic solvent may be heated (50° C. to 100° C.) while stirring or may be stirred at a low temperature (0° C. to 70° C.) while adding a catalyst such as a stannous octoate and an amine compound, so as to obtain the adduct type trifunctional or higher isocyanate compound (Synthesization Scheme 1 below).

Generally, as the number of moles (number of molecules) of the difunctional or higher isocyanate compound to be reacted with the compound having three or more active hydrogen groups in the molecule, 0.6 times or greater of the number of moles (the number of molecules) of the difunctional or higher isocyanate compound with respect to the number of moles (equivalent number of active hydrogen group) of the active hydrogen group in a compound having three or more active hydrogen groups in the molecule is used. The number of moles of the difunctional or higher isocyanate compound is preferably 0.6 times to 5 times, more preferably 0.6 times to 3 times, and even more preferably 0.8 times to 2 times with respect to the number of moles of the active hydrogen group.

Synthesization Scheme 1

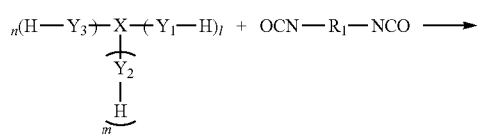

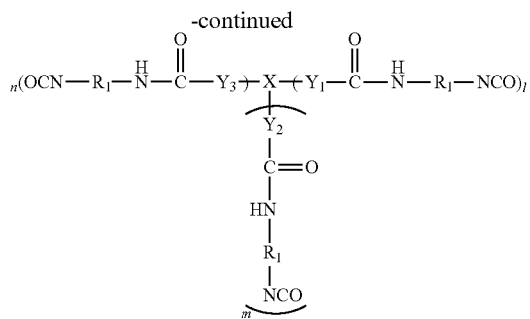

After an adduct (prepolymer) of a compound having two active hydrogen groups in a molecule and a difunctional or higher isocyanate compound are synthesized, this prepolymer and a compound having three or more active hydrogen groups in a molecule are reacted with each other, so as to obtain the adduct type trifunctional or higher isocyanate compound (Synthesization Scheme 2 below).

Synthesization Scheme 2

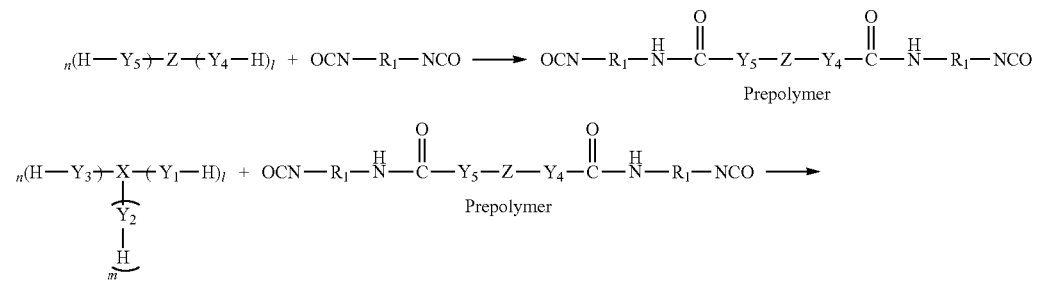

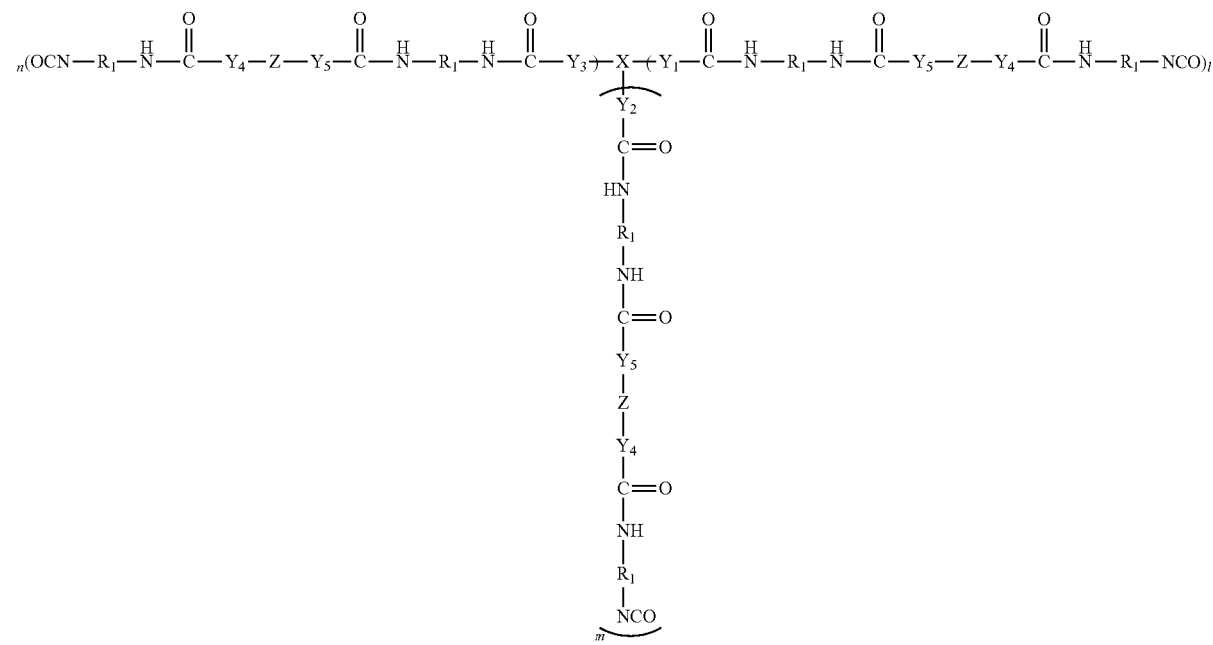

Examples of the difunctional or higher isocyanate compound include a difunctional or higher aromatic isocyanate compound and a difunctional or higher aliphatic isocyanate compound.

Specific examples of the difunctional or higher isocyanate compound include isophorone diisocyanate (IPDI), m-phenylene diisocyanate, p-phenylene diisocyanate, 2,6-tolylene diisocyanate, 2,4-tolylene diisocyanate (TDI), naphthalene-1,4-diisocyanate, diphenylmethane-4,4'-diisocyanate (MDI), 3,3'-dimethoxy-biphenyl diisocyanate, 3,3'-dimethyl diphenylmethane-4,4'-diisocyanate, m-xylylene diisocyanate (XDI), p-xylylene diisocyanate, 4-chloroxylene-1,3-diisocyanate, 2-methylxylylene-1,3-diisocyanate, 4,4'-diphenylpropane diisocyanate, 4,4'-diphenylhexafluoropropane diisocyanate, trimethylene diisocyanate, hexamethylene diisocyanate (HDI), propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatomethyl) cyclohexane, 1,3-bis(isocyanatomethyl) cyclohexane (HXDI), norbornene diisocyanate (NBDI), trimethylhexamethylene diisocyanate (TMHDI), lysine diisocyanate, and 1,3-bis(2-isocyanato-2-propyl) benzene.

Among these difunctional or higher isocyanate compounds, compounds having structures represented in (8-1) to (8-24) below are preferable.

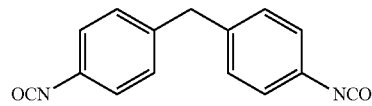

MDI
(8-1)

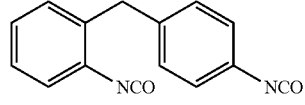

(8-2)

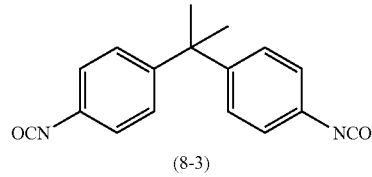

(8-3)

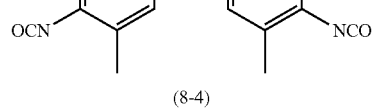

(8-4)

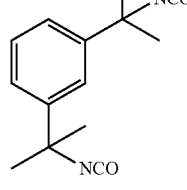

(8-5)

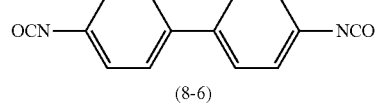

(8-6)

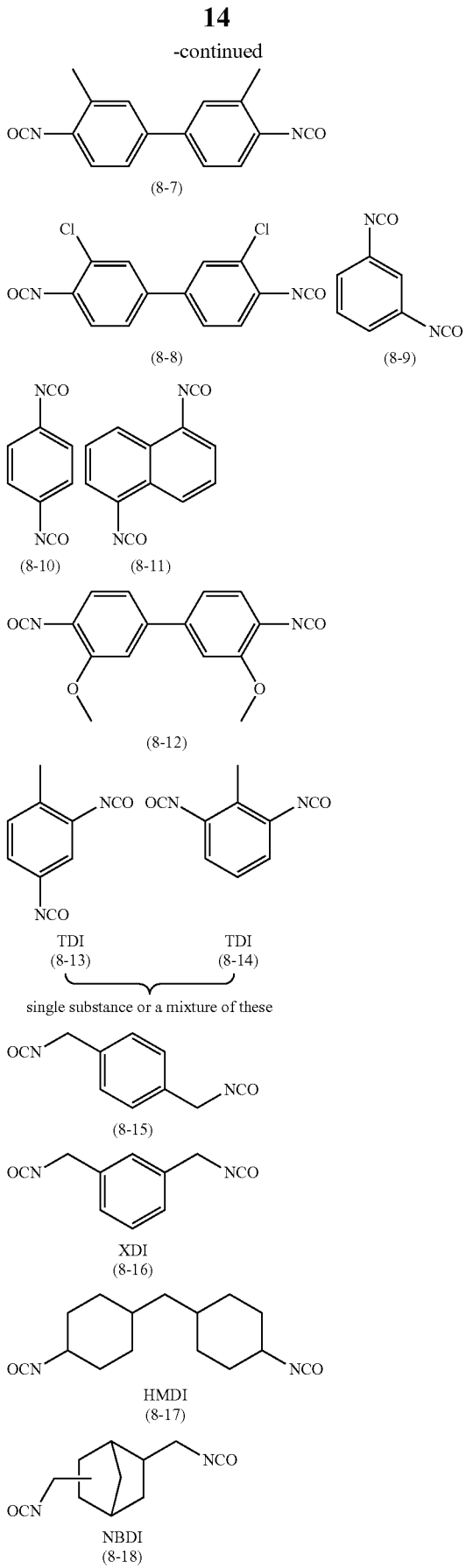

-continued

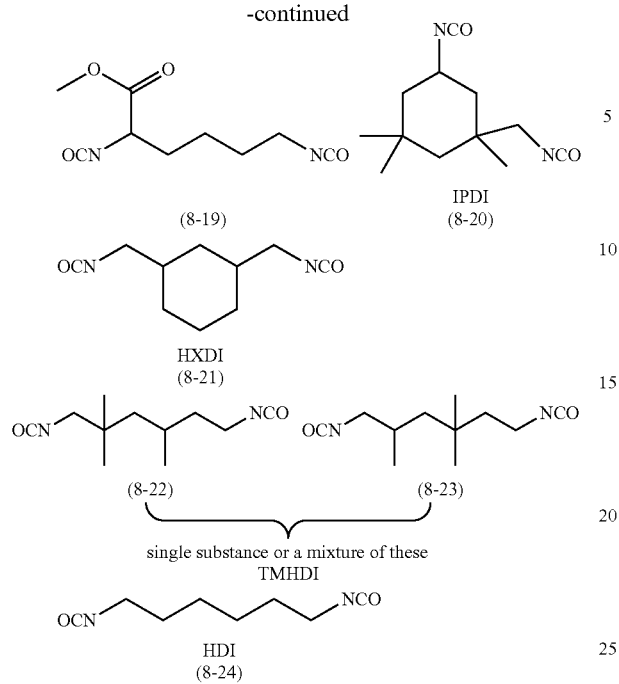

Among these difunctional or higher isocyanate compounds, isophorone diisocyanate (IPDI), hexamethylene diisocyanate (HDI), trimethylhexamethylene diisocyanate (TMHDI), 1,3-bis(isocyanatomethyl) cyclohexane (HXDI), m-xylylene diisocyanate (XDI), and icyclohexylmethane-4,4'-diisocyanate are preferable.

As the difunctional or higher isocyanate compound, a difunctional isocyanate compound derived from the compound can be also used. Examples thereof include DURANATE (registered trademark) D101, D201, and A101 (manufactured by Asahi Kasei Corporation).

The compound having three or more active hydrogen groups in a molecule is a compound having three or more groups in at least one type of group selected a hydroxyl group, a primary amino group, a secondary amino group, or a mercapto group in a molecule. Examples thereof include a compound of a structure represented (9-1) to (9-13) below. In the structure below, n represents an integer selected from 1 to 100.

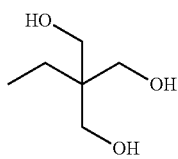
(9-1)

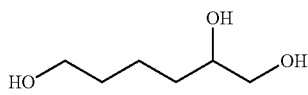
(9-2)

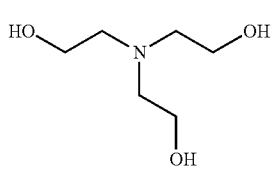
(9-3)

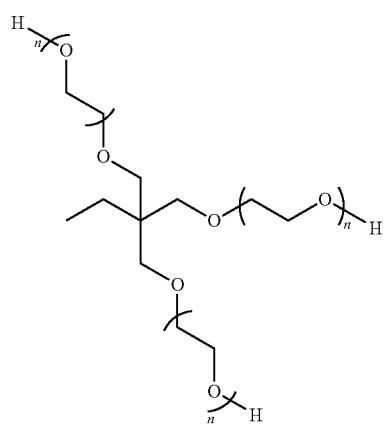
(9-4)

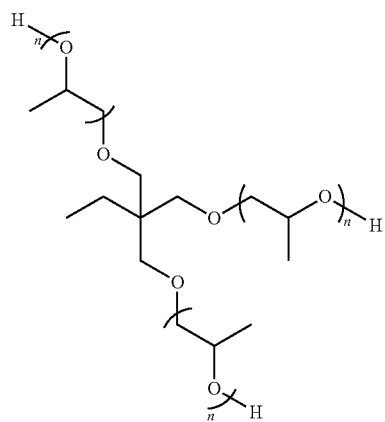
(9-5)

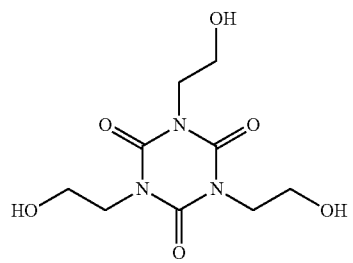
(9-6)

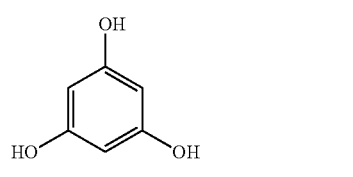
(9-7)

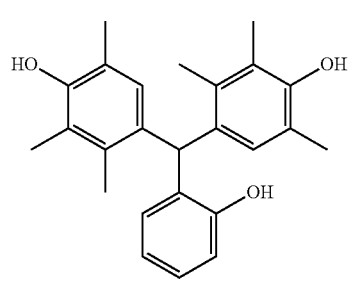
(9-8)

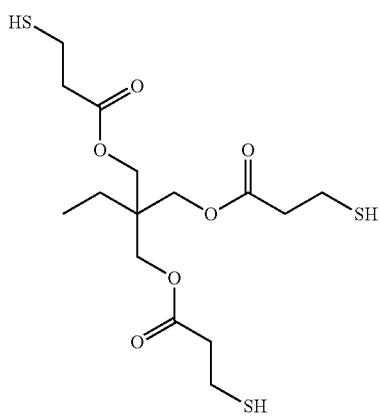 (9-9)

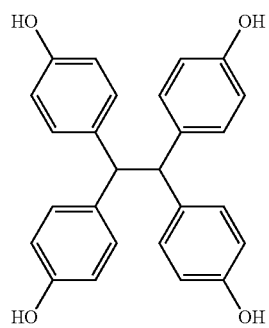 (9-12)

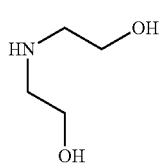 (9-10)

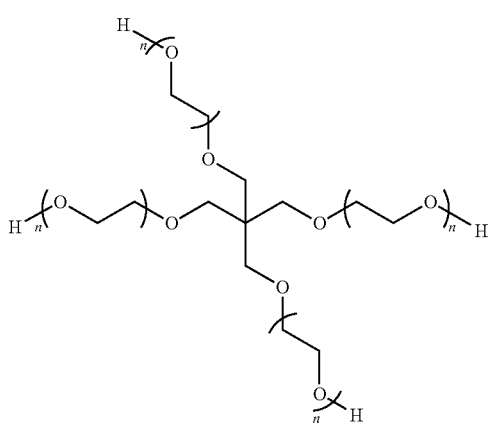 (9-11)

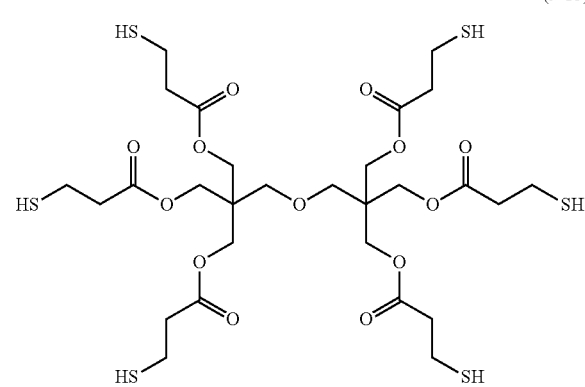 (9-13)

As the adduct-type trifunctional or higher isocyanate compounds, compounds obtained by reacting a compound having two or more active hydrogen groups in a molecule and difunctional or higher isocyanate compounds are reacted with each other in combinations presented in Table 1 below are preferably used.

TABLE 1

| | | | Composition | |
|---|---|---|---|---|
| | Polyisocyanate structure | | Compound having two or | Difunctional |
| Compound Number | Compound having two or more active hydrogen groups | Difunctional isocyanate compound | more active hydrogen groups (mol equivalent) | isocyanate compound (mol equivalent) |
| NCO 101 | Trimethylolpropane | 2,4-tolylene diisocyanate (TDI) | 1 | 4 |
| NCO 102 | | m-xylylene diisocyanate (XDI) | 1 | 4 |
| NCO 103 | | Hexamethylene diisocyanate (HDI) | 1 | 4 |
| NCO 104 | | 1,3-bis(isocyanatomethyl) cyclohexane (HXDI) | 1 | 4 |
| NCO 105 | | Isophorone diisocyanate (IPDI) | 1 | 4 |

TABLE 1-continued

| Compound Number | Polyisocyanate structure — Compound having two or more active hydrogen groups | Difunctional isocyanate compound | Composition — Compound having two or more active hydrogen groups (mol equivalent) | Composition — Difunctional isocyanate compound (mol equivalent) |
| --- | --- | --- | --- | --- |
| NCO 106 | 1,3,5-trihydroxybenzene | Hexamethylene diisocyanate (HDI) | 1 | 4 |
| NCO 107 | 1,3,5-trihydroxybenzene | Isophorone diisocyanate (IPDI) | 1 | 4 |
| NCO 108 | Pentaerythritol ethylene oxide | 1,3-bis(isocyanatomethyl)cyclohexane (HXDI) | 1 | 5 |
| NCO 109 | Pentaerythritol ethylene oxide | Isophorone diisocyanate (IPDI) | 1 | 5 |
| NCO 110 | Dipentaerythritol hexakis (3-mercaptopropionate) | Hexamethylene diisocyanate (HDI) | 1 | 7 |
| NCO 111 | Dipentaerythritol hexakis (3-mercaptopropionate) | Isophorone diisocyanate (IPDI) | 1 | 7 |
| NCO 112 | Triethanolamine | Hexamethylene diisocyanate (HDI) | 1 | 4 |
| NCO 113 | Triethanolamine | Isophorone diisocyanate (IPDI) | 1 | 4 |

The adduct-type trifunctional or higher isocyanate compound is more preferably NCO102 to NCO105, NCO107, NCO108, NCO111, and NCO113 in the compounds presented in Table 1 and even more preferably NCO103 to NCO105, and NCO109.

As the adduct-type trifunctional or higher isocyanate compound, products commercially available in the market may be used, and examples thereof include D-101A, D-102, D-103, D-103H, D-103M2, P49-75S, D-110, D-120N, D-140N, and D-160N (manufactured by Mitsui Chemicals, Inc.), DESMODUR (registered trademark) L75 and UL57SP (manufactured by Covestro Japan Ltd.), CORONATE (registered trademark) HL, HX, and L (manufactured by TOSOH Corporation), and P301-75E (manufactured by Asahi Kasei Corporation).

Among these adduct-type trifunctional or higher isocyanate compounds, D-110, D-120N, D-140N, and D-160N (manufactured by Mitsui Chemicals, Inc.) are more preferable.

Biuret Type or Isocyanurate Type

A biuret-type or isocyanurate-type trifunctional or higher isocyanate compound is preferably a compound represented by Formula 4 or 5 below.

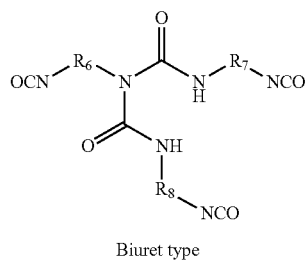

Biuret type

Formula 4

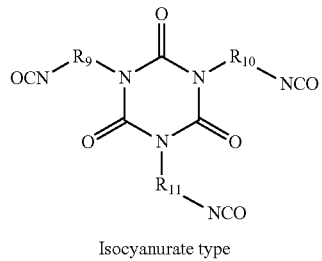

Isocyanurate type

Formula 5

In Formulae 4 and 5, $R_6$, $R_7$, $R_8$, $R_9$, $R_{10}$, and $R_{11}$ each independently represent a divalent organic group. The organic groups represented by $R_6$, $R_7$, $R_8$, $R_9$, $R_{10}$, and $R_{11}$ each independently represent an alkylene group having 1 to 20 carbon atoms that may have a substituent, a cycloalkylene group having 1 to 20 carbon atoms that may have a substituent, and an arylene group having 1 to 20 carbon atoms that may have a substituent are preferable. It is preferable that $R_6$, $R_7$, $R_8$, $R_9$, $R_{10}$, and $R_{11}$ each independently represent a group selected from the groups represented by (3-1) to (3-11), (4-1) to (4-2), and (5-1) to (5-7). * represents a bonding site.

It is more preferable that, in Formulae 4 and 5, $R_6$, $R_7$, $R_8$, $R_9$, $R_{10}$, and $R_{11}$ each independently represent a group (5-3) derived from isophorone diisocyanate (IPDI), a group (5-7) derived from hexamethylene diisocyanate (HDI), a group (5-5) derived from trimethylhexamethylene diisocyanate (TMHDI), a group (5-4) derived from 1,3-bis(isocyanatomethyl) cyclohexane, a group (5-1) derived from m-xylylene diisocyanate (XDI), and a group (5-2) derived from dicyclohexylmethane-4,4'-diisocyanate (*represents a bonding site).

As the biuret-type trifunctional or higher isocyanate compound, products commercially available in the market may be used, and examples thereof include D-165N and NP1100 (manufactured by Mitsui Chemicals, Inc.), DESMODUR (registered trademark) N3200 (manufactured by Covestro Japan Ltd.), and DURANATE (registered trademark) 24A-100 (manufactured by Asahi Kasei Corporation).

As the isocyanurate-type trifunctional or higher isocyanate compound, products commercially available in the market may be used, and examples thereof include D-127, D-170N, D-17OHN, D-172N, and D-177N (manufactured by Mitsui Chemicals, Inc.), SUMIDUR N3300, DESMO-DUR (registered trademark) N3600, N3900, and Z4470BA (manufactured by Covestro Japan Ltd.), CORONATE (registered trademark) HX and HK (manufactured by TOSOH Corporation), and DURANATE (registered trademark) TPA-100, TKA-100, TSA-100, TSS-100, TLA-100, and TSE-100 (manufactured by Asahi Kasei Corporation).

Among these biuret-type and isocyanurate-type trifunctional or higher isocyanate compounds, DURANATE (registered trademark) 24A-100 (manufactured by Asahi Kasei Corporation), D-127 (manufactured by Mitsui Chemicals, Inc.), and TKA-100 and TSE-100 (manufactured by Asahi Kasei Corporation) are more preferable.

(Compound Having Water and Two or More Active Hydrogen Groups)

The gel particles are preferably produced by reacting the trifunctional or higher isocyanate compound and a compound having water and two or more active hydrogen groups.

As the compound obtained by reacting with a trifunctional or higher isocyanate compound, water is generally used. If the trifunctional or higher isocyanate compound and water react with each other, a three-dimensional crosslinked structure having a urea bond is formed.

Examples of a compound to be caused to react with a trifunctional or higher isocyanate compound other than water include a compound having two or more active hydrogen groups, and as the compound having two or more active hydrogen groups, polyfunctional alcohol, polyfunctional phenol, polyfunctional amine a hydrogen atom on a nitrogen atom, and polyfunctional thiol can also be used.

Specific examples of polyfunctional alcohol include propylene glycol, glycerin, trimethylolpropane, and 4,4',4"-trihydroxytriphenylmethane.

Specific examples of polyfunctional amine include diethylenetriamine and tetraethylenepentamine.

Specific examples of polyfunctional thiol include 1,3-propanedithiol and 1,2-ethanedithiol.

Specific examples of polyfunctional phenol include bisphenol A.

These compounds may be used singly or two or more types thereof may be used in combination.

The compound having three or more active hydrogen groups in a molecule is also included in the compound having two or more active hydrogen groups.

(Functional groups that generate radicals by irradiation with active energy rays)

The gel particles have functional groups that generate radicals by irradiation with active energy rays.

The functional groups that generate radicals by irradiation with active energy rays may exist on the surfaces of the gel particles or may exist inside the gel particles. The functional groups that generate radicals by irradiation with active energy rays are preferably bonded to three-dimensional crosslinked structures of the gel particles via covalent bonds. The functional groups that generate radicals by irradiation with active energy rays may be bonded to three-dimensional crosslinked structures via one covalent bond or may be bonded to three-dimensional crosslinked structures via two or more covalent bonds.

With respect to the functional group that generates radicals by irradiation with active energy rays, an aspect in which all of the plurality of generated radical species are bonded to the gel particles via the covalent bonds is referred to as a "main chain-type" functional group, and an aspect in which a portion of the plurality of generated radical species is bonded to the gel particles via the covalent bonds is referred to as a "side chain-type" functional group.

If the functional groups that generate radicals by irradiation with active energy rays exist in the gel particles, radicals (initiating species) are generated by the irradiation of the active energy rays. If these initiating species propagate to the polymerizable group, the polymerizable groups are bonded to the polymerizable group existing in the adjacent gel particles, so as to form a crosslinked structure.

If the the functional groups that generate radicals by irradiation with active energy rays and the polymerizable groups exist in the gel particles, the initiating species easily propagate, and thus it is possible to form a film having excellent film hardness with high sensitivity.

The functional group that generates radicals by irradiation with active energy rays is preferably a group having at least a structure selected from an acetophenone structure represented by Formula A below, a monoacylphosphine oxide structure represented by Formula B below, and a bisacylphosphine oxide structure represented by Formula C below.

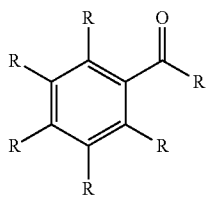

Formula A

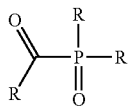

Formula B

Formula C

In Formulae A, B, and C, R's each independently represent a monovalent group or *-L-, and at least one of R's in the respective formulas is *-L-. L represents a divalent organic group, * represents a bonding site to a three-dimensional crosslinked structure.

Examples of the monovalent group represented by R include an organic group such as an aliphatic group and an aromatic group, —H, —OH, —SH, —NH, —NH₂, or -L-R₁, and —H, —OH, —SH, —NH, —NH₂, or -L-R₁ is preferable. R₁ represents a monovalent organic group and is preferably —H, —OH, —SH, —NH, or —NH₂.

The divalent organic group represented by L is preferably a divalent aliphatic group, a divalent aromatic group, a divalent heterocyclic ring group, —O—, —S—, —NH—, —CO—, —SO—, —SO₂—, or a combination thereof.

The functional group that generates radicals by irradiation with active energy rays is more preferably a group having at least one structure selected from an α-aminoalkylphenone structure represented by Formula D below, an α-hydroxyalkylphenone structure represented by Formula E below, a monoacylphosphine oxide structure represented by Formula F below, and a bisacylphosphine oxide structure represented by Formula G below.

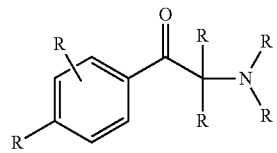

Formula D

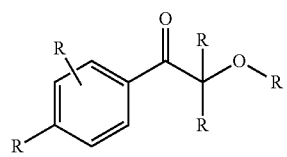

Formula E

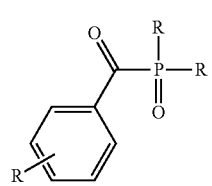

Formula F

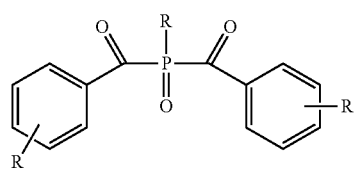

Formula G

In Formulae D, E, F, and G, R's each independently represent a monovalent group or *-L-, and at least one of R's in the respective formulas is *-L-. L represents a divalent organic group, * represents a bonding site to a three-dimensional crosslinked structure. A preferable aspect of R is the same as R in Formulae A, B, and C.

The functional group that generates radicals by irradiation with active energy rays is even more preferably a group having at least one structure selected from an α-aminoalkylphenone structure represented by Formula H below, an α-hydroxyalkylphenone structure represented by Formula I below, a monoacylphosphine oxide structure represented by Formula J below, a bisacylphosphine oxide structure represented by Formula K below, and a bisacylphosphine oxide structure represented by Formula L below. In view of suitability to LED light, the functional group that generates radicals by irradiation with active energy rays is particularly preferably a group having at least one structure selected from a monoacylphosphine oxide structure represented by Formula J below, a bisacylphosphine oxide structure represented by Formula K below, and a bisacylphosphine oxide structure represented by Formula L below.

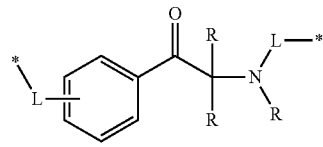

Formula H

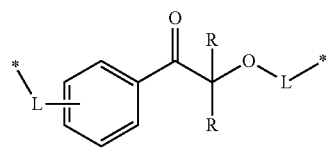

Formula I

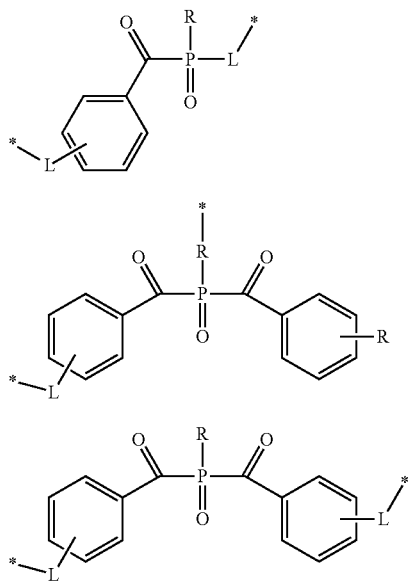

Formula J

Formula K

Formula L

In Formulae H, I, J, K, and L, R's each independently represent a monovalent group, L represents a divalent organic group, * represents a bonding site to a three-dimensional crosslinked structure. Preferable aspects of R and L are the same as R and L in Formulae A, B, and C.

In a case where the functional groups that generate radicals by irradiation with active energy rays are introduced to the gel particles, a compound having a functional group that generates radicals by irradiation with active energy rays can be used. This compound may have at least one functional group that generates radicals by irradiation with active energy rays. Among these, a compound having at least one active hydrogen group and at least one functional group that generates radicals by irradiation with active energy rays is preferable.

Hereinafter, compounds (Exemplary Compound INT-1 to INT-15) each having at least one active hydrogen group and at least one functional group that generates radicals by irradiation with active energy rays are provided. However, an embodiment of the invention is not limited to this structures.

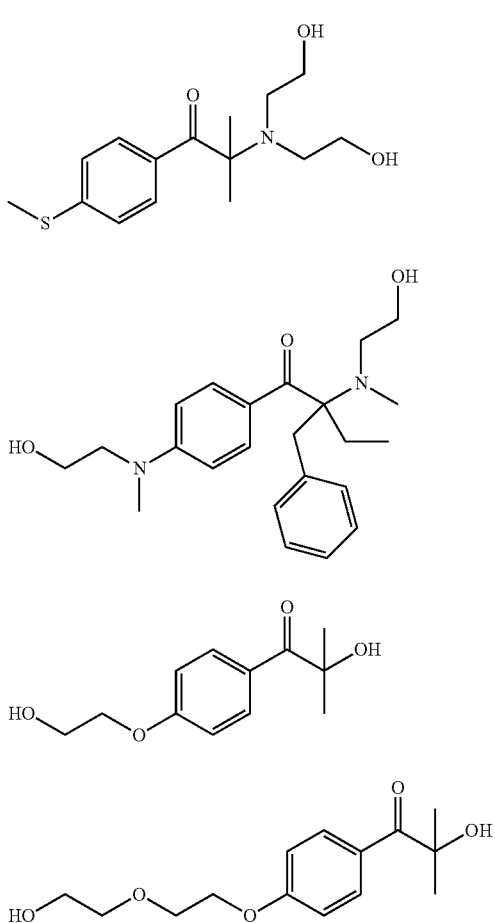

-continued

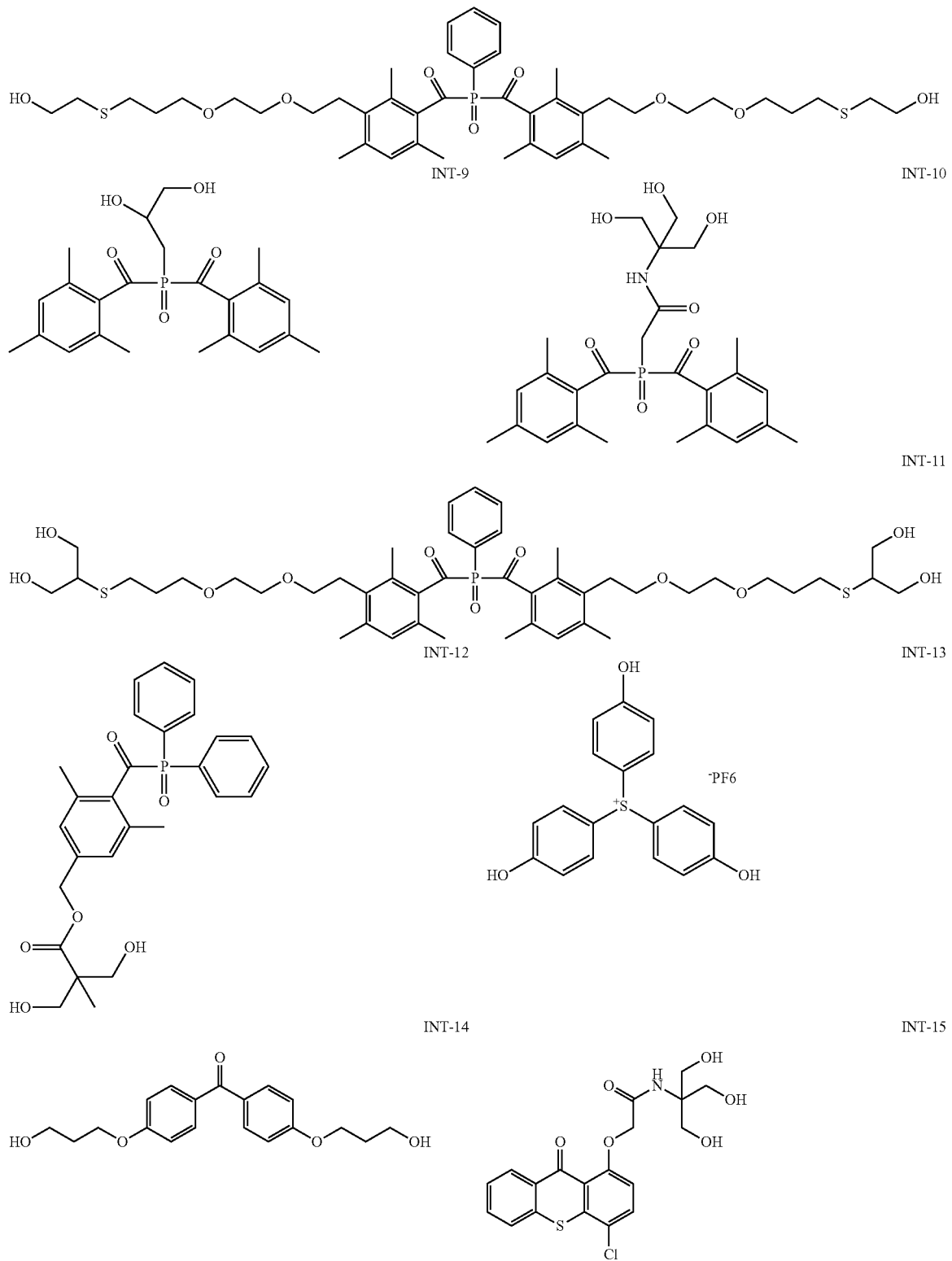

Introduction of the functional groups that generate radicals by irradiation with active energy rays to the gel particles can be performed, for example, reacting an isocyanate group of a difunctional or higher isocyanate compound represented by Synthesization Scheme 3 below and an active hydrogen atom of a compound having at least one active hydrogen group and at least one functional group that generates radicals by irradiation with active energy rays, produced an isocyanate compound to which a functional group that generates radicals by irradiation with active energy rays is introduced, and reacting the produced isocyanate compound to which the functional group that generates radicals by irradiation with active energy rays is introduced with water or the compound having two or more active hydrogen groups.

radicals by irradiation with active energy rays in the combination represented in Table 2 below, with a difunctional or higher isocyanate compound (isocyanate compound in Table 2) is preferably used.

TABLE 2

| Compound Number | Initiator | Compound Isocyanate compound | Composition Amount of active hydrogen groups of initiator with respect to NCO group of isocyanate compound (mol %) | Addition method Binding method to three-dimensional crosslinked structure |
| --- | --- | --- | --- | --- |
| INT-NCO 1 | INT-1 | NCO 103 | 40 | Side chain type |
| INT-NCO 2 | INT-2 | NCO 105 | 40 | Main chain type |
| INT-NCO 3 | INT-3 | NCO 109 | 30 | Main chain type |
| INT-NCO 4 | INT-4 | TDI | 37.5 | Main chain type |
| INT-NCO 5 | INT-4 | HXDI | 37.5 | Main chain type |
| INT-NCO 6 | INT-4 | HDI | 37.5 | Main chain type |
| INT-NCO 7 | INT-4 | IPDI | 37.5 | Main chain type |
| INT-NCO 8 | INT-4 | XDI | 37.5 | Main chain type |
| INT-NCO 9 | INT-5 | NCO 103 | 40 | Main chain type |
| INT-NCO 10 | INT-5 | NCO 104 | 40 | Main chain type |
| INT-NCO 11 | INT-5 | NCO 109 | 30 | Main chain type |
| INT-NCO 12 | INT-5 | DURANATE 24A-100 | 40 | Main chain type |
| INT-NCO 13 | INT-5 | TSE-100 | 40 | Main chain type |
| INT-NCO 14 | INT-6 | NCO 110 | 20 | Main chain type |
| INT-NCO 15 | INT-7 | DURANATE TKA-100 | 40 | Main chain type |
| INT-NCO 16 | INT-8 | NCO 103 | 40 | Main chain type |
| INT-NCO 17 | INT-8 | NCO 109 | 30 | Main chain type |
| INT-NCO 18 | INT-8 | TSE-100 | 40 | Main chain type |
| INT-NCO 19 | INT-9 | NCO 103 | 40 | Side chain type |
| INT-NCO 20 | INT-10 | IPDI | 37.5 | Side chain type |
| INT-NCO 21 | INT-11 | HDI | 40 | Side chain type |
| INT-NCO 22 | INT-11 | HXDI | 40 | Side chain type |
| INT-NCO 23 | INT-11 | TMHDI | 40 | Side chain type |
| INT-NCO 24 | INT-12 | DURANATE TKA-100 | 40 | Side chain type |
| INT-NCO 25 | INT-13 | IPDI | 37.5 | Main chain type |
| INT-NCO 26 | INT-14 | NCO-112 | 40 | Main chain type |
| INT-NCO 27 | INT-15 | HXDI | 37.5 | Main chain type |

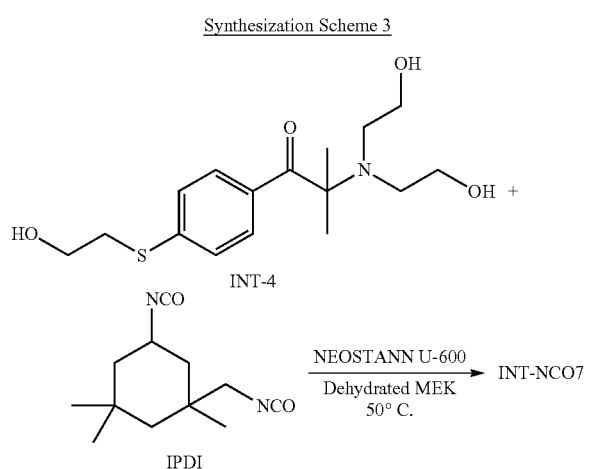

Synthesization Scheme 3

In a case where the isocyanate compound to which the functional group that generates radicals by irradiation with active energy rays is introduced when the gel particles are produced, a compound obtained by reacting a compound (initiator in Table 2) having at least one active hydrogen group and at least one functional group that generates A compound having at least one active hydrogen group and at least one functional group that generates radicals by irradiation with active energy rays may be used singly or two or more types thereof may be used in combination.

With respect to the active hydrogen group of the compound (in Table 2, indicated as an initiator) having at least one active hydrogen group and at least one functional group that generates radicals by irradiation with active energy rays and the isocyanate group of the difunctional or higher isocyanate compound (in Table 2, indicated as an isocyanate compound), the number of moles of the active hydrogen group in the compound having at least one active hydrogen group and at least one functional group that generates radicals by irradiation with active energy rays is preferably reacted in an amount of the number of moles of the isocyanate group of the difunctional or higher isocyanate compound of 0.01 times to 0.6 times (1 mol % to 60 mol %), is more preferably reacted in an amount of 0.05 times to 0.5 times (5 mol % to 50 mol %), and is even more preferably reacted in an amount of 0.1 times to 0.4 times (10 mol % to 40 mol %).

(Polymerizable Group of Gel Particles)

The Gel Particles Have Polymerizable Groups.

The gel particles may further have a polymerizable group. The gel particles may have the polymerizable group by introducing the polymerizable group to the three-dimensional crosslinked structure or may have the polymerizable group by including the polymerizable monomer inside the gel particles (voids of three-dimensional crosslinked structure). Both may coexist.

The gel particles preferably have polymerizable groups on the surfaces of the gel particles, in view of sensitivity and crosslinking properties.

If the gel particles have polymerizable groups, the gel particles adjacent to each other are bonded to each other by the irradiation of the active energy rays so as to form a crosslinked structure, and a film having high crosslinking properties and excellent film hardness can be formed.

Examples of the method of introducing the polymerizable groups to the gel particles include a method of reacting a compound having the trifunctional or higher isocyanate compound and water or the two or more active hydrogen groups, and the polymerizable compound as a polymerizable group-introduced monomer, when a three-dimensional crosslinked structure having at least one bond selected from a urethane bond and a urea bond is formed, a method of reacting the difunctional or higher isocyanate compound and the polymerizable compound as the polymerizable group-introduced monomer when the trifunctional or higher isocyanate compound is produced and reacting an isocyanate compound to which a polymerizable group is introduced in advance and a compound having water or the two or more active hydrogen groups, and a method of dissolving a polymerizable compound as a polymerizable group-introduced monomer together with a component for forming gel particles when the gel particles are produced in an oil phase component, adding a water phase component to an oil phase component, performing mixture, and performing emulsification.

Examples of the polymerizable compound used in the introduction of the polymerizable group to the gel particles include a compound having at least one active hydrogen group and an ethylenically unsaturated bond at at least one terminal.

The compound having at least one active hydrogen group and an ethylenically unsaturated bond at at least one terminal can be represented by Structural Formula (a) below.

$$L^1Lc_mZ_n \tag{a}$$

In Structural Formula (a), $L^1$ represents a m+n-valent linking group, m and n each independently represent an integer selected from 1 to 100, Lc represents a monovalent ethylenically unsaturated group, Z represents an active hydrogen group.

$L^1$ preferably divalent or higher aliphatic group, preferably divalent or higher aromatic group, preferably divalent or higher heterocyclic ring group, —O—, —S—, —NH—, —N<, —CO—, —SO—, —SO$_2$—, or a combination thereof. m and n each independently and preferably represent 1 to 50, more preferably 2 to 20, even more preferably 3 to 10, and particularly preferably 3 to 5.

Examples of the monovalent ethylenically unsaturated group represented by Lc include an allyl group, a vinyl group, an acryloyl group, a methacryloyl group, and an acrylamide group.

Z is preferably OH, SH, NH, or NH$_2$, more preferably OH or NH$_2$, and even more preferably OH.

Examples of the compound having at least one active hydrogen group and the ethylenically unsaturated bond at at least one terminal are provided below, but the invention is not limited to these structures. n in Compounds (11-3) and (12-2) represents, for example, an integer selected from 1 to 90.

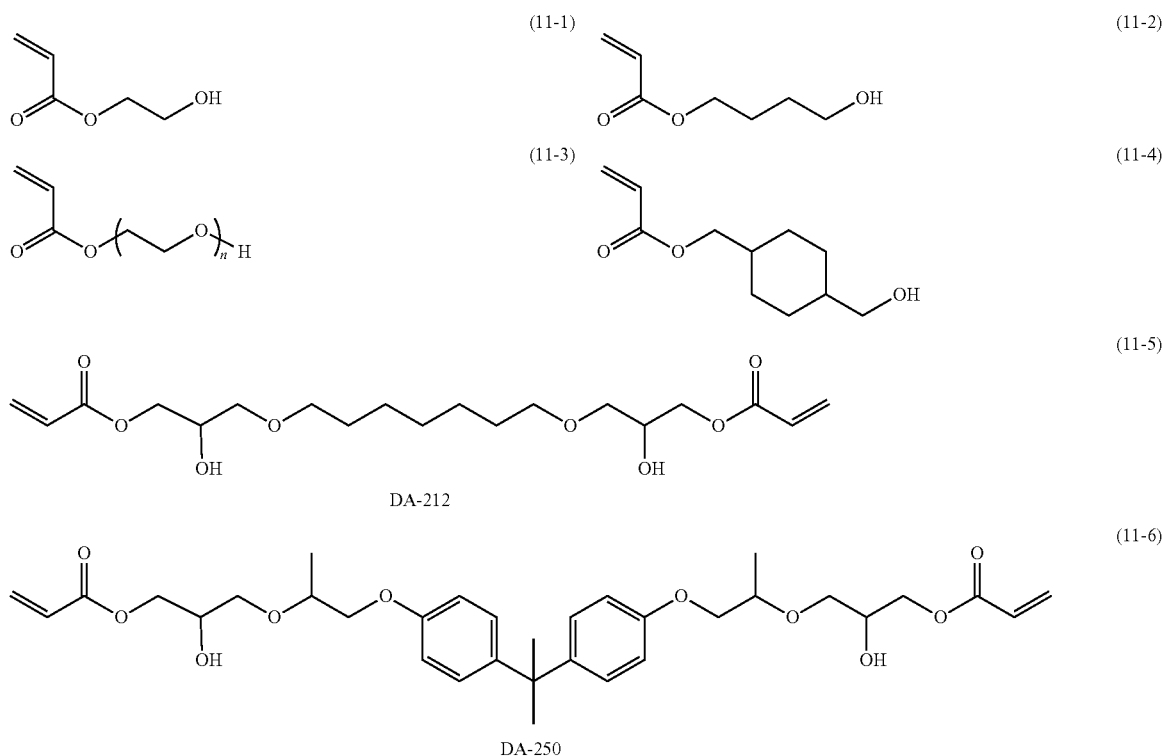

-continued

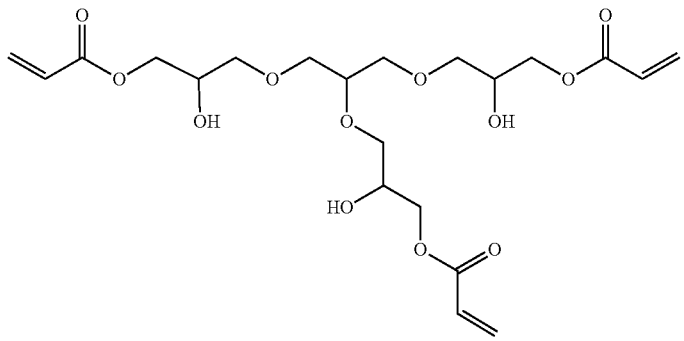

DA-314

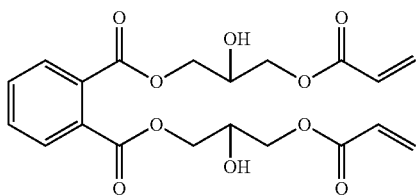

DA-721 (11-8)

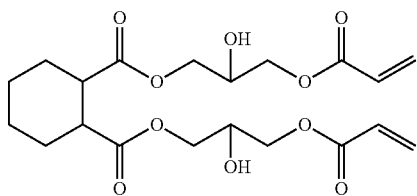

DA-722 (11-9)

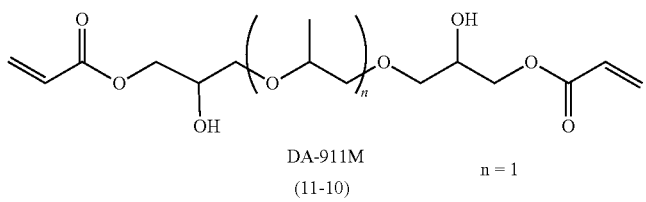

DA-911M (11-10)
n = 1

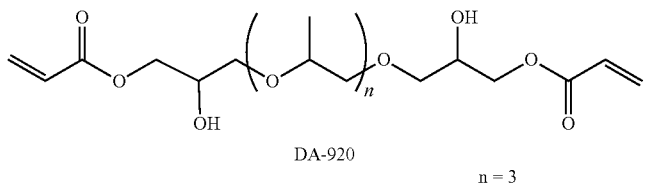

DA-920 (11-10)
n = 3

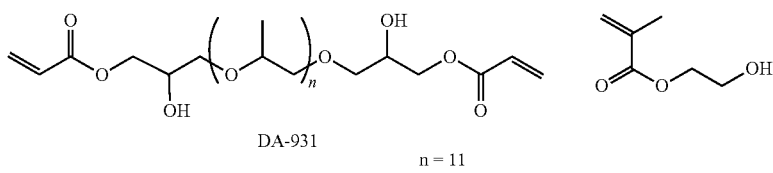

DA-931 (11-12)
n = 11

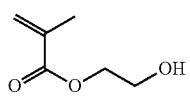

(12-1)

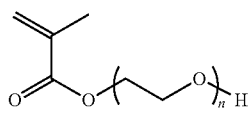

(12-2)

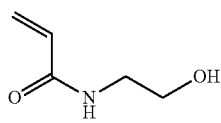

(13-1)

As the compound having at least one active hydrogen group and an ethylenically unsaturated bond at at least one terminal, products commercially available in the market may be used. Examples thereof include acrylates such as hydroxyethyl acrylate (manufactured by Osaka Organic Chemical Industry Ltd.), 4-hydroxybutyl acrylate, 1,4-cyclohexanedimethanol monoacrylate (manufactured by Nippon Kasei Chemical Co., Ltd.), BLEMMER (registered trademark) AE-90U (n=2), AE-200 (n=4.5), AE-400 (n=10), AP-150 (n=3), AP-400 (n=6), AP-550 (n=9), and AP-800 (n=13) (manufactured by NOF Corporation), and DENACOL (registered trademark) ACRYLATE DA-212, DA-250, DA-314, DA-721, DA-722, DA-911M, DA-920, and DA-931 (manufactured by Nagase ChemteX Corporation), methacrylate such as 2-hydroxyethyl methacrylate (manufactured by Kyoeisha Chemical Co., Ltd.), BLEMMER (registered trademark) PE-90 (n=2), PE-200 (n=4.5), PE-350 (n=8), PP-1000 (N=4 to 6), PP-500 (n=9), and PP-800 (n=13) (manufactured by NOF Corporation), and acrylamide (manufactured by KJ Chemicals Corporation).

Among the compounds having at least one active hydrogen group and the ethylenically unsaturated bond at at least one terminal, hydroxyethyl acrylate (manufactured by Osaka Organic Chemical Industry Ltd.), AE-400 (n=10), AP-400 (n=6) (manufactured by NOF Corporation), DENACOL (registered trademark) ACRYLATE DA-212 (manufactured by Nagase ChemteX Corporation), and PP-500 (n=9) (manufactured by NOF Corporation) are preferable.

The introduction of the polymerizable group to the gel particles can be performed by reacting an isocyanate group of a trifunctional or higher isocyanate compound as represented by Synthesization Scheme 4 below and an active hydrogen group of a compound having at least one active hydrogen group and an ethylenically unsaturated bond at at least one terminal so as to produce the isocyanate compound to which the polymerizable group is introduced and reacting the produced isocyanate compound to which the polymerizable group is introduced and the compound having two or more active hydrogen groups with each other.

Synthesization Scheme 4

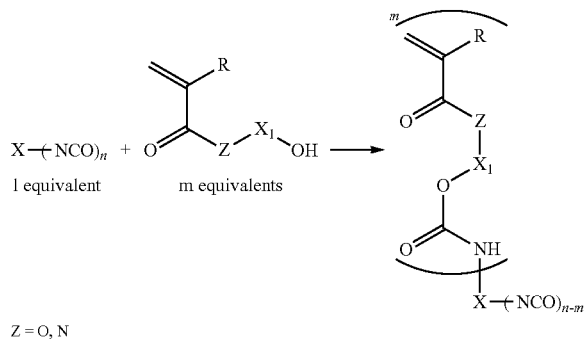

Z = O, N (Hydrophilic Group on Surface of Gel Particles)

The gel particles preferably further has hydrophilic groups on surfaces thereof.

If the gel particles have hydrophilic groups on the surface thereof, dispersibility in the aqueous medium is further improved. Therefore, in a case where gel particles are applied to the ink composition or the photosensitive composition, dispersibility of the gel particles in the ink composition or the like can be further improved.

In the gel particles, the hydrophilic groups may exist as portions of the three-dimensional crosslinked structure and may exist as portions except for the three-dimensional crosslinked structure.

Here, the expression "hydrophilic groups exist as portions of the three-dimensional crosslinked structure" means that the hydrophilic groups form covalent bonds with portions other than the hydrophilic groups of the three-dimensional crosslinked structure.

The expression "hydrophilic groups exist as portions other than the three-dimensional crosslinked structure" means that gel particles include an organic compound having a hydrophilic group independently from the three-dimensional crosslinked structure.

Examples of the hydrophilic group existing on the surface portions of the gel particles include a carboxylic acid group, a salt of a carboxylic acid group, a phosphonic acid group, a salt of a phosphonic acid group, a phosphoric acid group, a salt of a phosphoric acid group, a sulfonic acid group, a salt of a sulfonic acid group, a sulfuric acid group, a salt of a sulfuric acid group, a group having a polyether structure and a group having a betaine structure. In this specification, the "hydrophilic group" is different from the active hydrogen group (a hydroxyl group, a primary amino group, a secondary amino group, and a mercapto group).

A salt of a carboxylic acid group, a salt of a sulfonic acid group, a salt of a sulfuric acid group, a salt of a phosphonic acid group, and a salt of a phosphoric acid group may be salts formed in the course of production or neutralization of the gel particles. In a case where the gel particles have hydrophilic groups on the surface thereof, the gel particles may have only one type of hydrophilic group or may have two or more types thereof.

The hydrophilic groups that are introduced to the surfaces of the gel particles are preferably at least one type selected from a group having a polyether structure, a carboxylic acid group, and a salt of a carboxylic acid group.

The introduction of the hydrophilic group to the surfaces of the gel particles can be performed by reacting the trifunctional or higher isocyanate compound and the compound having two or more active hydrogen group with the compound having the hydrophilic group. The introduction may be performed by causing the difunctional or higher isocyanate compound and the compound having the hydrophilic group area to react with each other when the trifunctional or higher isocyanate compound is produced and causing the isocyanate compound to which the hydrophilic group is introduced in advance and the compound having the two or more active hydrogen group to react with each other.

Examples of the compound having a hydrophilic group used in the introduction of the hydrophilic group to the surfaces of the gel particles include a compound having the hydrophilic group.

As the compound having the hydrophilic group, a compound having a group having a polyether structure, a compound having a carboxylic acid group and a compound having a salt of a carboxylic acid group are preferable.

Examples of the compound having a group having a polyether structure include a compound having a polyoxyalkylene chain. Specific examples thereof include polyethylene oxide, polypropylene oxide, polytetramethylene oxide, polystyrene oxide, polycyclohexylene oxide, a polyethylene oxide-polypropylene oxide block copolymer, and a polyethylene oxide-polypropylene oxide random copolymer.

Among these compounds having polyoxyalkylene chains, polyethylene oxide, polypropylene oxide, and a polyethylene oxide-polypropylene oxide block copolymer, are preferable, and polyethylene oxide is more preferable.

As the compound having a group having a polyether structure, monoether of polyethylene oxide (examples of monoether include monomethyl ether and monoethyl ether), monoester of polyethylene oxide (examples of monoester include monoacetic acid ester, and mono(meth)acrylic acid ester) are also preferable.

Specific examples of the compound having a carboxylic acid group or an ionic hydrophilic group include the followings. The compound having a carboxylic acid group or other ionic hydrophilic groups may be used by partially neutralizing an inorganic salt group such as sodium hydroxide and an organic acid group such as triethylamine.

H-1

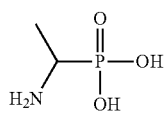

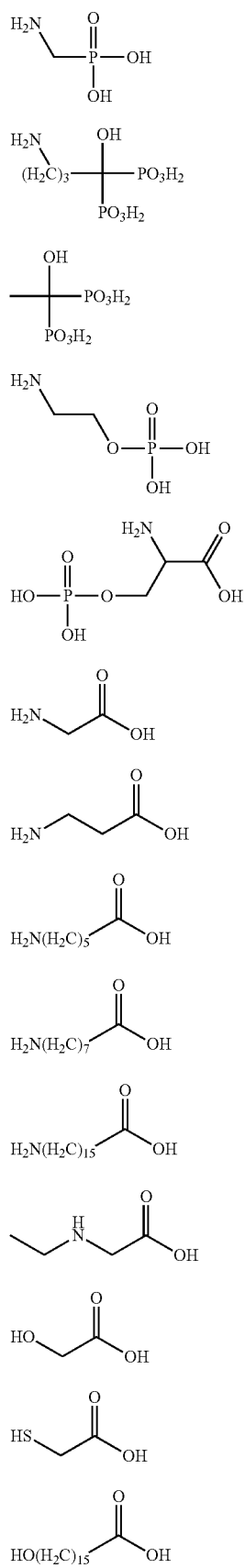
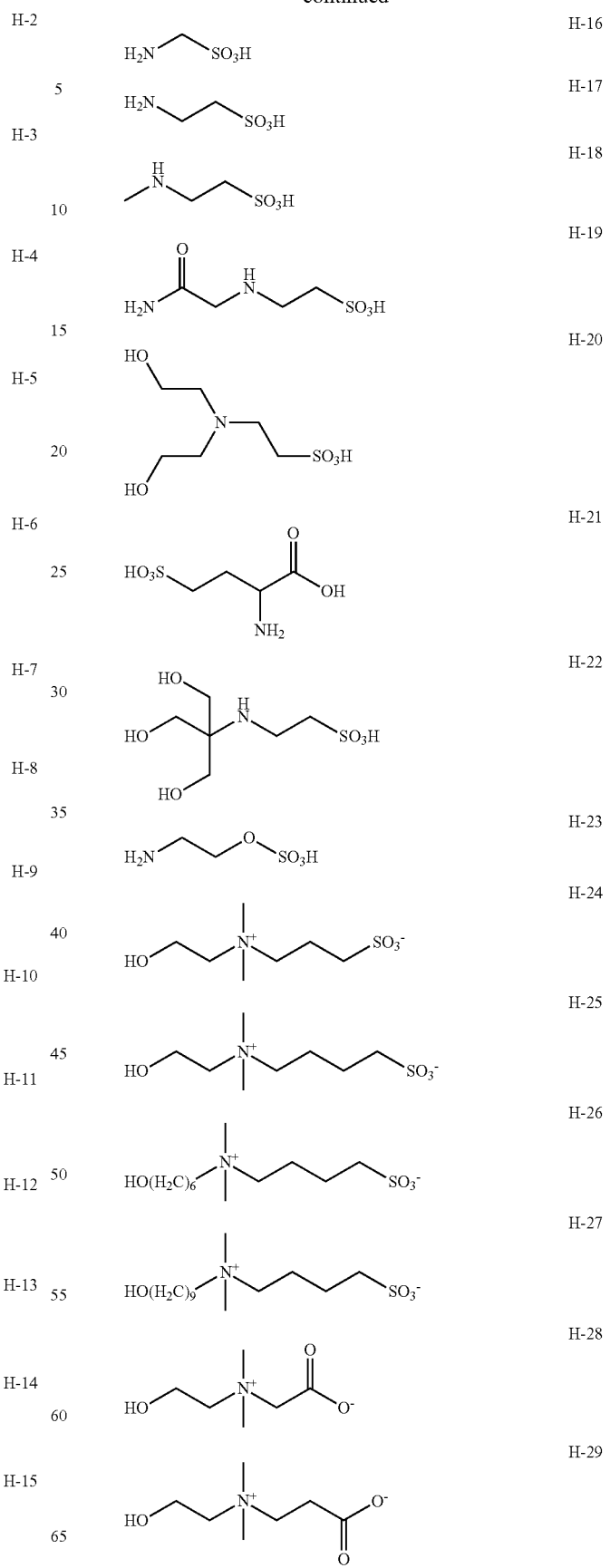

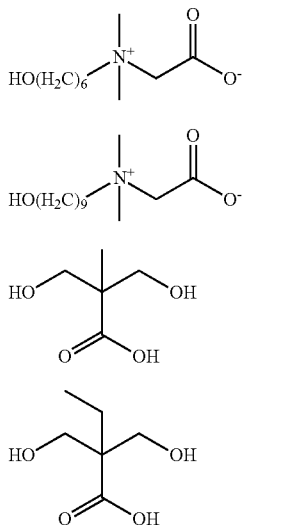

In a case where an isocyanate compound to which a hydrophilic group is introduced is used for introducing a hydrophilic group to surfaces of the gel particles, a reactant of a compound having a hydrophilic group with isophorone diisocyanate (IPDI), hexamethylene diisocyanate (HDI), trimethylhexamethylene diisocyanate (TMHDI), 1,3-bis (isocyanatomethyl) cyclohexane (HXDI), m-xylylene diisocyanate (XDI), or dicyclohexylmethane-4,4'-diisocyanate (HMDI) is preferably used.

In a case where a group having a polyether structure is introduced to the surfaces of the gel particles as a hydrophilic group, an adduct of trimethylolpropane (TMP), m-xylylene diisocyanate (XDI), and polyethylene glycol monomethyl ether (EO) (for example, TAKENATE (registered trademark) D-116N manufactured by Mitsui Chemicals, Inc.) is preferably used.

In a case where carboxylic acid groups or a salt of carboxylic acid groups are introduced to the surfaces of the gel particles, as the hydrophilic groups, it is preferable to use a reactant (an isocyanate compound including a carboxylic acid group or a salt of a carboxylic acid group) of 2,2-bis (hydroxymethyl) propionic acid (DMPA) or a salt of 2,2-bis(hydroxymethyl) propionic acid (DMPA) with isophorone diisocyanate (IPDI). As the salt of the carboxylic acid group, a sodium salt, a potassium salt, a triethylamine salt, and a dimethylethanolamine salt are preferable, and a sodium salt and a triethylamine salt are more preferable.

The added amount of the compound having the hydrophilic group used in the introduction of the hydrophilic group to the surfaces of the gel particles is preferably 0.1 mass % to 50 mass %, more preferably 0.1 mass % to 45 mass %, even more preferably 0.1 mass to 40 mass %, even more preferably 1 mass % to 35 mass %, and even more preferably 3 mass % to 30 mass % with respect to the mass of the gel particles.

(Polymerizable Monomer)

It is preferable that the gel particles further include the polymerizable monomer.

An aspect in which the gel particles include the polymerizable monomers is advantageous in view of improving curing sensitivity of the film and hardness of the film.

In a case where the gel particles include the polymerizable monomers, the polymerizable groups of the polymerizable monomers function as polymerizable groups included in the gel particles.

The polymerizable monomers (hereinafter, referred to as included polymerizable monomers) included in the gel particles can be selected from the polymerizable monomers having the radically polymerizable ethylenically unsaturated bonds.

Inclusion

In this specification, for example, the expression "polymerizable monomers are included inside the gel particles" means that the polymerizable monomers are included in the gel particles. The expression "inside the gel particles" means voids of the three-dimensional crosslinked structure.

An inclusion ratio (mass %) of the polymerizable monomers in the gel particles is preferably 50 mass % or greater, more preferably 70 mass % or greater, and more preferably 80 mass % or greater.

In a case where two or more types of polymerizable monomers are included in the water dispersion, it is preferable that the inclusion ratio of at least one polymerizable monomer is in the range described above.

Here, the inclusion ratio (mass %) of the polymerizable monomer means an amount of the polymerizable monomers included in the gel particles with respect to the total amount of the polymerizable monomers in the water dispersion in a case where the water dispersion of the gel particles is prepared and refers to a value obtained as follows. The method of producing the water dispersion of the gel particles is described below.

—Method of Measuring Inclusion Ratio (mass %) of Polymerizable Monomer—

The following operations are performed in the liquid temperature condition of 25° C.

The following operations are performed by using this water dispersion without change in a case where the water dispersion does not contain a pigment. In a case where the water dispersion contains a pigment, a pigment is first removed from the water dispersion by centrifugation, and the following operations are performed on the water dispersion from which the pigment is removed.

First, the water dispersion of the gel particles which is a measurement target of the inclusion ratio (mass %) of the polymerizable monomer is prepared, two samples (hereinafter, referred to as "Sample 1" and "Sample 2") in the same masses are gathered from the prepared water dispersion.

100 times by mass of tetrahydrofuran (THF) with respect to the total solid content of Sample 1 is added and mixed to Sample 1, so as to prepare the diluent. Centrifugation is performed on the obtained diluent, under conditions of 80,000 rpm (round per minute; the same is applied hereinafter) and 40 minutes. A supernatant (hereinafter, referred to as "Supernatant 1") generated by the centrifugation is gathered. In this operation, it is considered that all polymerizable monomers included in Sample 1 are extracted into Supernatant 1. The mass of the gathered polymerizable monomers included in Supernatant 1 is measured by liquid chromatography (for example, a liquid chromatography device manufactured by Waters Corporation). The obtained mass of the polymerizable monomers is set as "a total amount of the polymerizable monomer".

Centrifugation is performed on Sample 2 under the same conditions of the centrifugation performed on the diluent. The supernatant (hereinafter, referred to as "Supernatant 2") generated by the centrifugation is gathered. In this operation, polymerizable monomers which are not included in (that is, which are liberated from) the gel particles in Sample 2 are extracted to Supernatant 2. The mass of the gathered polymerizable monomers included in Supernatant 2 is measured by liquid chromatography (for example, a liquid chromatography device manufactured by Waters Corporation). The mass of the obtained polymerizable monomers is set as a "liberation amount of the polymerizable monomer".

The inclusion ratio (mass %) of the polymerizable monomer is obtained based on the "total amount of the polymerizable monomer" and the "liberation amount of the polymerizable monomer" by the equation below.

Inclusion ratio (mass %) of polymerizable monomers=((the total amount of polymerizable monomer−liberation amount of polymerizable monomer)/the total amount of polymerizable monomer)×100

Examples of the polymerizable monomer having a radically polymerizable ethylenically unsaturated bond used as the included polymerizable monomer include a monomer having an ethylenically unsaturated group, acrylonitrile, styrene, and various radically polymerizable monomers such as unsaturated polyester, unsaturated polyether, unsaturated polyamide, and unsaturated urethane.

The included polymerizable monomer is preferably a monomer having an ethylenically unsaturated group.

The included polymerizable monomer may be used singly or two or more types thereof may be used in combination.

The included polymerizable monomer is preferably at least one of a (meth)acrylate monomer or a vinyl ether monomer and more preferably a (meth)acrylate monomer.

Specific examples of the included polymerizable monomer include acrylate monomers such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate, bis(4-acryloxypolyethoxyphenyl) propane, polyethylene glycol diacrylate, polypropylene glycol diacrylate, dipentaerythritol tetraacrylate, trimethylolpropane triacrylate (for example, A-TMPT manufactured by Shin Nakamura Chemical Co., Ltd.), pentaerythritol triacrylate (for example, A-TMM-3L manufactured by Shin Nakamura Chemical Co., Ltd.), ditrimethylolpropane tetraacrylate (for example, AD-TMP manufactured by Shin Nakamura Chemical Co., Ltd.), dipentaerythritol pentaacrylate (for example, SR-399E manufactured by Sartomer), dipentaerythritol hexaacrylate (for example, A-DPH manufactured by Shin Nakamura Chemical Co., Ltd.), oligoester acrylate, N-methylol acrylamide, diacetone acrylamide, epoxy acrylate, isobornyl acrylate, dicyclopentenyl acrylate, dicyclopentenyloxyethyl acrylate, dicyclopentanyl acrylate, neopentyl glycol propylene oxide adduct diacrylate (NPGPODA) (for example, SR9003 manufactured by Sartomer); methacrylate monomers such as methyl methacrylate, n-butyl methacrylate, allyl methacrylate, glycidyl methacrylate, benzyl methacrylate, dimethylaminomethyl methacrylate, polyethylene glycol dimethacrylate, polypropylene glycol dimethacrylate, and 2,2-bis(4-methacryloxypolyethoxyphenyl) propane; and vinyl ether monomers such as allyl glycidyl ether, diallyl phthalate, triallyl trimellitate, cyclohexanedimethanol vinyl ether (for example, SHDVE manufactured by Shin Nakamura Chemical Co., Ltd.), and trimethylpropane trivinyl ether (for example, TMPTVE manufactured by Shin Nakamura Chemical Co., Ltd.).

Among these included polymerizable monomers, trimethylolpropane triacrylate, pentaerythritol triacrylate, ditrimethylolpropane tetraacrylate, dipentaerythritol pentaacrylate, cyclohexane dimethanol vinyl ether, trimethylpropane trivinyl ether (TMPTVE), dipentaerythritol hexaacrylate, or neopentyl glycol propylene oxide adduct diacrylate are preferable, and dipentaerythritol pentaacrylate, cyclohexane dimethanol vinyl ether, or trimethylpropane trivinyl ether are more preferable.

In view of crosslinking properties and film hardness, the included polymerizable monomer is preferably a polyfunctional polymerizable monomer, more preferably a trifunctional or higher polymerizable monomer, and even more preferably a tetrafunctional or higher polymerizable monomer.

In addition to the included polymerizable monomers described above, commercially available products or radical polymerizable and crosslinkable monomers well-known in the art disclosed in "Crosslinking Agent Handbook" edited by Shinzo Yamashita (Taiseisha, 1981); "UV/EB Curing Handbook (Raw Materials)" edited by Kiyomi Kato (Kobunshi Kankoukai, 1985); "Application and Market of UV/EB Curing Technology", p. 79, edited by RadTech (CMC, 1989); and "Polyester Resin Handbook" (The Nikkan Kogyo Shimbun Ltd., 1988) edited by Eiichiro Takiyama can be used.

As the included polymerizable monomers, for example, photocurable polymerizable monomers used in photopolymerizable compositions which are disclosed in JP1995-159983A (JP-H07-159983A), JP1995-31399A (JP-H07-31399A), JP1996-224982A (JP-H08-224982A), JP1998-863A (JP-H10-863A), JP1997-134011A (JP-H09-134011A), and JP2004-514014A are known, and these can be also applied to the gel particles.

As the included polymerizable monomers, products commercially available in the market may be used, and examples thereof include ethoxylated or propoxylated acrylate such as AH-600, AT-600, UA-306H, UA-306T, UA-3061, UA-510H, UF-8001G, and DAUA-167 (manufactured by Kyoeisha Chemical Co., Ltd.), SR444, SR454, SR492, SR499, CD501, SR502, SR9020, CD9021, SR9035, and SR494 (manufactured by Sartomer), and isocyanur monomers such as A-9300 and A-9300-1CL (manufactured by Shin Nakamura Chemical Co., Ltd.).

In addition, as the polymerizable monomer, commercially available products such as NPGPODA (neopentyl glycol propylene oxide adduct diacrylate, Sartomer), SR399E (dipentaerythritol pentaacrylate, Sartomer), ATMM-3L (pentaerythritol triacrylate, Shin Nakamura Chemical Co., Ltd.), and A-DHP (dipentaerythritol hexaacrylate, Shin Nakamura Chemical Co., Ltd.) can be suitably used.

When the gel particles are produced, the included polymerizable monomers are dissolved as a oil phase component together with components that form the gel particles, the water phase component is added to the oil phase component and mixing and emulsifying are performed, such that the included polymerizable monomers are included in the gel particles.

As the weight-average molecular weight, the molecular weight of the included polymerizable monomer is preferably 100 to 100,000, more preferably 100 to 30,000, even more preferably 100 to 10,000, even more preferably 100 to 1,000, even more preferably 100 to 900, even more preferably 100 to 800, and particularly preferably 150 to 750. The lower limit of the weight-average molecular weight of the included polymerizable monomer may be 200 or may be 250.

The weight-average molecular weight can be measured by gel permeation chromatography (GPC). The measuring method is as described below.

In the gel particles, the content of the included polymerizable monomer is preferably 0.1 mass % to 75 mass %, more preferably 0.5 mass % to 60 mass %, and even more preferably 1 mass % to 50 mass % with respect to the total solid content of the gel particles. If the content is in the range described above, it is possible to obtain a film having satisfactory crosslinking properties and satisfactory film hardness.

~Physical Properties of Gel Particles~

In view of dispersibility, the volume-average particle diameter of the gel particles is preferably 0.01 µm to 10.0 µm, more preferably 0.01 µm to 5 µm, and even more preferably 0.05 µm to 1 µm.

The volume-average particle diameter of the gel particles can be measured by a light scattering method. As the volume-average particle diameter in this specification, a value measured by a wet-type particle size distribution measuring device LA-910 (manufactured by Horiba Ltd.) is used.

Whether components other than the polymerizable monomers are included in the gel particles can be checked in the same method as the method of examining whether the polymerizable monomers are included.

However, with respect to the compound having a molecular weight of 1,000 or greater, the masses of the compounds included in Supernatants 1 and 2 are measured by gel permeation chromatography (GPC) and are respectively set as a "total amount of the compound" and a "liberation amount of the compound, so as to obtain an inclusion ratio (mass %) of the compound.

In the measurement by the gel permeation chromatography (GPC), HLC (registered trademark)-8020GPC (Tosoh Corporation) can be used as a measuring device, three items of TSK gel (registered trademark) Super Multipore HZ-H (4.6 mm ID×15 cm, Tosoh Corporation) can be used as columns, and tetrahydrofuran (THF) can be used as an eluent. As the measurement condition, the sample concentration is set as 0.45 mass %, the flow rate is set as 0.35 ml/min, the sample injection volume is set as 10 µl, the measurement temperature is set as 40° C., and a differential refractive index (RI) detector can be used.

The calibration curve can be produced from eight samples of "standard sample TSK standard, polystyrene" of Tosoh Corporation: "F-40", "F-20", "F-4", "F-1", "A-5000", "A-2500", "A-1000", and "n-propylbenzene".

<Ink Composition>

The ink composition has the polymerizable group and the functional groups that generate radicals by irradiation with active energy rays and contains gel particles having a three-dimensional crosslinked structure having at least one bond selected from a urethane bond and a urea bond, water, and a colorant.

In order to contain gel particles according to the embodiment of the invention, the ink composition suppresses occurrence of the migration of the low molecular weight components such that a film having excellent film hardness (for example, an image) can be obtained.

The ink composition can be suitably used in the ink jet recording.

In view of the dispersibility and crosslinking properties, the gel particles are preferably contained by 1 mass % to 50 mass %, are more preferably contained by 3 mass % to 40 mass %, are even more preferably contained by 5 mass % to 35 mass % in a solid content of the gel particles with respect to the total mass of the ink composition.

In a case where compounds such as the polymerizable monomers are included inside the particles (voids of three-dimensional crosslinked structure), the content of the gel particles is a value also including masses of these compounds.

The total solid content of the gel particles is preferably 50 mass % or greater, more preferably 60 mass % or greater, even more preferably 70 mass % or greater, even more preferably 80 mass % or greater, and particularly preferably 85 mass % or greater with respect to the total solid content of the ink composition. The upper limit of the total solid content of the gel particles may be 100 mass % with respect to the total solid content of the ink composition. In a case where the ink composition includes solid components other than the gel particles, the upper limit thereof is preferably 99 mass % or less and more preferably 95 mass % or less.

The ink composition contains water, but the amount of water is not particularly limited. Among these, a content of water is preferably 10 mass % to 99 mass, more preferably 20 mass % to 95 mass %, even more preferably 30 mass % to 90 mass %, and even more preferably 50 mass % to 90 mass % with respect to the total mass of the ink composition.

(Colorant)

The ink composition contains at least one colorant.

The colorant is not particularly limited and can be arbitrarily selected from well-known color materials such as a pigment, a water-soluble dye, and a dispersed dye. Among these, in view of excellent weather resistance and opulent color reproducibility, the colorant more preferably includes a pigment.

—Pigment—

The pigment is not particularly limited, and can be appropriately selected depending on the purposes. Examples of the pigment include well-known organic pigments and inorganic pigments, and also include resin particles colored with a dye, a commercially available pigment dispersion, or a surface-treated pigment (for example, a dispersion obtained by dispersing a pigment as a dispersion medium in water, a liquid organic compound, or an insoluble resin and a dispersion obtained by treating a pigment surface with a resin or a pigment derivative).

Examples of the organic pigment and the inorganic pigment include a yellow pigment, a red pigment, a magenta pigment, a blue pigment, a cyan pigment, a green pigment, an orange pigment, a violet pigment, a brown pigment, a black pigment, and a white pigment.

As the yellow pigment, monoazo pigments such as C. I. Pigment yellow 1, 2, 3, 4, 5, 10, 65, 73, 74, 75, 97, 98, 111, 116, 130, 167, and 205, monoazo lake pigments such as 61, 62, 100, 168, 169, 183, 191, 206, 209, and 212, disazo pigments such as 12, 13, 14, 16, 17, 55, 63, 77, 81, 83, 106, 124, 126, 127, 152, 155, 170, 172, 174, 176, 214, and 219, an anthraquinone pigment such as 24, 99, 108, 193, and 199, monoazopyrazolone pigments such as 60, condensed azo pigments such as 93, 95, 128, and 166, isoindoline pigments such as 109, 110, 139, 173, and 185, benzimidazolone pigments such as 120, 151, 154, 175, 180, 181, and 194, azomethine metal complex pigments such as 117, 129, 150, and 153, quinophthalone pigments such as 138, and quinoxaline pigments such as 213 are preferable.

As the red pigment or the magenta pigment, monoazo lake pigments such as C. I. Pigment red 193, disazo pigments such as 38, naphthol AS pigments such as 2, 5, 8, 9, 10, 11, 12, 14, 15, 16, 17, 18, 22, 23, 31, 32, 112, 114, 146, 147, 150, 170, 184, 187, 188, 210, 213, 238, 245, 253, 256, 258, 266, 268, and 269, β-naphthol pigments such as 3, 4, and 6, β-naphthol lake pigments such as 49, 53, and 68, naphthol AS lake pigments such as 237, 239, and 247, pyrazolone pigments such as 41, BONA lake pigments such as 48, 52, 57, 58, 63, 64:1, and 200, xanten lake pigments such as 81:1, 169, and 172, thioindigo pigments such as 88, 181, and 279, perylene pigments such as 123, 149, 178, 179, 190, and 224, condensed azo pigments such as 144, 166, 214, 220, 221, 242, and 262, anthraquinone pigments such as 168, 177, 182, 226, and 263, anthraquinonelake pigments such as 83, benzimidazolone pigments such as 171, 175, 176, 185, and 208, quinacridone pigments such as 122, 202 (including a mixture with C. I. Pigment violet 19), 207, and 209, diketopyrrolopyrrole pigments such as 254, 255, 264, 270, and 272, and azomethine metal complex pigments such as 257 and 271 are preferable.

As the blue pigment or the cyan pigment, naphthol AS pigments such as C. I. Pigment blue 25, and 26, phthalocyanine pigments such as 15, 15:1, 15:2, 15:3, 15:4, 15:6, 16, 17:1, 75, and 79, dyeing lake pigments such as 1, 24:1, 56, 61, and 62, anthraquinone-based pigments such as 60, indigo pigments such as 63, and dioxazine pigments such as 80 are preferable.

As the green pigment, dyeing lake pigments such as C. I. Pigment green 1 and 4, phthalocyanine pigments such as 7 and 36, and azomethine metal complex pigments such as 8 are preferable.

As the orange pigment, monoazo pigments such as C. I. Pigment orange 1, β-naphthol pigments such as 2, 3, and 5, naphthol AS pigments such as 4, 24, 38, and 74, pyrazolone pigments such as 13 and 34, benzimidazolone pigments such as 36, 60, 62, 64, and 72, disazo pigments such as 15 and 16, β-naphthollake pigments such as 17 and 46, naphthalenesulfonic acid lake pigments such as 19, perinone pigments such as 43, quinacridone pigments such as 48 and 49, anthraquinone-based pigments such as 51, isoindolinone pigments such as 61, isoindoline-based pigments such as 66, azomethine metal complex pigments such as 68, and diketopyrrolopyrrole pigments such as 71, 73, and 81 are preferable.

As the brown pigment, BONA lake pigments such as C. I. Pigment Brown 5, condensed azo pigments such as 23, 41, and 42, and benzimidazolone pigments such as 25 and 32 are preferable.

As the violet pigment, dyeing lake pigments such as C. I. pigment violet 1, 2, 3 and 27, naphthol AS pigments such as 13, 17, 25 and 50, anthraquinone lake pigments such as 5:1, quinacridone pigments such as 19, dioxazine pigments such as 23 and 37, perylene pigments such as 29, benzimidazolone pigments such as 32, and thioindigo pigments such as 38 are preferable.

As the black pigment, indazine pigments such as C. I. Pigment black 1, carbon black which is 7, graphite which is 10, magnetite which is 11, anthraquinone pigments such as 20, and perylene pigments such as 31 and 32 are preferable.

As the white pigment, zinc oxide which is C. I. Pigment white 4, titanium oxide which is 6, zinc sulfide which is 7, zirconium oxide (zirconium white) which is 12, calcium carbonate which is 18, aluminum oxide·silicon oxide (kaolin clay) which is 19, barium sulfate which is 21 or 22, aluminum hydroxide (alumina white) which is 23, silicon oxide which is 27, and calcium silicate which is 28 are preferable.

The inorganic particles used in the white pigment may be a single substance, or may be oxide of silicon, aluminum, zirconium, titanium, and the like, or composite particles with an organic metal compound or an organic compound.

It is preferable that selection of a pigment, a dispersing agent, and a medium, a dispersion condition, and a filtration condition are set such that a volume average particle diameter of the pigment particles is preferably 0.005 µm to 0.5 µm, more preferably 0.01 µm to 0.45 µm, even more preferably 0.015 µm to 0.4 µm.

The volume-average particle diameter and the particle size distribution of the pigment particles are obtained by using a commercially available particle diameter measuring device such as a wet-type particle size distribution measuring device LA-910 (manufactured by Horiba Ltd.) and measuring a volume average particle diameter by the dynamic light scattering method.

—Water-Soluble Dye—

Examples of the water-soluble dye include an acid dye or a direct dye. The acid dye and the direct dye have structures having acidic groups as a solubilizing group. Examples of the acidic group include a sulfonic acid group and a salt thereof, a carboxylic acid group and a salt thereof, and a phosphoric acid group and a salt thereof. One acidic group or a plurality of acidic groups may be included, or the acidic groups may be combined. Examples of the chemical structure of chromophore contained in the water-soluble dye include azo-based, phthalocyanine-based, triphenylmethane-based, xanthene-based, pyrazolone-based, nitro-based, stilbene-based, quinoline-based, methine-based, thiazole-based, quinoneimine-based, indigoid-based, rhodamine-based, and anthraquinone-based structures.

The content of the colorant in the ink composition can be appropriately selected. However, the content is preferably 0.1 mass % to 30 mass % and more preferably 0.5 mass % to 20 mass % with respect to the total mass of the ink composition.

—Dispersing Agent—

In a case where a pigment is used as a colorant, when the pigment particles are prepared, a pigment dispersing agent may be used if necessary. Examples of the pigment dispersing agent that can be used include an active agent such as a higher fatty acid salt, alkyl sulfate, alkyl ester sulfate, alkyl sulfonate, sulfosuccinate, naphthalene sulfonate, alkyl phosphate, polyoxyalkylene alkyl ether phosphate, polyoxyalkylene alkyl phenyl ether, polyoxy ethylene polyoxypropylene glycol, glycerin ester, sorbitan ester, polyoxyethylene fatty acid amide, and amine oxide, a block copolymer consisting of two or more monomers selected from styrene, a styrene derivative, a vinylnaphthalene derivative, acrylic acid, acrylic acid derivative, maleic acid, maleic acid derivative, itaconic acid, an itaconic acid derivative, fumaric acid, and a fumaric acid derivative, a random copolymer, and salts thereof.

As the dispersion method of the pigment, for example, various dispersing devices such as a ball mill, a sand mill, an attritor, a roll mill, an agitator, a Henschel mixer, a colloid mill, an ultrasonic homogenizer, a pearl mill, a wet-type jet mill, and a paint shaker can be used. For the purpose of removing coarse fraction of the pigment dispersion, a centrifugal separator, and a filter are preferably used.

Components other than the components described above can be added to the ink composition, if necessary. Hereinafter, the other components are described.

(Sensitizing Agent)

It is preferable to add a sensitizing agent to the ink composition, in order to promote the decomposition by the functional groups that generate radicals by irradiation with active energy rays due to active energy rays irradiation, which the gel particles have. The sensitizing agent absorbs specific active energy rays and is in an electron excited state. The sensitizing agent that is in the electron excited state comes into contact with the functional groups that generate radicals by irradiation with active energy rays, generates actions such as electron movement, energy movement, or heat generation, and promotes chemical changes of the functional groups that generate radicals by irradiation with active energy rays, that is, decomposition and generation of radicals.

Examples of the well-known sensitizing agents that can be used together include benzophenone, thioxanthone, especially isopropylthioxanthone, anthraquinone, and a 3-acylcoumarin derivative, terphenyl, styrylketone, and 3-(aroylmethylene) thiazoline, camphorquinone, eosin, rhodamine, and erythrosine. Compounds represented by Formula (i) disclosed in JP2010-24276A or compounds represented by Formula (I) disclosed in JP1994-107718A (JP-H06-107718A) can be suitably used.

Among these, in view of suitability to LED light and reactivity with the functional groups that generate radicals by irradiation with active energy rays, as the sensitizing agent, at least one selected from thioxanthone, isopropylthioxanthone, and benzophenone is preferable, at least one selected from thioxanthone and isopropylthioxanthone is more preferable, and isopropylthioxanthone is even more preferable.

In a case where the ink composition contains a sensitizing agent, the sensitizing agent may be contained singly, or two or more types thereof may be contained in combination.

In a case where the ink composition contains the sensitizing agent, in view of improving reactivity with the functional groups that generate radicals by irradiation with active energy rays, the sensitizing agent may be included in the gel particles in a range of not deteriorating the effect of the embodiment of the invention.

In a case where the ink composition contains the sensitizing agent, the content of the sensitizing agent is preferably 0.1 mass % to 25 mass % with respect to the total mass of the ink composition.

(Polymerization Inhibitor)

In view of increasing storability, a polymerization inhibitor may be added. Examples of the polymerization inhibitor include p-methoxyphenol, hydroquinone, and methoxybenzoquinone, quinones such as phenothiazine, catechols, alkylphenols, alkylbisphenols, zinc dimethyldithiocarbamate, copper dimethyldithiocarbamate, copper dibutyldithiocarbamate, copper salicylate, thiodipropionate esters, mercaptobenzimidazole, and phosphites. p-Methoxyphenol, catechols, and quinones are preferable, and hydroquinone, benzoquinone, p-methoxyphenol, TEMPO, TEMPOL, cupferron Al, a tris(N-nitroso-N-phenylhydroxylamine)aluminum salt, and the like are more preferable.

(Ultraviolet Absorbing Agent)

In view of improvement of the weather resistance and fading prevention of the obtained film, an ultraviolet absorbing agent may be used in the ink composition.

Examples of the ultraviolet absorbing agent include the well-known ultraviolet absorbing agent, for example, a benzotriazole-based compound, a benzophenone-based compound, a triazine-based compound, and a benzoxazole-based compound.

(Organic Solvent)

In order to improve adhesiveness of the recording medium, organic solvents as follows may be added to the ink composition.

Alcohols (for example, methanol, ethanol, propanol, isopropanol, butanol, isobutanol, secondary butanol, tertiary butanol, pentanol, hexanol, cyclohexanol, and benzyl alcohol), Polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, and 2-methyl propanediol), Polyhydric alcohol ethers (for example, ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), Amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyl diethylenetriamine, and tetramethylpropylenediamine), Amides (for example, formamide, N,N-dimethylformamide, and N,N-dimethylacetamide), Heterocyclic rings (for example, 2-pyrrolidone, N-methyl-2-pyrrolidone, cyclohexylpyrrolidone, 2-oxazolidone, 1,3-dimethyl-2-imidazolidinone, and γ-butyrolactone)

Sulfoxides (for example, dimethylsulfoxide),

Sulfones (for example, sulfolane),

Other (urea, acetonitrile, and acetone)

The content of the solvent is preferably 1 mass % to 30 mass % and is more preferably added in the range of 1 mass % to 20 mass % with respect to the total mass of the ink composition.

(Surfactant)

A surfactant may be added to the ink composition. The surfactant used in the ink composition is differentiated from a surfactant used when the gel particles are produced.

Examples of the surfactant include surfactants disclosed in JP1987-173463A (JP-S62-173463A) and JP1987-183457A (JP-S62-183457A). Examples thereof include nonionic surfactants such as polyoxyethylene alkyl ethers, polyoxyethylene alkyl allyl ethers, acetylene glycols, polyoxyethylene, polyoxypropylene block copolymers, and siloxanes.

Instead of the surfactant, organic fluoro compounds may be used.

The organic fluoro compound is preferably hydrophobic. Examples of the organic fluoro compound include a fluorine-based surfactant, an oily fluorine-based compound (for example, fluorine oil), and a solid-like fluorine compound resin (for example, tetrafluoroethylene resin) and examples thereof include organic fluoro compounds disclosed in JP1982-9053B (JP-S57-9053B) (Sections 8 to 17), JP1987-135826A (JP-562-135826A).

In view of film properties, adhesiveness, and jettability control, the ink composition may contain a polymerizable compound, a water-soluble resin, and a water dispersible resin outside the gel particles, if necessary.

The expression "the ink composition contains a polymerizable compound outside the gel particles" means that the ink composition contains a polymerizable compound that is not included in the gel particles. The same is applied to a case where the water-soluble resin and the water dispersible resin are contained outside the gel particles.

(Polymerizable Compound that can be Contained Outside the Gel Particles)

The ink composition preferably contains the polymerizable compound outside the gel particles.

If the ink composition contains the polymerizable compound outside gel particles, crosslinking efficiency between gel particles can be improved, and a film having higher film hardness can be formed. Crosslinking highly efficiently proceeds with respect to active energy rays (light) having low exposure illuminance (for example, 40 mJ/cm$^2$ to 70 mJ/cm$^2$).

Examples of the polymerizable compound include compounds having ethylenically unsaturated groups and radical polymerizable compounds such as acrylonitrile, styrene, unsaturated polyester, unsaturated polyether, unsaturated polyamide, and unsaturated urethane.

Among these, as the polymerizable compound, a compound having an ethylenically unsaturated group is preferable, and a compound having a (meth)acryloyl group is particularly preferable. The polymerizable compound is preferably water-soluble or water dispersible polymerizable compounds.

The expression "water-soluble" means properties in which in a case where the compound is dried at 105° C. for two hours, a dissolution amount to 100 g of distilled water at 25° C. exceeds 1 g.

structure, a polypropylene glycol structure, a carboxyl group, and a salt of a carboxy group is preferable.

In view of the water solublility or water dispersibility, as the polymerizable compound that can be contained outside the gel particles, for example, at least one selected from (meth)acrylic acid, sodium (meth)acrylate, potassium (meth)acrylate, N,N-dimethylacrylamide, N,N-diethylacrylamide, morpholine acrylamide, N-2-hydroxyethyl (meth)acrylamide, N-vinyl pyrrolidone, N-vinyl caprolactam, 2-hydroxyethyl (meth)acrylate, 3-hydroxypropyl (meth)acrylate, 2-hydroxypropyl (meth)acrylate, glycerin monomethacrylate, N-[tris(3-acryloylaminopropyloxymethylene)methyl]acrylamide, diethylene glycol bis(3-acryloylaminopropyl) ether, polyethylene glycol di(meth)acrylate, polypropylene glycol di(meth)acrylate, a compound represented by Formulae (a) to (d) below, and ethoxylated trimethylolpropane triacrylate (for example, SR9035 manufactured by Sartomer) is preferable, and at least one selected from (meth)acrylic acid, N,N-dimethylacrylamide, N-2-hydroxyethyl (meth)acrylamide, 2-hydroxyethyl (meth)acrylate, glycerin monomethacrylate, N-[tris(3-acryloylaminopropyloxymethylene)methyl]acrylamide, diethylene glycol bis(3-acryloylaminopropyl) ether, polyethylene glycol di(meth)acrylate, and polypropylene glycol di(meth)acrylate, a compound represented by Formulae (a) to (d) below, and ethoxylated trimethylolpropane triacrylate (for example, SR9035 manufactured by Sartomer) is more preferable.

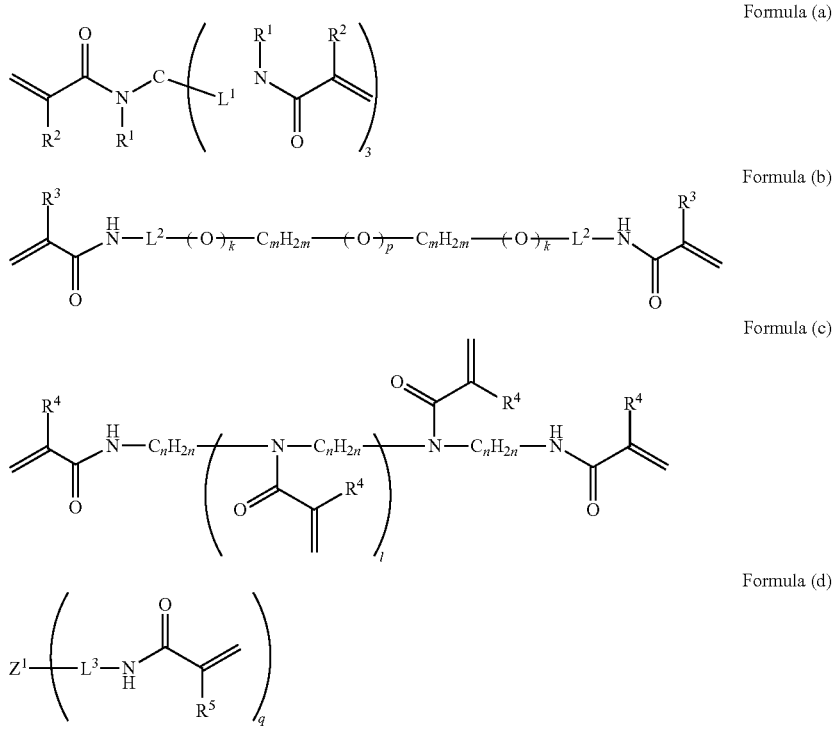

The expression "water dispersible" means properties which are water insoluble and dispersed in water. Here, the expression "water insoluble" means that in a case where the compound is dried at 105° C. for two hours, a dissolution amount to 100 g of distilled water at 25° C. is 1 g or less.

In view of water solubility or water dispersibility, as the polymerizable compound, a compound having at least one selected from an amide structure, a polyethylene glycol In Formula (a), a plurality of $R^1$'s each independently represent a hydrogen atom, an alkyl group, an aryl group, or a heterocyclic ring group, a plurality of $R^2$'s each independently represent a hydrogen atom or a methyl group, and a plurality of $L^1$'s each independently represent a single bond or a divalent linking group.

In Formula (b), a plurality of $R^3$'s each independently represent a hydrogen atom or a methyl group, a plurality of $L^2$'s each independently represent an alkylene group having 1 to 8 carbon atoms, a plurality of k's and p's each independently represent 0 or 1, and a plurality of m each independently represent an integer of 0 to 8. Here, at least one of k or p is 1.

In Formula (c), a plurality of $R^4$ each independently represent a hydrogen atom or a methyl group, a plurality of n's each independently represent an integer of 1 to 8, and l represents an integer of 0 or 1.

In Formula (d), $Z^1$ represents a residue obtained by q hydrogen atoms from a hydroxyl group of polyol, q represents an integer of 3 to 6, a plurality of $R^5$ each independently represent a hydrogen atom or a methyl group, a plurality of C's each independently represent an alkylene group having 1 to 8 carbon atoms.

Specific examples of the compound represented by Formulae (a) to (d) include compounds represented by AM-1 to AM-4 below.

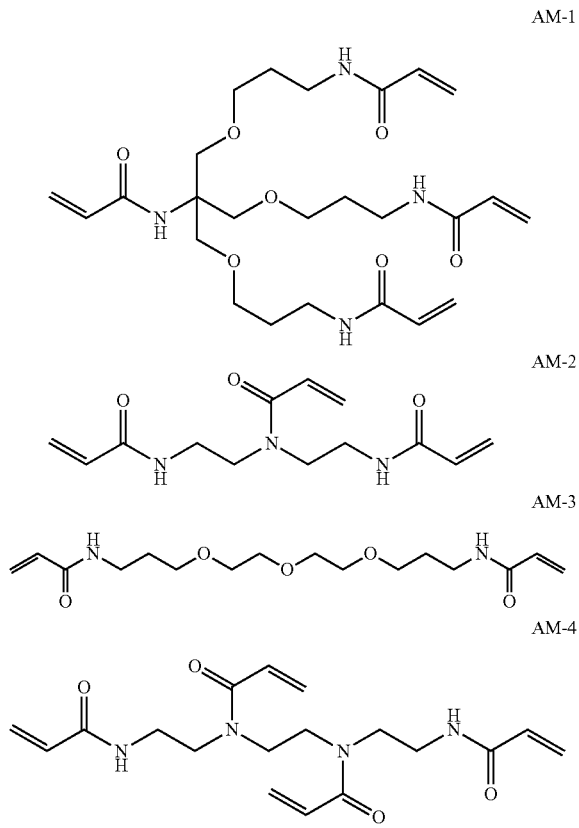

AM-1 to AM-4 can be synthesized by the method disclosed in JP05591858B.

(Water-Soluble Resin or Water Dispersible Resin that can be Contained Outside the Gel Particles)

The structures of the water-soluble resin or the water dispersible resin are not particularly limited, and may be any structures. Examples of the water-soluble resin or the water dispersible resin include structures such as a chain-shaped structure, a ramified (branched) structure, a star-shaped structure, a crosslinked structure, and a mesh-shaped structure.

The expression "water-soluble" in the water-soluble resin has the same meaning as that of the expression "water-soluble" in the "water-soluble polymerizable compound", and the expression "water dispersible" in the water dispersible resin has the same meaning as that of the expression "water dispersible" in the "water dispersible polymerizable compound".

As the water-soluble resin or the water dispersible resin, a resin having a functional group selected from a carboxyl group, a salt of a carboxy group, a sulfo group, a salt of a sulfo group, a sulfuric acid group, a salt of a sulfuric acid group, a phosphonic acid group, a salt of a phosphonic acid group, a phosphoric acid group, a salt of a phosphoric acid group, an ammonium base, a hydroxyl group, a carboxylic acid amide group, and an alkyleneoxy group is preferable.

As the counter cation of the salt, an alkali metal cation such as sodium and potassium, an alkali earth metal cation such as calcium and magnesium, an ammonium cation, or a phosphonium cation is preferable, an alkali metal cation is particularly preferable.

As an alkyl group included in an ammonium group of an ammonium base, a methyl group or an ethyl group is preferable.

As the counter anion of the ammonium base, a halogen anion such as chlorine and bromine, a sulfate anion, a nitrate anion, a phosphate anion, a sulfonate anion, a carboxylate anion, or a carbonate anion is preferable, and a halogen anion, a sulfonate anion, or a carbonate anion is particularly preferable.

As a substituent on the nitrogen atom of the carboxylic acid amide group, an alkyl group having 8 or less carbon atoms is preferable, and an alkyl group having 6 or less carbon atoms is particularly preferable.

The resin having an alkyleneoxy group preferably has an alkyleneoxy chain consisting of repetition of an alkyleneoxy group. The number of the alkyleneoxy groups included in the alkyleneoxy chain is preferably 2 or greater and particularly preferably 4 or greater.

~Preferably Physical Properties of Ink Composition~

In a case where the ink composition is set as 25° C. to 50° C., the ink composition preferably has a viscosity of 3 mPa·s to 15 mPa·s and more preferably has a viscosity of 3 mPa·s to 13 mPa·s. Particularly, as the ink composition, the viscosity of the ink composition at 25° C. is preferably 50 mPa·s or less. If the viscosity of the ink composition is in the range described above, high jetting stability in a case where the ink composition is applied to the ink jet recording can be realized. The viscosity change of the ink composition in a case where the ink composition is applied to the ink jet recording gives great influence on a change of liquid droplet sizes and a change of a liquid droplet ejection rate and thus generates image quality deterioration. Accordingly, it is required that the temperature of the ink composition at the time of ejection is constantly maintained. Accordingly, it is appropriate that the control width of the temperature of the ink composition is preferably ±5° C. of a set temperature, more preferably ±2° C. of a set temperature, and even more preferably ±1° C. of a set temperature.

The viscosity of the ink composition is measured by using a viscometer: VISCOMETER TV-22 (manufactured by Toki Sangyo Co., Ltd.).

<Photosensitive Composition>

The photosensitive composition has the polymerizable group and the functional groups that generate radicals by irradiation with active energy rays and contains gel particles having a three-dimensional crosslinked structure including at least one bond selected from a urethane bond and a urea bond, and water.

As the gel particles and water in the photosensitive composition, the same gel particles and water used in the ink composition can be used.

In order to cause the gel particles according to the embodiment of the invention to be contained, the photosensitive composition suppresses the occurrence of the migration of the low molecular weight components and thus a film having excellent film hardness can be obtained.

In view of the film hardness, it is preferable that the photosensitive composition further contains the polymerizable compound outside the gel particles.

Since the film formed by the irradiation of the active energy rays has excellent film hardness, the photosensitive composition can be suitably used in various uses such as a coating agent, an adhesive, and a paint, starting from the use as the ink composition.

<Method of Producing Water Dispersion of Gel Particles>

The method of producing water dispersion of the gel particles is not particularly limited, as long as water dispersion of gel particles including gel particles having the configurations described above and water can be produced.

In view of easily obtaining water dispersion of the gel particles, a method of producing water dispersion of the gel particles according to the embodiment described below is preferable as a method of producing water dispersion of the gel particles.

A method of producing water dispersion of the gel particles according to the embodiment (hereinafter, referred to as a "producing method of the embodiment") includes an emulsification step of obtaining an emulsion by mixing and emulsifying any one oil phase component selected from an oil phase component (hereinafter, referred to as the "oil phase component A") including a trifunctional or higher isocyanate compound having a functional groups that generate radicals by irradiation with active energy rays, a polymerizable monomer, and an organic solvent, an oil phase component (hereinafter, referred to as the "oil phase component B") including a trifunctional or higher isocyanate compound having a functional groups that generate radicals by irradiation with active energy rays, a trifunctional or higher isocyanate compound having a polymerizable group, and an organic solvent, an oil phase component (hereinafter, referred to as the the "oil phase component C") including an trifunctional or higher isocyanate compound having a polymerizable group and a functional groups that generate radicals by irradiation with active energy rays, a polymerizable monomer, and an organic solvent, and an oil phase component (hereinafter, referred to as the "oil phase component D") including a trifunctional or higher isocyanate compound having a functional groups that generate radicals by irradiation with active energy rays, a trifunctional or higher isocyanate compound having a polymerizable group, a polymerizable monomer, and an organic solvent and a water phase component including water; and a gelation step gelling the emulsion by heating.

In view of easily producing water dispersion of the gel particles, the oil phase component A, the oil phase component B, and the oil phase component D are preferable as the oil phase component.

If necessary, the producing method of the embodiment may have other steps.

According to the producing method of the embodiment, water dispersion of the gel particles described above can be easily produced.

Hereinafter, respective steps in the producing method of the embodiment are specifically described.

Specific examples of the components used in the respective steps, and preferable aspects are as described in the section of the gel particles, and thus the descriptions thereof are omitted.

(Emulsification Step)

The emulsification step is a step of obtaining an emulsion by mixing and emulsifying any one oil phase component selected from the oil phase component A, the oil phase component B, the oil phase component C, and the oil phase component D, and a water phase component including water.

In the emulsification step, if, any one oil phase component selected from the oil phase component A including a trifunctional or higher isocyanate compound having a functional group that generates radicals by irradiation with active energy rays, a polymerizable monomer, and an organic solvent, the oil phase component B including a trifunctional or higher isocyanate compound having a functional groups that generates radicals by irradiation with active energy rays, a trifunctional or higher isocyanate compound having a polymerizable group, and an organic solvent, the oil phase component C including a trifunctional or higher isocyanate compound having a polymerizable group and a functional group that generates radicals by irradiation with active energy rays, a polymerizable monomer, and an organic solvent, and the oil phase component D including a trifunctional or higher isocyanate compound having a functional group that generates radicals by irradiation with active energy rays, a trifunctional or higher isocyanate compound having a polymerizable group, a polymerizable monomer, and an organic solvent is used as the oil phase component, the gel particles having a polymerizable group and a functional group that generates radicals by irradiation with active energy rays can be finally obtained at least on the surface or on the surface and near the surface.

It is considered that the trifunctional or higher isocyanate compounds having the polymerizable monomers that the oil phase component A, the oil phase component B, the oil phase component C, and the oil phase component D include and the polymerizable groups that the oil phase component B, the oil phase component C, and the oil phase component D include become polymerizable groups existing on the surfaces of the gel particles or on the surfaces or the portions near the surfaces.

Examples of the organic solvent included in the oil phase component include ethyl acetate and methyl ethyl ketone.

In addition to the components, the oil phase component may include other components, if necessary.

Examples of the other components include the compound having hydrophilic groups.

If the oil phase component includes the compound having the hydrophilic group, it is possible to obtain gel particles having hydrophilic groups on the surfaces thereof.

The trifunctional or higher isocyanate compound is as described in the section of the gel particles. Among these, the trifunctional or higher isocyanate compound is preferably an isocyanate compound derived from at least one selected from isophorone diisocyanate, hexamethylene diisocyanate, trimethylhexamethylene diisocyanate, 1,3-bis(isocyanatomethyl) cyclohexane, m-xylylene diisocyanate, and dicyclohexylmethane 4,4'-diisocyanate.

The water phase component may include other components in addition to water, if necessary.

In a case where the oil phase component includes the compound having at least one hydrophilic group selected from a carboxy group, a sulfo group, a sulfonic acid group, a phosphonic acid group, and a phosphoric acid group as the compound having the hydrophilic group, the water phase component may include a neutralizing agent.

If the oil phase component includes the compound having hydrophilic groups, and the water phase component includes the neutralizing agent, the hydrophilic groups such as a carboxy group are neutralized by mixing the oil phase component and the water phase component so as to form a salt of the carboxy group or the like. The formed salt also functions as the hydrophilic group of the gel particles. These salts have particularly excellent effect of dispersing gel particles in water.

Examples of the neutralizing agent include sodium hydroxide.

According to the producing method of the embodiment, as a raw material for forming gel particles in the three-dimensional crosslinked structure including at least one bond selected from a urethane bond and a urea bond due to reaction with the isocyanate group, in addition to water, the polyfunctional alcohol, polyfunctional phenol, polyfunctional amine having hydrogen atoms on nitrogen atoms, polyfunctional thiol, and the like may be used.

Specific examples thereof include compounds such as polyfunctional alcohol (for example, propylene glycol, glycerin, and trimethylolpropane), polyfunctional amine (for example, bis(hexamethylene) triamine, ethylenediamine, and diethylenetriamine), and polyfunctional thiol (for example, pentaerythritol tetra(3-mercaptopropionate)), and polyfunctional alcohol is particularly preferable.

These compounds may be used singly and two or more types thereof may be used in combination. These compounds are added to the oil phase component and/or the water phase component according to the solubility thereof.

According to the producing method of the embodiment, in addition to the raw materials, a surfactant is preferably used. Examples of the surfactant include the surfactant.

Generally, it is considered that a surfactant having a comparatively long-chained hydrophobic group is excellent as the surfactant used in the emulsification. For example, as the surfactant, surfactants disclosed in "Surfactant Handbook" (Ichiro Nishi et al., published by Sangyo Tosho Co., Ltd., 1980). Specifically, an alkali metal salt such as an alkyl sulfuric acid salt, alkyl sulfonic acid, and alkyl benzene sulfonic acid is preferable, and an alkyl sulfuric acid ester salt is more preferable.

In view of dispersion stability, an alkyl chain length of an alkyl sulfuric acid ester salt is preferably 12 or greater and more preferably 16 or greater.

Examples of the surfactant include a sodium salt and a polycarboxylic acid salt of an aromatic sulfonic acid formalin condensate such as a sodium naphthalenesulfonate formalin condensate which is a polymer-type surfactant and polyoxyethylene-1-(allyloxymethyl) alkyl ether sulfate and polyoxyethylene nonyl propenyl phenyl ether sulfate which are reactive surfactants.

The polymer-type surfactant and the reactive surfactant can be particularly suitably used, in view of suppression of the migration.

The surfactant may be added to any one of the oil phase component and the water phase component, but the surfactant generally has low solubility to the organic solvent, and thus is added to the water phase component.

The amount of the surfactant is preferably 0.1 mass % to 5 mass % and more preferably 0.5 mass % to 3 mass % with respect to a total solid content of the oil phase component.

The total amount (hereinafter, referred to as a "total solid content") obtained by excluding the organic solvent and water from the oil phase component and the water phase component in the emulsification step corresponds to the total solid content of the produced gel particles.

The amount of the trifunctional or higher isocyanate compound having the functional groups that generate radicals by irradiation with active energy rays in the oil phase component is not particularly limited and is preferably, for example, 0.1 mass % to 25 mass % with respect to the total solid content.

The amount of the trifunctional or higher isocyanate compound having the polymerizable group in the oil phase component is not particularly limited and is preferably, for example, 10 mass % to 70 mass % with respect to the total solid content.

The amount of the trifunctional or higher isocyanate compound having the polymerizable group and the functional groups that generate radicals by irradiation with active energy rays in the oil phase component is not particularly limited, and is preferably, for example, 0.1 mass % to 25 mass % with respect to a total solid content.

In a case where the oil phase component includes the polymerizable monomer, the amount of the polymerizable monomer in the oil phase component is not particularly limited and is preferably, for example, 0.1 mass % to 75 mass % with respect to the total solid content.

The amount of the organic solvent is not particularly limited and is appropriately depending on types and amounts of the components and the like included in the oil phase component.

The amount of water is not particularly limited and is appropriately selected depending on types and amounts of the components and the like included in the oil phase component.

In a case where the oil phase component includes the compound having the hydrophilic group, an amount of the compound having the hydrophilic group in the oil phase component is not particularly limited and is preferably, for example, 0.1 mass % to 40 mass % with respect to the total solid content.

The respective components included in the oil phase component may be simply mixed, all the components may be mixed together, or respective components may be divided into several groups to be mixed.

The method of mixing the oil phase component and the water phase component is not particularly limited, and examples thereof include mixture by stirring.

The method of emulsifying the mixture obtained by mixing is not particularly limited, and examples thereof include emulsification by an emulsification device (for example, disperser) such as a homogenizer.

The rotation speed of the disperser in the emulsification is, for example, 5,000 rpm to 20,000 rpm and preferably 10,000 rpm to 15,000 rpm.

The rotation time of the emulsification is, for example, 1 minute to 120 minutes, preferably 3 minutes to 60 minutes, more preferably 3 minutes to 30 minutes, and even more preferably 5 minutes to 15 minutes.

(Gelation Step)

The gelation step is a step of gelling the emulsion by heating.

In the gelation step, trifunctional or higher isocyanate compound and water react with each other by heating the emulsion, the isocyanate groups are crosslinked to each other, so as to obtain a dispersion liquid containing gel particles having the three-dimensional crosslinked structure including at least one selected from a urethane bond and a urea bond, the polymerizable group, and the functional groups that generate radicals by irradiation with active energy rays.

The heating temperature (reaction temperature) of the emulsion in the gelation step is preferably 35° C. to 70° C. and more preferably 40° C. to 60° C.

The heating time (reaction time) in the gelation step is preferably 6 hours to 50 hours, more preferably 12 hours to 40 hours, and even more preferably 15 hours to 35 hours.

The gelation step preferably includes a step of distilling an organic solvent from an emulsion.

(Mixture Step)

The mixture step may have a step of mixing gel particles that can be obtained in the gelation step, water, and a colorant. The method of mixing the gel particles, water, and a colorant is not particularly limited. The gel particles may be used in a dispersion liquid state.

The colorant is as described as the colorant containing water dispersion in gel particles.

The producing method of the embodiment may have other steps in addition to the emulsification step, the gelation step, and the mixture step, if necessary.

Examples of the other steps include a step of adding other components.

The other added components are as described above as the other components that can contain the water dispersion of the gel particles.

The water dispersion of the gel particles produced in the method of producing the water dispersion of the gel particles can be suitably used in an ink composition, a coating agent, an adhesive, a paint, and the like.

<Image Forming Method>

The image forming method includes an ink applying step of applying the ink composition on the recording medium and an irradiation step of irradiating the ink composition applied on the recording medium with active energy rays. If these steps are performed, a film (for example, an image) by the ink composition fixed on the recording medium is formed.

(Ink Applying Step)

Hereinafter, the ink applying step in the the image forming method is described.

The ink applying step is not particularly limited, as long as the ink applying step is a step of applying the ink composition on the recording medium.

As an aspect of applying the ink composition on the recording medium, an aspect of applying the ink composition on the recording medium by an ink jet method is particularly preferable.

In the image forming method, an ink jet recording device used in a case where the ink applying step of the ink jet method is applied is not particularly limited, a well-known ink jet recording device that can achieve a desired resolution can be arbitrarily selected to be used. That is, all well-known ink jet recording devices including commercially available products can eject the ink composition to the recording medium in the image forming method.

Examples of the ink jet recording device include devices including an ink supplying method, a temperature sensor, and heating means.

The ink supplying method consists of, for example, an original tank including the ink composition, a supply piping, an ink supply tank just before an ink jet head, a filter, and a piezo-type ink jet head. The piezo-type ink jet head can be driven so as to eject multi-sized dots of preferably 1 pl to 100 pl and more preferably 8 pl to 30 pl at a resolution of preferably 320 dpi×320 dpi to 4,000 dpi×4,000 dpi (dot per inch), more preferably 400 dpi×400 dpi to 1,600 dpi×1,600 dpi, and even more preferably 720 dpi×720 dpi. The dpi represents the number of dots per 2.54 cm (1 inch).

In the ink applying step, since it is desired that the ejected ink composition have a constant temperature, the ink jet recording device preferably includes stabilizing means in an ink composition temperature. A piping method from the ink tank (an intermediate tank in a case where the intermediate tank exists) to a nozzle exit surface, that is, all members become targets as portions to have the constant temperature. That is, heat insulation and heating can be performed from the the ink supply tank to the ink jet head portion.

A method of controlling the temperature is not particularly limited, but, for example, it is preferable to perform heating control depending on the flow rate of the ink composition and ambient temperature, for example, by providing temperature sensors on respective piping portions. The temperature sensor can be provided in an ink supply tank and a portion near a nozzle of an ink jet head. It is preferable that the head unit to be heated is thermally blocked or heat insulated such that the main body of the device is not influenced by the temperature from the external air. In order to reduce the printer startup time required for the heating or in order to reduce the loss of heat energy, it is preferable to reduce the heat capacity of the entire heating unit together with performing heat insulation from other portions.

The recording medium is not particularly limited, and well-known recording mediums can be used as a support or a recording material. As the recording medium, for example, paper, paper on which plastic (for example, polyethylene, polypropylene, and polystyrene) is laminated, a metal plate (for example, aluminum, zinc, and copper), a plastic film (for example, a polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, and polyvinyl acetal), and paper or a plastic film obtained by laminating and vapor depositing metal described above.

Among these, since the ink composition have excellent adhesiveness, the ink composition can be suitably used in a nonabsorbable recording medium as a recording medium. A plastic base material such as polyvinyl chloride, polyethylene terephthalate, and polyethylene is preferable, a polyvinyl chloride resin base material is more preferable, and a polyvinyl chloride resin sheet or film is even more preferable.

(Irradiation Step)

Hereinafter, the irradiation step in the image forming method is described.

The irradiation step is not limited as long as the irradiation step is a step of irradiating the ink composition applied on the recording medium with the active energy rays.

If the ink composition is irradiated with active energy rays, the crosslinking reaction of the gel particles in the ink composition proceeds, the image is fixed, and the film hardness of the image is improved.

Examples of the active energy rays that can be used in the irradiation step include ultraviolet rays (UV light), visible rays, electron rays, and the like. Among these, ultraviolet rays (UV light) are preferable.

The peak wavelength of the active energy rays (light) depends on absorbing characteristics of the sensitizing agent used, if necessary. For example, the peak wavelength is preferably 200 nm to 405 nm, more preferably 220 nm to 390 nm, and even more preferably 220 nm to 385 nm.

In a case where the sensitizing agent is not used together, for example, the peak wavelength is preferably 200 nm to 310 nm and more preferably 200 nm to 280 nm.

For example, the exposure surface illuminance at the time of irradiation with the active energy rays (light) is preferably 10 mW/cm² to 2,000 mW/cm² and irradiation is appropriately performed at 20 mW/cm² to 1,000 mW/cm².

As the light source for generating the active energy rays (light), a mercury lamp, a metal halide lamp, a UV fluorescent lamp, a gas laser, a solid-state laser, and the like are widely known.

The replacement of the light sources exemplified above into a semiconductor ultraviolet light emitting device is industrially and environmentally useful.

Among these, among semiconductor ultraviolet light emitting devices, light emitting diode (LED) (preferably, UV-LED) and a laser diode (LD) (preferably, UV-LD) are compact, has long lifetime, high efficiency, and low cost, and is expected as a light source.

As the light source, a metal halide lamp, an extra high pressure mercury lamp, a high pressure mercury lamp, a medium pressure mercury lamp, a low pressure mercury lamp, LED, and a blue-violet laser are preferable.

Among these, in a case where the sensitizing agent is used together, an extra high pressure mercury lamp that can perform irradiation with light at a wavelength of 365 nm, 405 nm, or 436 nm, a high pressure mercury lamp that can perform irradiation with light at a wavelength of 365 nm, 405 nm, or 436 nm, LED that can perform irradiation with light at a wavelength of 355 nm, 365 nm, 385 nm, and 395 nm, or 405 nm is more preferable, and LED that can perform irradiation with light at a wavelength of 355 nm, 365 nm, 385 nm, 395 nm, or 405 nm is most preferable.

Since the gel particles have functional groups that generate radicals by irradiation with active energy rays in the ink composition used in the image forming method, a photopolymerization initiator that cannot be used in aqueous ink in the related art, for example, a structure which is the same as a photopolymerization initiator such as an acylphosphine oxide compound having excellent sensitivity to light and low solubility to water, can be selected.

For example, in a case where gel particles having a group including at least one structure selected from a monoacylphosphine oxide structure that has an absorption wavelength of 350 nm to 450 nm and is represented by Formula J, a bisacylphosphine oxide structure represented by Formula K, and a bisacylphosphine oxide structure represented by Formula L and a sensitizing agent such as a thioxanthone compound are used together, LED is particularly preferable as the light source.

In a case where gel particles having a group including at least one structure selected from a monoacylphosphine oxide structure represented by Formula J, a bisacylphosphine oxide structure represented by Formula K, and a bisacylphosphine oxide structure represented by Formula L and a sensitizing agent such as a thioxanthone compound are used together, active energy rays (light) that have a wavelength longer than that of ultraviolet rays and have a peak wavelength of 380 nm to 450 nm can be preferably used.

In a case where gel particles having a group including at least one structure selected from a monoacylphosphine oxide structure represented by Formula J, a bisacylphosphine oxide structure represented by Formula K, and a bisacylphosphine oxide structure represented by Formula L and a sensitizing agent are not used together, a metal halide lamp, a medium pressure mercury lamp, and a low pressure mercury lamp are preferable as the light source.

In the irradiation step, it is appropriate that the ink composition applied to the recording medium is irradiated with this UV light, for example, for 0.01 seconds to 120 seconds, preferably 0.1 seconds to 90 seconds.

With respect to the irradiation condition and the basic irradiation method, irradiation conditions and irradiation methods disclosed in JP1985-132767A (JP-S60-132767A) can be applied to the embodiment of the invention, in the same manner. Specifically, a method of scanning the head unit and the light sources by providing the light sources on both sides of the head unit including the ink ejection device, by a so-called shuttle method or a method of being performed by separate light source without driving is preferable. The irradiation of the active energy rays is performed for a certain period of time (for example, for 0.01 seconds to 120 seconds and preferably for 0.01 seconds to 60 seconds) after ink landing and drying by heating.

(Heating and Drying Step)

The image forming method may further have a heating and drying step after the ink applying step and before the irradiation step, if necessary.

In the heating and drying step, it is preferable that an image is fixed by evaporating water and a water-soluble organic solvent, which is used together if necessary, by heating means from the ink composition ejected on the recording medium.

A step (heating and drying step) of fixing the image by drying the ejected ink composition by heating is described.

The heating means is not particularly limited, as long as the heating means can dry water and the water-soluble organic solvent, which is used together if necessary. However, a heat drum, hot air, an infrared lamp, a heat oven, and heat plate heating can be used.

The heating temperature is preferably 40° C. or higher, more preferably about 40° C. to 150° C., and even more preferably about 40° C. to 80° C. The drying and heating time can be appropriately set by adding the composition of the ink composition used and the printing speed.

The ink composition fixed by heating may be further optically fixed by irradiation with active energy rays in the irradiation step, if necessary. As described above, in the irradiation step, it is preferable to perform fixing by UV light.

EXAMPLES

Hereinafter, the embodiment of the invention is specifically described with reference to the specific examples, but the embodiment of the invention is not limited to the examples below without departing from the gist of the invention.

[Synthesization of NCO103]

10 g of trimethylolpropane (TMP), 50.14 g of hexamethylene diisocyanate (HDI), and 111.69 g of ethyl acetate (AcOEt) were added to a three-neck flask and heated to 50° C., 0.172 g of TOYOCAT-RX21 (manufactured by Tosoh Corporation, reactive catalyst) was added thereto, and reaction was performed for six hours, so as to obtain NCO103.

[Synthesization of NCO109]

20 g of pentaerythritol ethylene oxide, 71.16 g of isophorone diisocyanate (IPDI), and 169.3 g of ethyl acetate (AcOEt) were added to a three-neck flask and heated to 50° C., 0.26 g of TOYOCAT-RX21 (manufactured by Tosoh Corporation, reactive catalyst) was added thereto, and reaction was performed for six hours, so as to obtain NCO109.

[Synthesization of INT-NCO1]

22.17 g of INT-1, 171.84 g of NCO103 (solid content: 35 mass %), and 41.16 g of ethyl acetate (AcOEt) were added to a three-neck flask and heated to 50° C., 0.236 g of TOYOCAT-RX21 (manufactured by Tosoh Corporation, reactive catalyst) was added thereto, and reaction was performed for six hours, so as to obtain INT-NCO1 (a trifunctional or higher isocyanate compound to which the functional group that generated radicals due to active energy rays was introduced).

[Synthesization of INT-NCO9]

16.71 g of INT-5, 171.84 g of NCO103 (solid content: 35 mass %), and 41.16 g of ethyl acetate (AcOEt) were added to a three-neck flask and heated to 50° C., 0.236 g of TOYOCAT-RX21 (manufactured by Tosoh Corporation, reactive catalyst) was added thereto, and reaction was performed for six hours, so as to obtain INT-NCO9 (a trifunctional or higher isocyanate compound to which the functional group that generated radicals due to active energy rays was introduced).

[Synthesization of INT-NCO11]

20 g of INT-5, 206.42 g of NCO109 (solid content: 35 mass %), and 37.13 g of ethyl acetate were added to a three-neck flask and heated to 50° C., 0.318 g of TOYOCAT-RX21 (manufactured by Tosoh Corporation, reactive catalyst) was added thereto, and reaction was performed for six hours, so as to obtain INT-NCO11 (a trifunctional or higher isocyanate compound to which the functional group that generated radicals due to active energy rays was introduced).

[Synthesization of INT-NCO28]

10 g of trimethylolpropane (TMP), 66.27 g of isophorone diisocyanate (IPDI), and 185.2 g of ethyl acetate (AcOEt) were added to a three-neck flask and heated to 50° C., 0.285 g of TOYOCAT-RX21 (manufactured by Tosoh Corporation, reactive catalyst) was added thereto, and reaction was performed for three hours. After the reaction, 23.43 g of BLEMMER AP-400 (manufactured by NOF Corporation) was added thereto, and reaction was further performed at 50° C. for six hours, so as to obtain INT-NCO28 (a trifunctional or higher isocyanate compound to which a polymerizable group and a functional group that generated radicals due to active energy rays was introduced).

[Synthesization of Isocyanate Compound 1 to Which Hydrophilic Group was Introduced]

10 g of trimethylolpropane (TMP), 56.11 g of m-xylylene diisocyanate (XDI), and 132.2 g of ethyl acetate (AcOEt) were added to a three-neck flask and heated to 50° C., 0.04 g of TOYOCAT-RX21 (manufactured by Tosoh Corporation, reactive catalyst) were added thereto, and reaction was performed for three hours. 66.1 g of polyethylene glycol monomethyl ether (EO) (manufactured by Sigma-Aldrich Co. LLC., number-average molecular weight (Mn)=5,000) was added thereto, and reaction was further performed for four hours, so as to obtain Isocyanate Compound 1 (an isocyanate compound including a group having a polyether structure, solid content: 50 mass %) to which a hydrophilic group was introduced.

[Synthesization of Isocyanate Compound 2 to Which Hydrophilic Group was Introduced]

45 g of 2,2-bis(hydroxymethyl) propionic acid (DMPA), 223.72 g of isophorone diisocyanate (IPDI), and 499.05 g of ethyl acetate (AcOEt) were added to a three-neck flask and heated to 50° C., 0.7677 g of TOYOCAT-RX21 (manufactured by Tosoh Corporation, reactive catalyst) were added thereto, and reaction was performed for three hours, so as to obtain Isocyanate Compound 2 (an isocyanate compound including a carboxylic acid group, solid content: 35 mass %) to which a hydrophilic group was introduced.

NCO104, NCO105, NCO112, and INT-NCO1 to INT-NCO27 represented by Tables 3 and 4 below were produced in the same method as NCO103, NCO109, INT-NCO1, INT-NCO9, and INT-NCO11. The indication of the "initiator" in Table 4 represents an exemplary compound of a compound having at least one active hydrogen group and at least one functional group that generated radicals due to active energy rays, and the indication of the "isocyanate compound" represents a difunctional or higher isocyanate compound.

TABLE 3

| Compound Number | Polyisocyanate structure | | | Composition | |
|---|---|---|---|---|---|
| | Compound having two or more active hydrogen groups | | Difunctional isocyanate compound | Compound having two or more active hydrogen groups (mol equivalent) | Difunctional isocyanate compound (mol equivalent) |
| NCO 103 | Trimethylolpropane | | Hexamethylene diisocyanate (HDI) | 1 | 4 |
| NCO 104 | Trimethylolpropane | | 1,3-bis(isocyanatomethyl) cyclohexane (HXDI) | 1 | 4 |
| NCO 105 | Trimethylolpropane | | Isophorone diisocyanate (IPDI) | 1 | 4 |

TABLE 3-continued

| | Polyisocyanate structure | | Composition | |
|---|---|---|---|---|
| | | | Compound having | Difunctional |
| Compound Number | Compound having two or more active hydrogen groups | Difunctional isocyanate compound | two or more active hydrogen groups (mol equivalent) | isocyanate compound (mol equivalent) |
| NCO 109 | 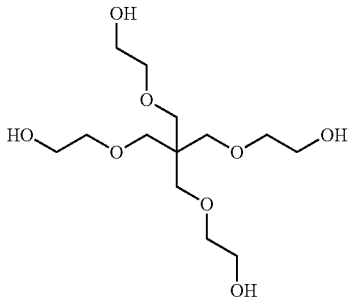 [SMILES: OCCOCC(COCCO)(COCCO)COCCO]
Pentaerythritol ethylene oxide | Isophorone diisocyanate (IPDI) | 1 | 5 |
| NCO 112 | 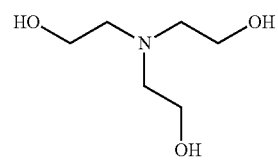
Triethanolamine | Hexamethylene diisocyanate (HDI) | 1 | 4 |

TABLE 4

| | | Compound | Composition Amount of active hydrogen groups of initiator with respect to NCO group of isocyanate compound (mol %) | Addition method Binding method to three-dimensional structure |
|---|---|---|---|---|
| Compound Number | Initiator | Isocyanate compound | | |
| INT-NCO 1 | INT-1 | NCO 103 | 40 | Side chain type |
| INT-NCO 2 | INT-2 | NCO 105 | 40 | Main chain type |
| INT-NCO 3 | INT-3 | NCO 109 | 30 | Main chain type |
| INT-NCO 4 | INT-4 | TDI | 37.5 | Main chain type |
| INT-NCO 5 | INT-4 | HXDI | 37.5 | Main chain type |
| INT-NCO 6 | INT-4 | HDI | 37.5 | Main chain type |
| INT-NCO 7 | INT-4 | IPDI | 37.5 | Main chain type |
| INT-NCO 8 | INT-4 | XDI | 37.5 | Main chain type |
| INT-NCO 9 | INT-5 | NCO 103 | 40 | Main chain type |
| INT-NCO 10 | INT-5 | NCO 104 | 40 | Main chain type |
| INT-NCO 11 | INT-5 | NCO 109 | 30 | Main chain type |
| INT-NCO 12 | INT-5 | DURANATE 24A-100 | 40 | Main chain type |
| INT-NCO 13 | INT-5 | TSE-100 | 40 | Main chain type |
| INT-NCO 14 | INT-6 | NCO 110 | 20 | Main chain type |
| INT-NCO 15 | INT-7 | DURANATE TKA-100 | 40 | Main chain type |
| INT-NCO 16 | INT-8 | NCO 103 | 40 | Main chain type |
| INT-NCO 17 | INT-8 | NCO 109 | 30 | Main chain type |
| INT-NCO 18 | INT-8 | TSE-100 | 40 | Main chain type |
| INT-NCO 19 | INT-9 | NCO 103 | 40 | Side chain type |
| INT-NCO 20 | INT-10 | IPDI | 37.5 | Side chain type |
| INT-NCO 21 | INT-11 | HDI | 40 | Side chain type |
| INT-NCO 22 | INT-11 | HXDI | 40 | Side chain type |
| INT-NCO 23 | INT-11 | TMHDI | 40 | Side chain type |
| INT-NCO 24 | INT-12 | DURANATE TKA-100 | 40 | Side chain type |
| INT-NCO 25 | INT-13 | IPDI | 37.5 | Main chain type |
| INT-NCO 26 | INT-14 | NCO-112 | 40 | Main chain type |
| INT-NCO 27 | INT-15 | HXDI | 37.5 | Main chain type |

[Producing Dispersion Liquid of Gel Particles]

Example 1

<Emulsification Step>
—Producing of Oil Phase Component—

20 g of an isocyanate compound INT-NCO1 (solid content: 35 mass %) (an trifunctional or higher isocyanate compound to which the functional group that generated radicals due to active energy rays was introduced), 3.2 g of Isocyanate Compound 1 to which a hydrophilic group was introduced (solid content: 50 mass %), and 7 g of dipentaerythritol pentaacrylate (manufactured by Sartomer, SR-399E) (included polymerizable compound) were dissolved in 12 g of ethyl acetate, so as to obtain an oil phase component.

—Producing of Water Phase Component—

0.32 g of LAVELIN FP (surfactant) (manufactured by DKS Co., Ltd.) was dissolved in 50 g of distilled water, so as to obtain a water phase component.

The water phase component was added to the oil phase component, and mixed, and the obtained mixture was emulsified at 12,000 rpm for 10 minutes by using a homogenizer, so as to obtain an emulsion.

<Gelation Step>

The obtained emulsion was added to 25 g of distilled water, stirred for 30 minutes at room temperature, and stirred at 50° C. for three hours, and ethyl acetate was distilled.

Thereafter, stirring was performed at 50° C. for 24 hours, the obtained dispersion liquid of the gel particles was diluted by using distilled water such that the concentration of the solid content of the obtained dispersion liquid became 20 mass %, so as to obtain dispersion liquid (water dispersion of gel particles) of Gel Particles 1. The volume-average particle diameter of the gel particles measured by the light scattering method was 0.15 μm. In the measuring of the volume-average particle diameter, a wet-type particle size distribution measuring device LA-910 (manufactured by Horiba Ltd.) was used.

[Preparation of Ink Composition]

Respective components were mixed by using the dispersion liquid of Gel Particles 1 obtained as described above so as to become Ink Composition 1 below, and an ink composition was prepared.

—Composition of Ink Composition 1—

| | |
|---|---|
| Dispersion liquid of Gel Particles 1 | 82 parts |
| Fluorine-based surfactant (manufactured by E. I. du Pont de Nemours and Company, Capstone FS-31, solid content: 25 mass %) | 0.3 parts |
| Ink (Pro-jet Cyan APD1000 (manufactured by FUJIFILM Imaging Colorants) colorant concentration: 14 mass %) | 13 parts |
| 2-methyl propane diol | 4.7 parts |

[Method of Evaluating Ink Composition]

A base material (vinyl chloride (PVC) sheet (manufactured by Avery Dennison Corporation, AVERY 400 GLOSS WHITE PERMANENT)) was coated with the produced ink composition in a thickness of 12 μm by using bar No. 2 of K hand coater manufactured by RK PRINT COAT INSTRUMENTS Ltd. After the coating, moisture was removed by drying the coated film at 60° C. for three minutes, so as to obtain a sample for evaluating the ink composition.

The obtained sample was evaluated as follows. Evaluation result are presented in Table 6 below.

—Adhesiveness Evaluation A (Cross Hatch Test)—

The obtained sample for evaluating the ink composition was irradiated with active energy rays by a UV mini conveyor device for a test CSOT (manufactured by GS Yuasa International Ltd.) to which an ozonelessmetal halide lamp MAN250L was mounted as an exposure light source and in which a conveyor speed was set as 9.0 m/min and exposure intensity was set as 2.0 W/cm$^2$, so as to to cure the sample. The adhesiveness to the recording medium was evaluated in standards as follows by using a cured coated film in conformity with ISO2409 (cross cut method).

"%" representing peeling of a lattice in the standard of 0 to 5 as below indicates a ratio of the number of lattices in which peeling was observed with respect to 25 of the number of lattices formed by being cut at right angles at 1 mm intervals by percentage.

Ratio of peeled lattice (%)=[(the number of lattice in which peeling was generated)/(the total number of lattices)]×100

Evaluation standard

0: Cut edges were smooth, and peeling was not seen in all lattices.

1: Small peeling was observed in the coated film at intersection of cuts. Portions at which the peeling was observed were 5% or less of the total number of lattices.

2: Peeling was observed in any one of portions along edges of cut portions of the coated film and intersections of cuts. The number of portions in which peeling was observed was greater than 5% and 15% or less of the total number of lattices.

3: Peeling was partially or generally observed along edges of cut portions of the coated film or peeling was partially or generally observed in various portions of the lattice. The number of portions in which peeling was observed was greater than 15% and 35% or less of the total number of lattices.

4: Peeling was partially or generally observed along edges of cut portions of the coated film or peeling was partially or generally observed in various portions of the lattice. The number of portions in which peeling was observed was greater than 35% and 65% or less of the total number of lattices.

5: The number of portions in which peeling was observed was greater than 65% of the total number of lattices.

In the evaluation, it is evaluated that 0 to 1 are levels that are acceptable in practice.

—Fixing Property Evaluation—

The obtained sample for evaluating the ink composition was exposed in the condition of energy of 1,000 mJ/cm$^2$ by a Deep UV lamp (manufactured by Ushio Inc., SP-7). A fixation degree on the surface of the sample after exposure was evaluated by touch. In a case where stickiness remains, exposure was repeated until the stickiness was removed, and the fixing properties were evaluated by an exposure amount until the stickiness was removed.

Evaluation standard

A: Stickiness was removed by exposure of one time.

B: Stickiness was removed by exposure of two to three times.

C: Stickiness was removed by exposure of four to five times.

D: Stickiness was not removed by exposure of six or more times.

—Solvent Resistance—

The obtained sample for evaluating the ink composition was exposed in the condition of energy of 8,000 mJ/cm$^2$ by a Deep UV lamp (manufactured by Ushio Inc., SP-7). The surface of a printed matter exposed in the energy condition of 8,000 mJ/cm$^2$ was rubbed with a swab impregnated with isopropyl alcohol and visually evaluated according to the following standard.

Evaluation standard

A: Even if the surface was rubbed 10 or more times, no change in the image was acknowledged.

B: Concentration of the image was decreased by rubbing of five times to nine times.

C: Concentration of the image was decreased by rubbing of two times to four times.

D: Concentration of the image was remarkably decreased by rubbing of one time.

—Water Resistance—

The obtained sample for evaluating the ink composition was exposed in the condition of energy of 8,000 mJ/cm$^2$ by a Deep UV lamp (manufactured by Ushio Inc., SP-7). The surface of a printed matter exposed in the energy condition of 8,000 mJ/cm$^2$ was rubbed with a swab impregnated with water and visually evaluated according to the following standard.

Evaluation Standard

A: Even if the surface was rubbed 10 or more times, no change in the image was acknowledged.

B: Concentration of the image was decreased by rubbing of five times to nine times.

C: Concentration of the image was decreased by rubbing of two times to four times.

D: Concentration of the image was remarkably decreased by rubbing of one time.

—Redispersibility Evaluation—

An aluminum plate was coated with the ink composition in a thickness of 12 μm by using bar No. 2 of K hand coater manufactured by RK PRINT COAT INSTRUMENTS Ltd. After the coating, moisture was removed by drying the coated film at 60° C. for three minutes. The surface of the coated film was rubbed with a sponge impregnated with water.

Fourier transform infrared spectroscopy (FT-IR) was performed respectively on the coated film before being rubbed with a sponge and the coated film after being rubbed, and the residual ratio of the gel particles was calculated according to the equation below from obtained results.

Residual ratio of gel particles=(Intensity of peak derived from gel particles in coating film after being rubbed with sponge/Intensity of peak derived from gel particles in coating film before being rubbed with sponge)×100

Here, the peak derived from the gel particles is a peak of 1,700 cm$^{-1}$.

Redispersibility of the ink composition was evaluated in the evaluation standards as below based on the residual ratio of the obtained gel particles.

Evaluation Standard

A: A residual ratio of the gel particles was 1% or less.

B: A residual ratio of the gel particles was greater than 1% and 5% or less.

C: A residual ratio of the gel particles was greater than 5% and 10% or less.

D: A residual ratio of the gel particles was greater than 10%.

—Jettability Evaluation—

Ejection from the head was performed for 30 minutes by using an ink jet printer (manufactured by Roland DG Corporation, SP-300V) and stopped. After five minutes have elapsed, ejection was performed again, so as to record a solid image and a thin line on the recording medium (manufactured by Avery Dennison Corporation, AVERY 400 GLOSS WHITE PERMANENT). The obtained image (5 cm×5 cm) was observed, and evaluation was visually performed by the evaluation standard below.

Evaluation Standard

A: Dot losses were not acknowledged, and an image with satisfactory quality was able to be obtained.

B: Some dot losses were acknowledged, but no troubles were generated in qualities in practice.

C: Dot losses were generated, but troubles were generated in qualities in practice.

D: Ejection was not able to be performed.

—Preservation Stability Evaluation of Ink Composition—

The obtained ink composition was sealed in a container, two weeks had elapsed at 60° C., evaluations such as the jettability evaluation were performed, and evaluations were performed in the same standards.

—Migration Property Evaluation—

A solid image (0.01 m$^2$ or greater) was formed on the recording medium (manufactured by Avery Dennison Corporation, AVERY 400 GLOSS WHITE PERMANENT) by using an ink jet printer (manufactured by Roland DG Corporation, SP-300V). A recording medium on which the solid image was formed was cut into a size of 0.01 m$^2$, and 10 mL of mixture liquid of water:ethanol=70:30 was added dropwise on an image formed surface. The recording medium after dropwise addition was put into a glass airtight container such that the water-ethanol mixture liquid was not able to be volatilized and was left alone at 40° C. for 10 days. After 10 days, a total elution amount (overall migration limit: OML) of elution components eluted from the solid image contained in the water-ethanol mixture liquid was measured, and evaluation was performed according to evaluation standards below. The measurement of the total elution amount was performed by volatilizing the water-ethanol mixture liquid after the recording medium was left alone for 10 days and measuring the mass of the residual components.

Evaluation Standard

A: The elution amount was 10 ppb or less.

B: The elution amount was greater than 10 ppb and 50 ppb or less.

C: The elution amount was greater than 50 ppb and 100 ppb or less.

D: The elution amount was greater than 100 ppb and 2,000 ppb or less.

E: The elution amount was greater than 2,000 ppb.

[Preparation of Photosensitive Composition]

Respective components were mixed so as to form photosensitive composition below by using a dispersion liquid of Gel Particles 1 obtained described above and the photosensitive composition was prepared.

—Composition of Photosensitive Composition—

| | |
|---|---|
| Dispersion liquid of Gel Particles 1 | 81 parts |
| Fluorine-based surfactant (manufactured by E. I. du Pont de Nemours and Company, Capstone FS-31) | 0.3 parts |
| Water | The remainder with the whole as 100 parts |

[Method of Evaluating Photosensitive Composition]

A base material (triacetylcellulose (TAC) film, manufactured by Fujifilm Corporation) was coated with the produced photosensitive composition in a thickness of 12 μm by using bar No. 2 of K hand coater manufactured by RK PRINT COAT INSTRUMENTS Ltd. After the coating, moisture was removed by drying the coated film at 60° C. for three minutes, so as to obtain a sample for evaluating a photosensitive composition.

The following evaluation was performed on the obtained sample for evaluating a photosensitive composition. Evaluation results are presented in Table 6 below.

—Adhesiveness Evaluation B (Cross Hatch Test)—

The sample for evaluating the photosensitive composition was irradiated with active energy rays by a UV mini conveyor device for a test CSOT (manufactured by GS Yuasa International Ltd.) to which an ozonelessmetal halide lamp MAN250L was mounted as an exposure light source and in which a conveyor speed was set as 9.0 m/min and exposure intensity was set as 2.0 W/cm$^2$, so as to to cure the sample. The adhesiveness to the recording medium was evaluated in standards as follows by using a cured coated film in conformity with ISO2409 (cross cut method).

"%" representing peeling of a lattice in the standard of 0 to 5 as below indicates a ratio of the number of lattices in which peeling was observed with respect to 25 of the number of lattices formed by being cut at right angles at 1 mm intervals by percentage.

Ratio of peeled lattice (%)=[(the number of lattice in which peeling was generated)/(the total number of lattices)]×100

Evaluation Standard

0: Cut edges were smooth, and peeling was not seen in all lattices.

1: Small peeling was observed in the coated film at intersection of cuts. Portions at which the peeling was observed were 5% or less of the total number of lattices.

2: Peeling was observed in any one of portions along edges of cut portions of the coated film and intersections of cuts. The number of portions in which peeling was observed was greater than 5% and 15% or less of the total number of lattices.

3: Peeling was partially or generally observed along edges of cut portions of the coated film or peeling was partially or generally observed in various portions of the lattice. The number of portions in which peeling was observed was greater than 15% and 35% or less of the total number of lattices.

4: Peeling was partially or generally observed along edges of cut portions of the coated film or peeling was partially or generally observed in various portions of the lattice. The number of portions in which peeling was observed was greater than 35% and 65% or less of the total number of lattices.

5: The number of portions in which peeling was observed was greater than 65% of the total number of lattices.

In the evaluation, it is evaluated that 0 to 1 are levels that are acceptable in practice.

—Pencil Hardness—

A pencil hardness test was performed on an ink cured film produced in the same manner as in the adhesiveness evaluation, in conformity with JIS K5600-5-4 (1999). In the photosensitive composition, an allowable range of the hardness is HB or harder and preferably H or harder. A printed matter having the evaluation result of B or less is not preferable, since there is a possibility that scratches may be generated at the time of handling the printed matter.

UNI (registered trademark) manufactured by Mitsubishi Pencil Co., Ltd. was used.

Examples 2 to 33 are represented below.

In Examples 2 to 33, gel particles were produced in the method described below, the ink compositions and the photosensitive compositions were prepared by using dispersion liquids of the gel particles produced in the same manner as in Example 1, and various evaluations were performed. The evaluation results are provided in Table 6 below.

Examples 2 to 16

Dispersion liquids of Gel Particles 2 to 16 were produced in the same manner as in Example 1 except for changing the trifunctional or higher isocyanate compound (INT-NCO1) used in Example 1 to trifunctional or higher isocyanate compounds (INT-NCO) to which the functional groups that generated radicals due to active energy rays was introduced as presented in Table 5 below.

Example 17

<Emulsification Step>
—Producing of Oil Phase Component—

15.46 g of isocyanate compound INT-NCO20 (solid content: 35 mass %) (a trifunctional or higher isocyanate compound to which the functional group that generated radicals due to active energy rays was introduced), 4.54 g of INT-NCO27 (solid content: 35 mass %) (a trifunctional or higher isocyanate compound to which the functional group that generated radicals due to active energy rays was introduced), 3.2 g of Isocyanate Compound 1 (solid content: 50 mass %) to which a hydrophilic group was introduced, and 7 g of dipentaerythritol pentaacrylate (manufactured by Sartomer, SR-399E) (included polymerizable monomer) were dissolved in 12 g of ethyl acetate, so as to obtain an oil phase component.

—Producing of Water Phase Component—

0.32 g of LAVELIN FP (surfactant) (manufactured by DKS Co., Ltd.) was dissolved in 50 g of distilled water, so as to obtain a water phase component.

The water phase component was added to the oil phase component, and mixed, and the obtained mixture was emulsified at 12,000 rpm for 10 minutes by using a homogenizer, so as to obtain an emulsion.

<Gelation Step>

The obtained emulsion was added to 25 g of distilled water, stirred for 30 minutes at room temperature, and stirred at 50° C. for three hours, and ethyl acetate was distilled.

Thereafter, stirring was performed at 50° C. for 24 hours, the obtained dispersion liquid of the gel particles was diluted by using distilled water such that the concentration of the solid content of the obtained dispersion liquid became 20 mass %, so as to obtain a dispersion liquid of Gel Particles 17. The volume-average particle diameter of the gel particles measured by the light scattering method was 0.15 μm.

Example 18

<Emulsification Step>
—Producing of Oil Phase Component—

22.34 g of isocyanate compound INT-NCO9 (solid content: 35 mass %) (a trifunctional or higher isocyanate compound to which the functional group that generated radicals due to active energy rays was introduced), 2.28 g of Isocyanate Compound 2 to which the hydrophilic group was introduced, and 7 g of dipentaerythritol pentaacrylate (manufactured by Sartomer, SR-399E) (included polymerizable monomer) were dissolved in 12 g of ethyl acetate, so as to obtain an oil phase component.

—Producing of Water Phase Component—

0.32 g of LAVELIN FP (surfactant) (manufactured by DKS Co., Ltd.) and 0.035 g of sodium hydroxide were dissolved in 50 g of distilled water, so as to obtain a water phase component.

The water phase component was added to the oil phase component, and mixed, and the obtained mixture was emulsified at 12,000 rpm for 10 minutes by using a homogenizer, so as to obtain an emulsion.

<Gelation Step>

The obtained emulsion was added to 25 g of distilled water, stirred for 30 minutes at room temperature, and stirred at 50° C. for three hours, and ethyl acetate was distilled.

Thereafter, stirring was performed at 50° C. for 24 hours, the obtained dispersion liquid of the gel particles was diluted by using distilled water such that the concentration of the solid content of the obtained dispersion liquid became 20 mass %, so as to obtain a dispersion liquid of Gel Particles 18. The volume-average particle diameter of the gel particles measured by the light scattering method was 0.15 μm.

Examples 19 to 21

Dispersion liquids of Gel Particles 19 to 21 were produced in the same manner as in Example 18 except for changing the trifunctional or higher isocyanate compound (INT-NCO9) used in Example 18 to trifunctional or higher isocyanate compounds (INT-NCO) to which the functional group that generated radicals due to active energy rays was introduced as represented in Table 5 below.

Example 22

<Emulsification Step>

—Producing of Oil Phase Component—

17.3 g of an isocyanate compound INT-NCO9 (solid content: 35 mass %) (a trifunctional or higher isocyanate compound to which the functional group that generated radicals due to active energy rays was introduced), 3.5 g of Isocyanate Compound 1 (solid content: 50 mass %) to which a hydrophilic group was introduced, 2.28 g of Isocyanate Compound 2 to which a hydrophilic group was introduced, and 7 g of dipentaerythritol pentaacrylate (manufactured by Sartomer, SR-399E) (included polymerizable monomer) were dissolved in 12 g of ethyl acetate, so as to obtain an oil phase component.

—Producing of Water Phase Component—

0.4 g of LAVELIN FP (surfactant) (manufactured by DKS Co., Ltd.) and 0.035 g of sodium hydroxide were dissolved in 50 g of distilled water, so as to obtain a water phase component.

The water phase component was added to the oil phase component, and mixed, and the obtained mixture was emulsified at 12,000 rpm for 10 minutes by using a homogenizer, so as to obtain an emulsion.

<Gelation Step>

The obtained emulsion was added to 25 g of distilled water, stirred for 30 minutes at room temperature, and stirred at 50° C. for three hours, and ethyl acetate was distilled.

Thereafter, stirring was performed at 50° C. for 24 hours, the obtained dispersion liquid of the gel particles was diluted by using distilled water such that the concentration of the solid content of the obtained dispersion liquid became 20 mass %, so as to obtain a dispersion liquid of Gel Particles 22. The volume-average particle diameter of the gel particles measured by the light scattering method was 0.15 μm.

Examples 23 to 25

Dispersion liquids of Gel Particles 23 to 25 were produced in the same manner as in Example 22 except for changing the trifunctional or higher isocyanate compound (INT-NCO9) used in Example 22 to trifunctional or higher isocyanate compounds (INT-NCO) to which the functional groups that generated radicals due to active energy rays was introduced as presented in Table 5 below.

Example 26

<Emulsification Step>

—Producing of Oil Phase Component—

20 g of an isocyanate compound INT-NCO11 (solid content: 35 mass %) (a trifunctional or higher isocyanate compound to which the functional group that generated radicals due to active energy rays was introduced), 3.2 g of Isocyanate Compound 1 (solid content: 50 mass %) to which a hydrophilic group was introduced, and 7 g of neopentyl glycol propylene oxide adduct diacrylate (manufactured by Sartomer, SR9003, NPGPODA) (included polymerizable monomer) were dissolved in 12 g of ethyl acetate, so as to obtain an oil phase component.

—Producing of Water Phase Component—

0.32 g of LAVELIN FP (surfactant) (manufactured by DKS Co., Ltd.) was dissolved in 50 g of distilled water, so as to obtain a water phase component.

The water phase component was added to the oil phase component, and mixed, and the obtained mixture was emulsified at 12,000 rpm for 10 minutes by using a homogenizer, so as to obtain an emulsion.

<Gelation Step>

The obtained emulsion was added to 25 g of distilled water, stirred for 30 minutes at room temperature, and stirred at 50° C. for three hours, and ethyl acetate was distilled.

Thereafter, stirring was performed at 50° C. for 24 hours, the obtained dispersion liquid of the gel particles was diluted by using distilled water such that the concentration of the solid content of the obtained dispersion liquid became 20 mass %, so as to obtain a dispersion liquid of Gel Particles 26. The volume-average particle diameter of the gel particles measured by the light scattering method was 0.15 μm.

Examples 27 to 30

Dispersion liquids of Gel Particles 27 to 30 were produced in the same manner as in Example 26 except for changing the included polymerizable monomer (NPG-PODA) used in Example 26 to included polymerizable monomers presented in Table 5 below.

Example 31

<Emulsification Step>

—Producing of Oil Phase Component—

20 g of an isocyanate compound INT-NCO1 (solid content: 35 mass %) (a trifunctional or higher isocyanate compound to which the functional group that generated radicals due to active energy rays was introduced), 3.2 g of Isocyanate Compound 1 (solid content: 50 mass %) to which a hydrophilic group was introduced, and 20 g of INT-NCO28 (solid content: 35 mass %) (a trifunctional or higher isocyanate compound to which a polymerizable group and a functional group that generated radicals due to active energy rays was introduced) were dissolved in 2 g of ethyl acetate, so as to obtain an oil phase component.

—Producing of Water Phase Component—

0.32 g of LAVELIN FP (surfactant) (manufactured by DKS Co., Ltd.) was dissolved in 50 g of distilled water, so as to obtain a water phase component.

The water phase component was added to the oil phase component, and mixed, and the obtained mixture was emulsified at 12,000 rpm for 10 minutes by using a homogenizer, so as to obtain an emulsion.

<Gelation Step>

The obtained emulsion was added to 25 g of distilled water, stirred for 30 minutes at room temperature, and stirred at 50° C. for three hours, and ethyl acetate was distilled.

Thereafter, stirring was performed at 50° C. for 24 hours, the obtained dispersion liquid of the gel particles was diluted by using distilled water such that the concentration of the solid content of the obtained dispersion liquid became 20 mass %, so as to obtain a dispersion liquid of Gel Particles 31. The volume-average particle diameter of the gel particles measured by the light scattering method was 0.15 μm.

Example 32

<Emulsification step>
—Producing of Oil Phase Component—

22.34 g of an isocyanate compound INT-NCO1 (solid content: 35 mass %) (a trifunctional or higher isocyanate compound to which the functional group that generated radicals due to active energy rays was introduced), 2.28 g of Isocyanate Compound 2 to which a hydrophilic group was introduced, and 20 g of INT-NCO28 (solid content: 35 mass %) (a trifunctional or higher isocyanate compound to which a polymerizable group and a functional group that generated radicals due to active energy rays was introduced) were dissolved in 2 g of ethyl acetate, so as to obtain an oil phase component.

—Producing of Water Phase Component—

0.32 g of LAVELIN FP (surfactant) (manufactured by DKS Co., Ltd.) and 0.035 g of sodium hydroxide were dissolved in 50 g of distilled water, so as to obtain a water phase component.

The water phase component was added to the oil phase component, and mixed, and the obtained mixture was emulsified at 12,000 rpm for 10 minutes by using a homogenizer, so as to obtain an emulsion.

<Gelation Step>

The obtained emulsion was added to 25 g of distilled water, stirred for 30 minutes at room temperature, and stirred at 50° C. for three hours, and ethyl acetate was distilled.

Thereafter, stirring was performed at 50° C. for 24 hours, the obtained dispersion liquid of the gel particles was diluted by using distilled water such that the concentration of the solid content of the obtained dispersion liquid became 20 mass %, so as to obtain a dispersion liquid of Gel Particles 32. The volume-average particle diameter of the gel particles measured by the light scattering method was 0.15 μm.

Example 33

<Emulsification Step>
—Producing of Oil Phase Component—

17.3 g of the isocyanate compound MI-NCO9 (solid content: 35 mass %) (a trifunctional or higher isocyanate compound to which the functional group that generated radicals due to active energy rays was introduced), 3.5 g of Isocyanate Compound 1 (solid content: 50 mass %) to which a hydrophilic group was introduced, 4.56 g of Isocyanate Compound 2 to which a hydrophilic group was introduced, and 7 g of dipentaerythritol pentaacrylate (manufactured by Sartomer, SR-399E) (included polymerizable monomer) were dissolved in 12 g of ethyl acetate, so as to obtain an oil phase component.

—Producing of Water Phase Component—

0.07 g of sodium hydroxide was dissolved in 50 g of distilled water, so as to obtain a water phase component.

The water phase component was added to the oil phase component, and mixed, and the obtained mixture was emulsified at 12,000 rpm for 10 minutes by using a homogenizer, so as to obtain an emulsion.

<Gelation Step>

The obtained emulsion was added to 25 g of distilled water, stirred for 30 minutes at room temperature, and stirred at 50° C. for three hours, and ethyl acetate was distilled.

Thereafter, stirring was performed at 50° C. for 24 hours, the obtained dispersion liquid of the gel particles was diluted by using distilled water such that the concentration of the solid content of the obtained dispersion liquid became 20 mass %, so as to obtain a dispersion liquid of Gel Particles 33. The volume-average particle diameter of the gel particles measured by the light scattering method was 0.15 μm.

<Checking Whether Dispersion Liquids of Gel Particles Includes Gel Particles Having Polymerizable Groups>

Whether gel particles are actually included in the dispersion liquids of the gel particles of Examples 1 to 33 obtained described above is checked by a method described below. The operation described below was performed in the condition of the liquid temperature of 25° C.

Samples were gathered from the dispersion liquids of the gel particles described below. 100 times by mass of tetrahydrofuran (THF) with respect to a total solid content (particles in this example) in this sample was added to and mixed with the gathered samples, so as to prepare diluents of the dispersion liquids of the gel particles. Centrifugation (80,000 rpm, for 40 minutes) was performed on the obtained diluents. After the centrifugation, whether residues exist was visually checked. In a case where the residues were checked, redispersion of the residues in water was performed by adding water to this residue and performing stirring for one hour by using a stirrer so as to obtain a redispersion liquid. Particle size distribution of the obtained redispersion liquid was measured by the light scattering method, by using a wet-type particle size distribution measuring device (LA-910, manufactured by Horiba Ltd.). In a case where particle size distribution was checked by the operation above, it was determined that the dispersion liquid include gel particles.

As a result, it was checked that the dispersion liquids of all of the gel particles include gel particles.

From the results above and results of the fourier transform infrared spectroscopy (FT-IR) analysis, it was checked that all of the dispersion liquids of the gel particles included gel particles having polymerizable groups (that is, the gel particles were the gel particles actually having polymerizable groups).

<Checking of Inclusion of Polymerizable Monomer>

With respect to the dispersion liquids of the gel particles using the polymerizable monomer in the production among the dispersion liquids of the gel particles of Examples 1 to 33 obtained above, an inclusion ratio (%) of the polymerizable monomer was measured so as to check whether the polymerizable monomers are included in the gel particles. Details thereof are described below. Operations below are performed in the condition of the liquid temperature of 25° C.

Two samples in the same mass (hereinafter, referred to as "Sample 1A" and "Sample 2A") were gathered from the dispersion liquids of the gel particles.

100 times by mass of tetrahydrofuran (THF) of the total solid content in Sample 1A was added to and mixed with Sample 1A, so as to prepare diluents. Centrifugation was performed on the obtained diluents in the condition of 80,000 rpm and 40 minutes. The supernatant (hereinafter, referred to as "Supernatant 1A") generated by the centrifugation was gathered. The mass of the polymerizable monomer included in Supernatant 1A gathered was measured by "Waters2695" a liquid chromatography device manufactured by Waters Corporation. The mass of the obtained polymerizable monomer was set as "the total amount of the polymerizable monomer".

Centrifugation was performed on Sample 2A in the same condition as in the centrifugation performed on the diluent. A supernatant (hereinafter, referred to as "Supernatant 2A") generated by the centrifugation was gathered. The mass of the polymerizable monomer included in Supernatant 2A gathered was measured by the liquid chromatography device. The mass of the obtained polymerizable monomer was "a liberation amount of the polymerizable monomer".

An inclusion ratio (mass %) of the polymerizable monomer was obtained by an equation below based on the "total amount of the polymerizable monomer" and the "liberation amount of the polymerizable monomer".

Inclusion ratio (mass %) of polymerizable monomer=((Total amount of polymerizable monomer-liberation amount of polymerizable monomer)/total amount of polymerizable monomer)×100

As a result, it was checked that a polymerizable monomer having an inclusion ratio of 99% or greater was included in the gel particles of all the dispersion liquid of the gel particles used in the produced polymerizable monomer.

Comparative Example 1

As the oil phase component, 20 g of NCO103 (solid content: 35 mass %) (trifunctional or higher isocyanate compound), 3.2 g of an adduct of trimethylolpropane, xylene diisocyanate, and polyethylene glycol monomethyl ether (manufactured by Mitsui Chemicals, Inc., TAKENATE (registered trademark) D-116N, a 50 mass % solution of ethyl acetate, isocyanate compound 3 to which a hydrophilic group was introduced), 7 g of dipentaerythritol pentaacrylate (manufactured by Sartomer, SR-399E) (included polymerizable monomer), and 1 g of Irgacure (registered trademark) 819 (manufactured by BASF SE) (included photopolymerization initiator) were dissolved in 12 g of ethyl acetate.

0.32 g of LAVELIN FP (surfactant) (manufactured by DKS Co., Ltd.) was dissolved in 50 g of distilled water, so as to obtain a water phase component.

The water phase component was added to the oil phase component, and mixed, and the obtained mixture was emulsified at 12,000 rpm for 10 minutes by using a homogenizer, so as to obtain an emulsion.

After the obtained emulsion was added to 25 g of distilled water and stirred for 30 minutes at room temperature, stirring was further performed at 50° C. for three hours, and ethyl acetate was distilled.

Thereafter, stirring was performed at 50° C. for 24 hours, the obtained dispersion liquid of the gel particles was diluted by using distilled water such that the concentration of the solid content of the obtained dispersion liquid became 20 mass %, so as to obtain a dispersion liquid of Comparative Particles 1. The volume-average particle diameter of the gel particles measured by the light scattering method was 0.15 μm. In the measurement of the volume-average particle diameter, a wet-type particle size distribution measuring device LA-910 (manufactured by Horiba Ltd.) was used.

In the dispersion liquid of Comparative Particles 1, Comparative Particles 1 did not have the functional group that generated radicals by irradiation with active energy rays.

Comparative Examples 2 to 5

Dispersion liquids of Comparative Particles 2 to 5 were produced in the same manner as Comparative Example 1 except for changing the included photopolymerization initiator (Irgacure (registered trademark) 819) used in Comparative Example 1 to included photopolymerization initiators represented in Table 5 below.

In the dispersion liquids of Comparative Particles 2 to 5, all of Comparative Particles 2 to 5 did not have the functional groups that generate radicals by irradiation with active energy rays.

TABLE 5

| | | Gel Particle | | | | | |
|---|---|---|---|---|---|---|---|
| | Gel Particle Number | Isocyanate compound to which hydrophilic group was introduced | Isocyanate compound to which polymerizable group was introduced | INT-NCO | Included photopolymerization initiator | Included polymerizable monomer | Surfactant |
| Example 1 | Gel Particles 1 | Compound 1 | — | — | INT-NCO 1 | — | SR-399E | LAVELIN FP |
| Example 2 | Gel Particles 2 | Compound 1 | — | — | INT-NCO 3 | — | SR-399E | LAVELIN FP |
| Example 3 | Gel Particles 3 | Compound 1 | — | — | INT-NCO 4 | — | SR-399E | LAVELIN FP |
| Example 4 | Gel Particles 4 | Compound 1 | — | — | INT-NCO 5 | — | SR-399E | LAVELIN FP |
| Example 5 | Gel Particles 5 | Compound 1 | — | — | INT-NCO 8 | — | SR-399E | LAVELIN FP |
| Example 6 | Gel Particles 6 | Compound 1 | — | — | INT-NCO 9 | — | SR-399E | LAVELIN FP |
| Example 7 | Gel Particles 7 | Compound 1 | — | — | INT-NCO 11 | — | SR-399E | LAVELIN FP |

TABLE 5-continued

| | | Gel Particle | | | | | | |
|---|---|---|---|---|---|---|---|---|
| | Gel Particle Number | Isocyanate compound to which hydrophilic group was introduced | Isocyanate compound to which polymerizable group was introduced | INT-NCO | INT-NCO | Included photopoly-merization initiator | Included polymerizable monomer | Surfactant |
| Example 8 | Gel Particles 8 | Compound 1 | — | — | INT-NCO 12 | — | SR-399E | LAVELIN FP |
| Example 9 | Gel Particles 9 | Compound 1 | — | — | INT-NCO 13 | — | SR-399E | LAVELIN FP |
| Example 10 | Gel Particles 10 | Compound 1 | — | — | INT-NCO 16 | — | SR-399E | LAVELIN FP |
| Example 11 | Gel Particles 11 | Compound 1 | — | — | INT-NCO 20 | — | SR-399E | LAVELIN FP |
| Example 12 | Gel Particles 12 | Compound 1 | — | — | INT-NCO 22 | — | SR-399E | LAVELIN FP |
| Example 13 | Gel Particles 13 | Compound 1 | — | — | INT-NCO 23 | — | SR-399E | LAVELIN FP |
| Example 14 | Gel Particles 14 | Compound 1 | — | — | INT-NCO 24 | — | SR-399E | LAVELIN FP |
| Example 15 | Gel Particles 15 | Compound 1 | — | — | INT-NCO 25 | — | SR-399E | LAVELIN FP |
| Example 16 | Gel Particles 16 | Compound 1 | — | — | INT-NCO 26 | — | SR-399E | LAVELIN FP |
| Example 17 | Gel Particles 17 | Compound 1 | — | — | INT-NCO 20 INT-NCO 27 | — | SR-399E | LAVELIN FP |
| Example 18 | Gel Particles 18 | — | Compound 2 | — | INT-NCO 9 | — | SR-399E | LAVELIN FP |
| Example 19 | Gel Particles 19 | — | Compound 2 | — | INT-NCO 11 | — | SR-399E | LAVELIN FP |
| Example 20 | Gel Particles 20 | — | Compound 2 | — | INT-NCO 12 | — | SR-399E | LAVELIN FP |
| Example 21 | Gel Particles 21 | — | Compound 2 | — | INT-NCO 13 | — | SR-399E | LAVELIN FP |
| Example 22 | Gel Particles 22 | Compound 1 | Compound 2 | — | INT-NCO 9 | — | SR-399E | LAVELIN FP |
| Example 23 | Gel Particles 23 | Compound 1 | Compound 2 | — | INT-NCO 11 | — | SR-399E | LAVELIN FP |
| Example 24 | Gel Particles 24 | Compound 1 | Compound 2 | — | INT-NCO 12 | — | SR-399E | LAVELIN FP |
| Example 25 | Gel Particles 25 | Compound 1 | Compound 2 | — | INT-NCO 13 | — | SR-399E | LAVELIN FP |
| Example 26 | Gel Particles 26 | Compound 1 | — | — | INT-NCO 11 | — | NPGPODA | LAVELIN FP |
| Example 27 | Gel Particles 27 | Compound 1 | — | — | INT-NCO 11 | — | A-TMPT | LAVELIN FP |
| Example 28 | Gel Particles 28 | Compound 1 | — | — | INT-NCO 11 | — | ATMM-3L | LAVELIN FP |
| Example 29 | Gel Particles 29 | Compound 1 | — | — | INT-NCO 11 | — | AD-TMP | LAVELIN FP |
| Example 30 | Gel Particles 30 | Compound 1 | — | — | INT-NCO 11 | — | A-DPH | LAVELIN FP |
| Example 31 | Gel Particles 31 | Compound 1 | — | INT-NCO 28 | INT-NCO 1 | — | — | LAVELIN FP |
| Example 32 | Gel Particles 32 | — | Compound 2 | INT-NCO 28 | INT-NCO 1 | — | — | LAVELIN FP |
| Example 33 | Gel Particles 33 | Compound 1 | Compound 2 | — | INT-NCO 9 | — | SR-399E | — |
| Comparative Example 1 | — | — | — | Compound 3 | — | NCO 103 | Irgacure 819 | SR-399E | LAVELIN FP |
| Comparative Example 2 | — | — | — | Compound 3 | — | NCO 103 | Irgacure 369 | SR-399E | LAVELIN FP |
| Comparative Example 3 | — | — | — | Compound 3 | — | NCO 103 | Irgacure 2959 | SR-399E | LAVELIN FP |
| Comparative Example 4 | — | — | — | Compound 3 | — | NCO 103 | Photopoly-merization initiator 1 | SR-399E | LAVELIN FP |
| Comparative Example 5 | — | — | — | Compound 3 | — | NCO 103 | Photopoly-merization initiator 2 | SR-399E | LAVELIN FP |

Compounds 1 to 3, INT-NCO28, and photopolymerization initiators 1 and 2 in Table 5 were compounds in the structures presented below. The photopolymerization initiator 1 and the photopolymerization initiator 2 were compounds disclosed in paragraph numbers [0305] to [0308] disclosed in JP2012-532238A. A-TMPT represents trimethylolpropane triacrylate, ATMM-3L represents pentaerythritol triacrylate, AD-TMP represents ditrimethylolpropane tetraacrylate, and AD-DPH represents dipentaerythritol hexaacrylate (all are manufactured by Shin Nakamura Chemical Co., Ltd.).

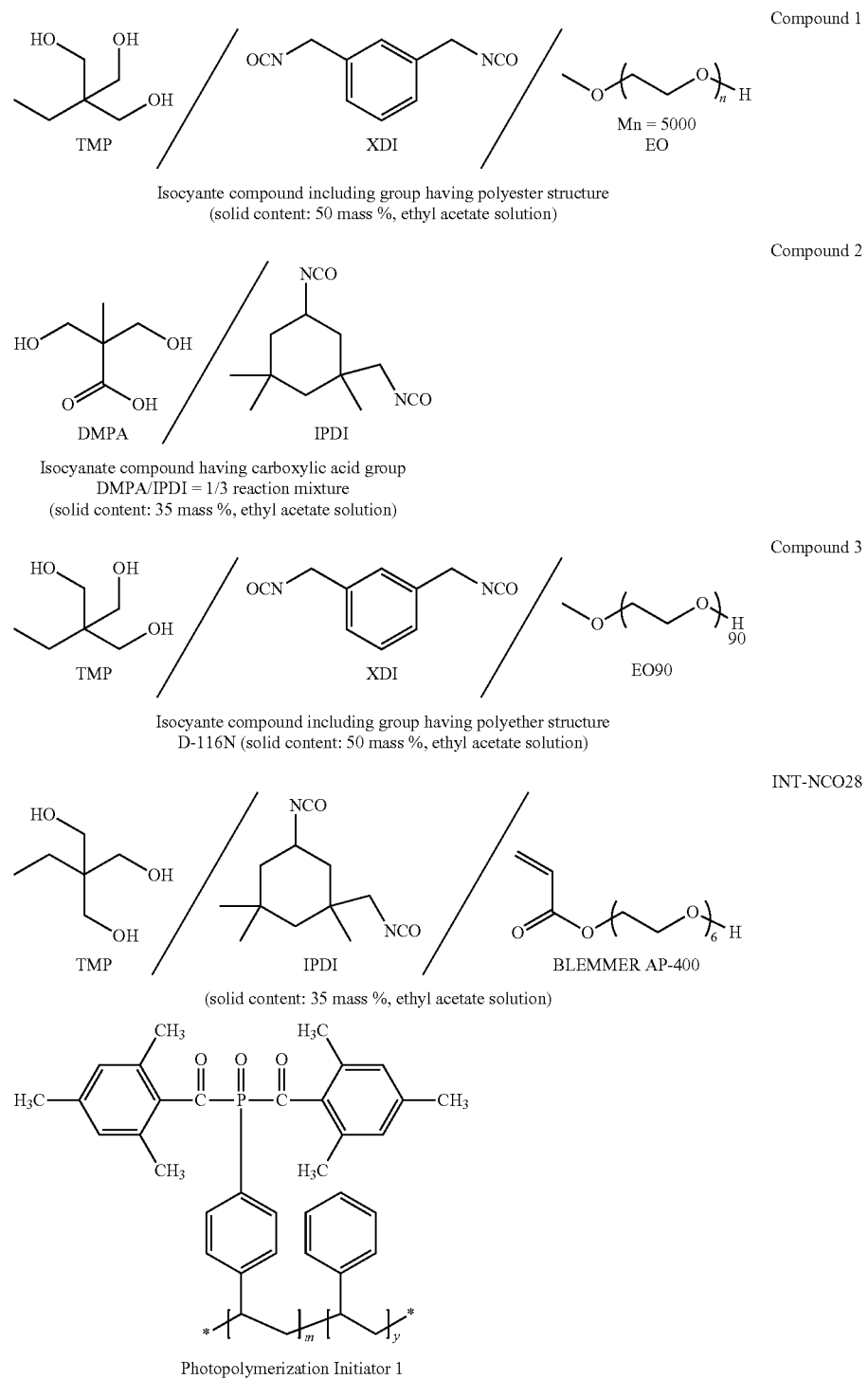

-continued

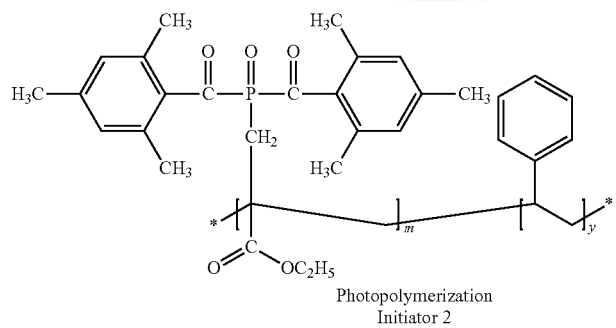

Photopolymerization
Initiator 2

TABLE 6

| | Evaluation results | | | | | | | | | |
|---|---|---|---|---|---|---|---|---|---|---|
| | Adhesiveness | | Pencil hardness | Water resistance | Solvent resistance | Fixing properties | Jettability | Redispersibility | Preservation stability | Migration properties |
| | A | B | | | | | | | | |
| Example 1 | 0 | 0 | F | A | A | A | A | A | A | B |
| Example 2 | 0 | 0 | 3H | A | A | A | A | A | A | A |
| Example 3 | 0 | 0 | 3H | A | A | A | A | A | A | A |
| Example 4 | 0 | 0 | 2H | A | A | A | A | A | A | A |
| Example 5 | 0 | 0 | 2H | A | A | A | A | A | A | A |
| Example 6 | 0 | 0 | H | A | A | A | A | A | A | A |
| Example 7 | 0 | 0 | 3H | A | A | A | A | A | A | A |
| Example 8 | 0 | 0 | H | A | A | A | A | A | A | A |
| Example 9 | 0 | 0 | H | A | A | A | A | A | A | A |
| Example 10 | 0 | 0 | H | A | A | A | A | A | A | B |
| Example 11 | 0 | 0 | 3H | A | A | A | A | A | A | B |
| Example 12 | 0 | 0 | 2H | A | A | A | A | A | A | B |
| Example 13 | 0 | 0 | H | A | A | A | A | A | A | B |
| Example 14 | 0 | 0 | H | A | A | A | A | A | A | B |
| Example 15 | 0 | 0 | 2H | A | A | B | A | A | A | A |
| Example 16 | 0 | 0 | F | A | A | B | A | A | A | A |
| Example 17 | 0 | 0 | 3H | A | A | A | A | A | A | B |
| Example 18 | 0 | 0 | H | A | A | A | A | A | A | A |
| Example 19 | 0 | 0 | 3H | A | A | A | A | A | A | A |
| Example 20 | 0 | 0 | H | A | A | A | A | A | A | A |
| Example 21 | 0 | 0 | H | A | A | A | A | A | A | A |
| Example 22 | 0 | 0 | H | A | A | A | A | A | A | A |
| Example 23 | 0 | 0 | 3H | A | A | A | A | A | A | A |
| Example 24 | 0 | 0 | H | A | A | A | A | A | A | A |
| Example 25 | 0 | 0 | H | A | A | A | A | A | A | A |
| Example 26 | 0 | 0 | H | A | A | A | A | A | A | A |
| Example 27 | 0 | 0 | 3H | A | A | A | A | A | A | A |
| Example 28 | 0 | 0 | 3H | A | A | A | A | A | A | A |
| Example 29 | 0 | 0 | 3H | A | A | A | A | A | A | A |
| Example 30 | 0 | 0 | 3H | A | A | A | A | A | A | A |
| Example 31 | 0 | 0 | F | A | A | A | A | A | A | B |
| Example 32 | 0 | 0 | F | A | A | A | A | A | A | B |
| Example 33 | 0 | 0 | H | A | A | A | A | A | A | A |
| Comparative Example 1 | 0 | 0 | H | A | A | A | A | A | A | C |
| Comparative Example 2 | 0 | 0 | H | A | A | A | A | A | A | D |
| Comparative Example 3 | 0 | 0 | H | A | A | A | A | A | A | D |
| Comparative Example 4 | 0 | 0 | H | A | A | B | A | A | A | C |
| Comparative Example 5 | 0 | 0 | H | A | A | B | A | A | A | C |

In the ink compositions of the examples in Table 6, all of the adhesiveness, the water resistance, the solvent resistance, the fixing properties, the jettability, the redispersibility, the preservation stability, and migration properties were excellent. In the photosensitive compositions of the examples, the adhesiveness and the pencil hardness were excellent.

From these, it is understood that a film in which occurrence of the migration was suppressed and film hardness was excellent was able to be obtained in the examples.

Example 34 to Example 35

[Evaluation of ink composition using LED] The ink compositions of Examples 11 and 17 using LED were evaluated.

Specifically, the same operations were performed as those in Adhesiveness Evaluation A, Adhesiveness Evaluation B, and Pencil Hardness Evaluation, except for changing the exposure light source (ozoneless metal halide lamp MAN250L) to a 385 nm UV-LED irradiator (manufactured by CCS Inc.) for a test and changing the exposure energies to 300 mJ/cm$^2$.

Results there are provided in Table 7.

TABLE 7

| | | Evaluation results | | |
|---|---|---|---|---|
| | | Pencil hardness | Adhesiveness | |
| | | | PVC | TAC |
| Example 34 | Gel Particles 11 | H | 0 | 0 |
| Example 35 | Gel Particles 17 | 2H | 0 | 0 |

As presented in Table 7, at the time of curing, the ink compositions of Examples 11 and 17 using LED light exhibited excellent results of the adhesiveness and the pencil hardness evaluation in the same manner as in a case where the ozoneless metal halide lamp MAN250L was used (see Table 6 above).

Example 36

[Preparation of ink composition] A cyan ink composition was prepared by using the dispersion liquid of the gel particles of Example 4 and mixing respective components so as to obtain a cyan ink composition as described below.

—Composition of Cyan Ink Composition—

| | |
|---|---|
| Dispersion liquid of Gel particles 4 | 75 parts |
| SR9035 (manufactured by Sartomer, ethoxylated trimethylolpropane triacrylate, polymerizable compound) | 10 parts |
| Ink (Pro-jet Cyan APD1000 (manufactured by FUJIFILM Imaging Colorants, Inc.) colorant concentration: 14 mass %) | 10 parts |
| Fluorine-based surfactant (manufactured by E. I. du Pont de Nemours and Company, Capstone FS-31, solid content: 25 mass %) | 0.3 parts |
| 2-methyl propane diol | 4.7 parts |

Examples 37 to 40

Cyan ink compositions of respective examples were produced in the same manner as in Example 36 except for changing SR9035 (polymerizable compound) used as the cyan ink composition of Example 36 to a polymerizable compound presented in Table 8 below.

Examples 41 to 45

Cyan ink compositions of respective examples were produced in the same manner as in Examples 36 to 40 except for changing Gel Particles 4 used as the cyan ink compositions of Examples 36 to 40 to Gel Particles 23.

[Method of Evaluating Ink Composition]

Base materials (vinyl chloride sheets (manufactured by Avery Dennison Corporation, AVERY 400 GLOSS WHITE PERMANENT)) were coated with respective cyan ink compositions of Examples 36 to 45 obtained above by using bar No. 2 of K hand coater manufactured by RK PRINT COAT INSTRUMENTS Ltd. such that a thickness became 12 μm. After the coating, moisture was dried from the coated film at 60° C. for three minutes, so as to obtain samples for evaluating the ink compositions.

With respect to the obtained samples, Adhesiveness Evaluation A, fixing property evaluation, solvent resistance evaluation, water resistance evaluation, and pencil hardness evaluation were performed in the same manner as described above. Evaluation results are provided in Table 9 below.

With respect to the cyan ink compositions of Examples 36 to 45 obtained above, redispersibility evaluation and preservation stability evaluation were performed in the same manner as in the method described above, and jettability evaluation was performed in a method described below. Evaluation results are provided in Table 9 below.

—Jettability Evaluation—

The cyan ink compositions of Examples 36 to 45 obtained above were ejected from the head for 30 minutes by using the ink jet printer (manufactured by Roland DG Corporation, SP-300V) and stopped. After five minutes had elapsed, the cyan ink compositions were ejected again to recording mediums (manufactured by Avery Dennison Corporation, AVERY 400 GLOSS WHITE PERMANENT), so as to record solid images and thin lines. The obtained images (5 cm×5 cm) were observed and were evaluated according to the evaluation standards below.

Evaluation Standard

A: Dot losses were not acknowledged, and an image with satisfactory quality was able to be obtained.

B: Some dot losses were acknowledged, but no troubles were generated in qualities in practice.

C: Dot losses were generated, but troubles were generated in qualities in practice.

D: Ejection was not able to be performed.

TABLE 8

| | | Gel Particles | Polymerizable Compound |
|---|---|---|---|
| Example 36 | Ink Composition 36 | Gel Particles 4 | SR9035 |
| Example 37 | Ink Composition 37 | Gel Particles 4 | AM-1 |
| Example 38 | Ink Composition 38 | Gel Particles 4 | AM-2 |
| Example 39 | Ink Composition 39 | Gel Particles 4 | AM-3 |
| Example 40 | Ink Composition 40 | Gel Particles 4 | AM-4 |
| Example 41 | Ink Composition 41 | Gel Particles 23 | SR9035 |
| Example 42 | Ink Composition 42 | Gel Particles 23 | AM-1 |
| Example 43 | Ink Composition 43 | Gel Particles 23 | AM-2 |
| Example 44 | Ink Composition 44 | Gel Particles 23 | AM-3 |
| Example 45 | Ink Composition 45 | Gel Particles 23 | AM-4 |

SR9035 in Table 8 was ethoxylated trimethylolpropane triacrylate (manufactured by Sartomer) and AM-1 to AM-4 were compounds in the structures provided below.

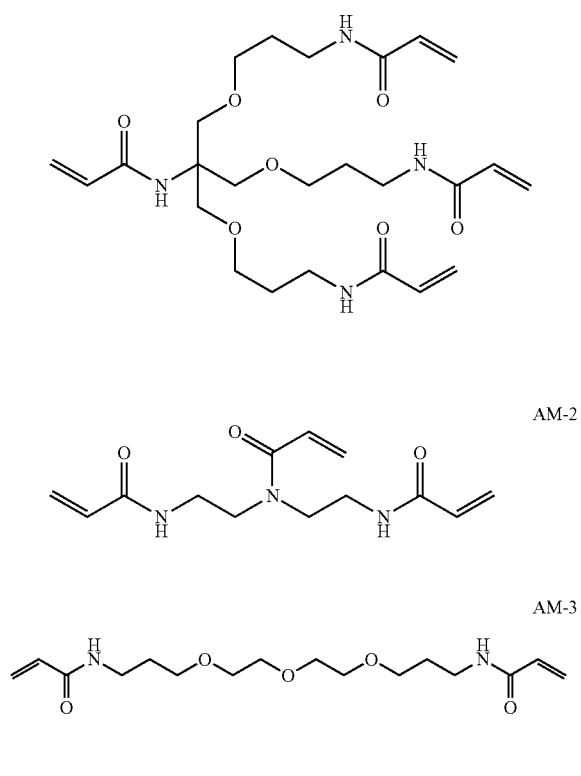

It was understood that, in the ink compositions of Examples 36 to 45 as presented in Table 9, all of the adhesiveness, the water resistance, the solvent resistance, the fixing properties, the jettability, the redispersibility, and the preservation stability were excellent. From this, it was understood that the examples had dispersibility and redispersibility, and it was possible to obtain an image having excellent film hardness by performing curing with high sensitivity.

The whole of the disclosure of JP2014-201982 filed on Sep. 30, 2014 and JP2015-061720 filed on Mar. 24, 2015 is incorporated into the present specification by reference.

All the documents, patent applications, and technical standards described in the specification are incorporated into the present specification by reference to the same extent as that in the case where it is specifically and individually shown that each of the documents, patent applications, and technical standards is incorporated into the present specification by reference.

What is claimed is:

1. Gel particles each having a three-dimensional cross-linked structure including at least one bond selected from a urethane bond and a urea bond, the gel particles each comprising:
   a polymerizable group; and
   a functional group that generates radicals by irradiation with active energy rays; wherein
   the polymerizable group is an ethylenically unsaturated group; and the functional group that generates radicals by irradiation with active energy rays is bonded to the three-dimensional crosslinked structure of the gel particles via a covalent bond.

2. The gel particles according to claim 1,
   wherein the functional group that generates radicals by irradiation with active energy rays is a group having at least one selected from an acetophenone structure represented by Formula A below, a monoacylphosphine oxide structure represented by Formula B below, and a bisacylphosphine oxide structure represented by Formula C below,

TABLE 9

| | | Evaluation results | | | | | | | | |
|---|---|---|---|---|---|---|---|---|---|---|
| | Ink Composition | Adhesiveness A | Pencil hardness | Water resistance | Solvent resistance | Fixing properties | Jettability | Redispersibility | Preservation stability | Migration properties |
| Example 36 | Ink Composition 36 | 0 | 2H | A | A | A | A | A | A | A |
| Example 37 | Ink Composition 37 | 0 | 2H | A | A | A | A | A | A | A |
| Example 38 | Ink Composition 38 | 0 | 2H | A | A | A | A | A | A | A |
| Example 39 | Ink Composition 39 | 0 | 2H | A | A | A | A | A | A | A |
| Example 40 | Ink Composition 40 | 0 | 2H | A | A | A | A | A | A | A |
| Example 41 | Ink Composition 41 | 0 | 3H | A | A | A | A | A | A | A |
| Example 42 | Ink Composition 42 | 0 | 3H | A | A | A | A | A | A | A |
| Example 43 | Ink Composition 43 | 0 | 3H | A | A | A | A | A | A | A |
| Example 44 | Ink Composition 44 | 0 | 3H | A | A | A | A | A | A | A |
| Example 45 | Ink Composition 45 | 0 | 3H | A | A | A | A | A | A | A |

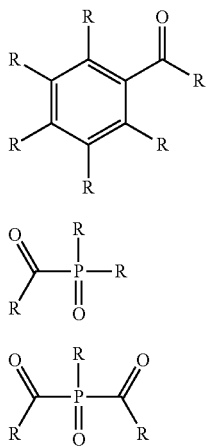

Formula A

Formula B

Formula C in Formulae A, B, and C, R's each independently represent a monovalent group or *-L-, at least one of R's in the respective formulae represents *-L-, L represents a divalent organic group, and * represents a bonding site with a three-dimensional crosslinked structure.

3. The gel particles according to claim 1, each further comprising:
a hydrophilic group on a surface.

4. The gel particles according to claim 1, having a volume average particle diameter of 0.01 μm to 10.0 μm.

5. The gel particles according to claim 1, each further comprising:
a polymerizable monomer inside the gel particles.

6. The gel particles according to claim 5, wherein the polymerizable monomer includes a polymerizable monomer having an ethylenically unsaturated group.

7. The gel particles according to claim 6, wherein the number of the ethylenically unsaturated group is three or more.

8. A photosensitive composition comprising:
the gel particles according to claim 1; and
water.

9. The photosensitive composition according to claim 8, further comprising:
a polymerizable compound outside the gel particles.

10. An ink composition comprising:
the gel particles according to claim 1;
water; and
a colorant.

11. The ink composition according to claim 10, further comprising:
a polymerizable compound outside the gel particles.

12. An image forming method comprising:
applying the ink composition according to claim 10 on a recording medium; and
irradiating the ink composition applied on the recording medium with active energy rays.

* * * * *